(12) United States Patent
Messinger

(10) Patent No.: US 10,355,424 B2
(45) Date of Patent: Jul. 16, 2019

(54) ELECTRONIC DEVICE HOLDER

(71) Applicant: Samuel Messinger, Ramot Beit Shemesh Gimmel (IL)

(72) Inventor: Samuel Messinger, Ramot Beit Shemesh Gimmel (IL)

(*) Notice: Subject to any disclaimer, the term of this patent is extended or adjusted under 35 U.S.C. 154(b) by 0 days.

(21) Appl. No.: 15/706,799

(22) Filed: Sep. 18, 2017

(65) Prior Publication Data
US 2018/0342840 A1 Nov. 29, 2018

Related U.S. Application Data

(60) Provisional application No. 62/512,022, filed on May 28, 2017.

(51) Int. Cl.
| | |
|---|---|
| *H01R 13/66* | (2006.01) |
| *H02J 7/00* | (2006.01) |
| *H01R 24/28* | (2011.01) |
| *H01R 13/60* | (2006.01) |
| *H01R 24/60* | (2011.01) |
| *H01R 24/86* | (2011.01) |

(52) U.S. Cl.
CPC ........ *H01R 13/6675* (2013.01); *H02J 7/0044* (2013.01); *H02J 7/0052* (2013.01); *H01R 13/60* (2013.01); *H01R 24/28* (2013.01); *H01R 24/60* (2013.01); *H01R 24/86* (2013.01)

(58) Field of Classification Search
CPC ........ H01R 31/06; H01R 25/00; H02J 7/0045
USPC ................... 439/369, 929; 320/111
See application file for complete search history.

(56) References Cited

U.S. PATENT DOCUMENTS

| | | | | |
|---|---|---|---|---|
| 5,075,615 A | * | 12/1991 | Dantis ............... | H01R 31/02 320/111 |
| 6,938,867 B2 | * | 9/2005 | Dirks ............... | H01R 13/72 248/309.1 |
| 7,654,855 B2 | * | 2/2010 | Liao ............... | H01R 13/60 439/441 |
| 2010/0291786 A1 | * | 11/2010 | Hopwood ........ | H01R 13/6273 439/345 |
| 2011/0187323 A1 | * | 8/2011 | Gourley ............. | H02J 5/00 320/111 |
| 2011/0227535 A1 | * | 9/2011 | Caskey ............. | H01R 13/6675 320/111 |
| 2014/0125283 A1 | * | 5/2014 | Yang ............... | H02J 7/0044 320/115 |
| 2015/0280479 A1 | * | 10/2015 | Levy ............... | H02J 7/0055 320/111 |

* cited by examiner

*Primary Examiner* — Tulsidas C Patel
*Assistant Examiner* — Marcus E Harcum
(74) *Attorney, Agent, or Firm* — Carrie M. Stroup

(57) ABSTRACT

The invention is directed to an electrical device charger with at least one stopper that is configured to hold at least one electrically powered device in position on the charger while the charger is coupled to a power source. The stopper may be channel, groove and or protrusion. The charger may be formed of two separate parts that can be connected via snap, clamp and/or press fit mechanism. The electrical device charger may include a mechanism to compensate for non-horizontal electrical outlets and may further include a horizontal level keychain charger. The locater can be fixed vertical or at an angled or adjustably fixed to be vertical or angled.

14 Claims, 61 Drawing Sheets

ELECTRONIC DEVICE HOLDER

FIELD OF THE INVENTION

The present invention generally relates to the field of electrical device charger. The invention, particularly relates to an electrical device charger having at least one stopper configured to hold electrical devices on the charger.

BACKGROUND OF THE INVENTOR

The Inventor and his Family have a long and meritorious history of invention starting at the United States Patent Office in 1904 and spanning over a century of distinguished accomplishment and manufacturing summarized in STATIONARY BEARING RACE WITH UNIFORM DISTRIBUTION OF WEAR U.S. Pat. No. 9,631,673 B2 issued Apr. 25, 2017 to the Inventor, Samuel Messinger.

BACKGROUND OF THE INVENTION

There was a time when every mobile device, for example, mobile phone, iPad, and tablet, seemed to come with its own unique charger. These mobile devices were powered by batteries. Mobile device are more commonly used now at every level of socio-economic society. Because of the frequent even constant use of these mobile devices, their batteries need to be re-charged frequently. Mobile device chargers are usually provided by the manufacturers along with the device. Previously one has had to remember to bring the right charging cable if you wanted to continue using your device while away from home. However, the Micro USB has combatted the industry's use of custom ports and now charging your phone on-the-go is no longer a problem with the standardized connector.

A conventional charger for a cell phone comprises a charger body, a plug and an electric cord. However, when the charger is carried outdoors, the plug is not positioned and stored easily. In addition, the electric cord is easily tangled, thereby causing inconvenience to the user when using the charger. A conventional charger reel (or box) can be used to wind and store the electric cord. However, the conventional charger reel has a larger volume, thereby causing inconvenience in packaging, storage and transportation of the charger reel, so that the user cannot carry the charger reel easily and conveniently.

A number of different type of the electrical charger for mobile devices are available in the prior art. Different types of electrical chargers are already available in the market, some of them are depicted in FIGS. 4 to 7 show casing 220 V electrical plugs some of them have fixed cable or wire attached with the electrical plugs and some of them may have a cable or wire. Prior art document, US20150018049 discloses a USB cable used to hold a cell phone/electronic device in a standing position while it is used to synchronize and charge said cell phone/electronic device. It has two unique features. On the front end there is a removably attachable sleeve that allows for the USB cord to flex and stay in a bent position. This allows the user of the cord to create a stand for his or her electronic device for ease of use on a table or flat surface. On the back end of the cord is a removable attachable docking station for a cell phone or electronic device so when the device is being charged it can sit next to the wall outlet. This patent is only used flex and stay to hold cell phone.

Another prior art document, US20150188591 discloses a cell phone charger holder that can completely receive and store the plug and the electric cord of a charger. The cell phone charger holder includes a main body, a plug, and an electric cord. The plug has two pins referred to as male which fit into matching slots or holes called male. The main body has a front face provided with a receiving chamber for receiving the plug. The main body has a side provided with an annular groove for winding the electric cord. The main body has a lower portion provided with two positioning hooks for placing a cell phone. This reference is discusses only for cell phone charger holder.

Yet another prior art document, apple's recently issued U.S. Pat. No. 9,614,378 discloses a inductive charging interface with magnetic retention can be used for charging electronic devices and accessories. For example, a magnetic core of an inductive charging configuration may be divided into two magnetic elements, one element can be housed within a receptacle or receiving connector of housing of an electric device and the other element can be housed within a plug or transmission connector. The poles of the two elements of the magnetic core may create a magnetic field to retain the plug connector in an aligned, mated position with the receptacle connector of the electronic device.

Yet another prior art document, US20160211609 discloses a charger adaptor for a mobile device that has a connection socket, the charger adaptor includes: an insertion plug formed with a plurality of contact electrodes, the insertion plug having a shape complementary to an interior shape of the connection socket; a plug body extending away from the insertion plug and extending outside the connection socket, the plug body having exteriorly facing electrical contacts that are in respective electrical continuity with the contact electrodes. The reference discusses use of magnet in the charger adaptor to hold mobile devices.

Yet another prior art document, US20140117922 discusses a portable power tool adapter device used to power and charge an electronic device. The power tool adapter device may include adapter housing with mechanical fittings configured to mate with various power tool battery types, a charger board circuit for controlling various functions of the adapter device, a DC-to-DC step down converter and regulator for converting the high voltage from the power tool to a low voltage. The reference discusses portable DC power tool battery charger.

Yet another prior art document, US20150072555 discloses a docking station for an elongate rectangular mobile device.

Yet another prior art document, US20140139183 discloses a mobile device charger comprising a stand member which can support the mobile device in either a standing horizontally or vertical position for easy viewing of the device screen. The reference discusses mobile device charger having extra support stand.

Yet another prior art document, US20130187606 discloses a charger for a cell phone or tablet personal computer with function of winding a wire. The charger includes a main unit, a power plug that is put in a groove of the main unit, a transmission wire that is wound in a double C-slot at a side of the main unit, and a charging connector that is fixed in a positioning dip or a containing groove of the main unit.

However, above mentioned references and many other similar references has one or more of the following shortcomings: (i) Most of the prior art only enable to hold cell phone or mobile phone; (ii) More bulky accessories or elements are connected with the electrical charger; (iii) Many electrical chargers require the use of a long cable or wire to charge mobile device; (iv) Separate docking station which requires more space to place it; (v) Not easy to carry during the travelling; (vi) USB cord to flex and stay in a bent position; (vii) magnet used to hold mobile devices; (ix) Portable DC power tool battery adapter, and (x) Requires longer cables which further tangled and difficult to carry as well.

The present application addresses the above mentioned concerns and short comings.

SUMMARY OF THE INVENTION

In the view of the foregoing disadvantages inherent in the known types of electrical chargers now present in the prior art, the present invention provides an improved electrical chargers. As such, the general purpose of the present invention, which will be described subsequently in greater detail, is to provide a new, improved, simple and easy to use electrical device chargers with means of holding electrical devices which has all the advantages of the prior art and none of the disadvantages.

An object of the invention is to provide an electrical device charger with means of holding a plurality of electrical devices which comprises: a main unit/housing with at least one stopper; a cable cord for connecting main unit with said electrical devices; and pin for fitting said main unit with an electric power source.

It is another object of the present invention to provide the electrical device charger with means of holding a plurality of electrical devices, wherein said main unit has a top side provided with at least one holding stopper.

Yet another object of the present invention to provide the electrical device charger with means of holding a plurality of electrical devices, wherein said main unit has a side provided with one or more than one space for connecting the cable cord to said electrical devices.

Yet another object of the present invention to provide the electrical device charger with means of holding a plurality of electrical devices, wherein said main unit has a rear side provided at least two pins for fitting said main unit into the electric power source.

Yet another object of the present invention to provide the electrical device charger with means of holding a plurality of electrical devices, wherein said main unit acts as a single unit of 220 V electrical plug or 110 V electrical plug.

Yet another object of the present invention to provide the electrical device charger with means of holding a plurality of electrical devices, wherein said main unit comprise two parts including 220 V adapters and/or 110 V adapters, wherein both parts are connected.

Yet another object of the present invention to provide the electrical device charger with means of holding a plurality of electrical devices, wherein said holding stopper may be in the shape of a protrusion or channel.

Yet another object of the present invention to provide the electrical device charger with means of holding a plurality of electrical devices, wherein said stopper may be in vertical position or in an angled position.

Yet another object of the present invention to provide the electrical device charger with means of holding a plurality of electrical devices, wherein said holding stopper comprises an adjustable device holding stopper assembly mechanism with an adjustable dial.

Yet another object of the present invention to provide the electrical device charger with means of holding a plurality of electrical devices, wherein said electric power source may include, but not limited to, AC or directional electric power, and the connection to the electric power source may be a direct connection, via a DC adapter, or via a USB connection.

Yet another object of the present invention to provide an adjustable electrical device charger with means of holding a plurality of electrical devices, wherein said main unit of the device may be held securely to compensate for electrical plugs which are non-horizontal.

Yet another object of the present invention to provide the electrical device charger with means of holding a plurality of electrical devices, wherein said main unit of the device comprises two separate parts which can be connected by snap-on mechanism.

Yet another object of the present invention to provide the electrical device charger with means of holding a plurality of electrical devices, wherein said main unit of the device further comprises a retractable plug.

Yet another object of the present invention to provide the electrical device charger with means of holding a plurality of electrical devices, wherein said electrical device may include, but not limited to, a mobile phone, i-Pad, a music player, a CD player, tablet, a laptop, a personal computer or other electrical devices alike.

Yet another object of this invention is to provide the electrical device charger with means of holding a plurality of electrical devices, wherein main unit comprises said adjustable keychain to provide leveling to the electrical device charger to place on to the non-horizontal electrical outlets.

In one embodiment, the present invention is directed to an electrical device charger, comprising: at least one housing comprised of an outer surface from which a plurality of prongs protrude to couple to and receive power from a power source, where the outer surface is defined by least one stopper that is configured to hold at least one electrically powered device in position on the housing while the at least one housing is coupled to the power source.

In one embodiment, the present invention is directed to an electrical cord for connecting the housing to the electrically powered device.

In one embodiment the at least one stopper extends into a top of the at least one housing.

In one embodiment the at least one stopper comprises extends from a top of the at least one housing.

In one embodiment the stopper comprises a protrusion that extends from a top of the at least one housing.

In one embodiment the at least one stopper comprises a channel extending into a top of the at least one housing.

In one embodiment, the stopper is disposed completely across the top surface of the housing.

In one embodiment, along an entire length of the stopper, the stopper comprises a cross-sectional shape selected from the group consisting of a right angle, an angle other than a right angel, a curve, and a combination thereof.

In one embodiment the at least one housing comprises a connector for electrically connecting the cable cord to the at least one electrical device.

In one embodiment the plurality of prongs are configured to couple to a 220 V or 110 V wall outlet.

In one embodiment the at least one housing is comprised of an electrically connected 220 V part and a 110 V part.

In one embodiment wherein the channel is configured to allow an angle of the channel to be adjusted relative to a bottom of the outer surface of the at least one housing.

In one embodiment the present invention further comprises a user adjustable mechanism coupled to the channel and configured to adjust the angle of the channel.

In one embodiment when the power source comprises a vertical surface, and when the electrical device charger is mounted against the vertical surface, the angle of the channel is adjustable relative to the vertical surface.

In one embodiment the electric power source is selected from the group consisting of: an alternating current (AC) source and a direct current (DC) source.

In one embodiment the least one housing is comprised of a first part and a second part, wherein the second part comprises the at least one stopper, and wherein the second part is configured to rotate relative to the first part.

In one embodiment the present invention further comprises a securing mechanism configured to maintain the rotation of the first part relative to the second part.

In one embodiment the at least one stopper comprises a channel.

In one embodiment the securing mechanism is configured to maintain the stopper in a horizontal orientation when the at least one housing is coupled to the power source.

In one embodiment the at least one housing is comprised of a first part and a second part that are connected by a press-fit mechanism.

In one embodiment the securing mechanism comprises a dial with an indicator.

In one embodiment the press-fit comprises a spring.

In one embodiment the invention further comprises the at least one electrically powered device, wherein the at least one electrically connected device comprises, a mobile phone, an i-Pad computer device, a music player device, a CD player, a tablet computer, or a laptop computer.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
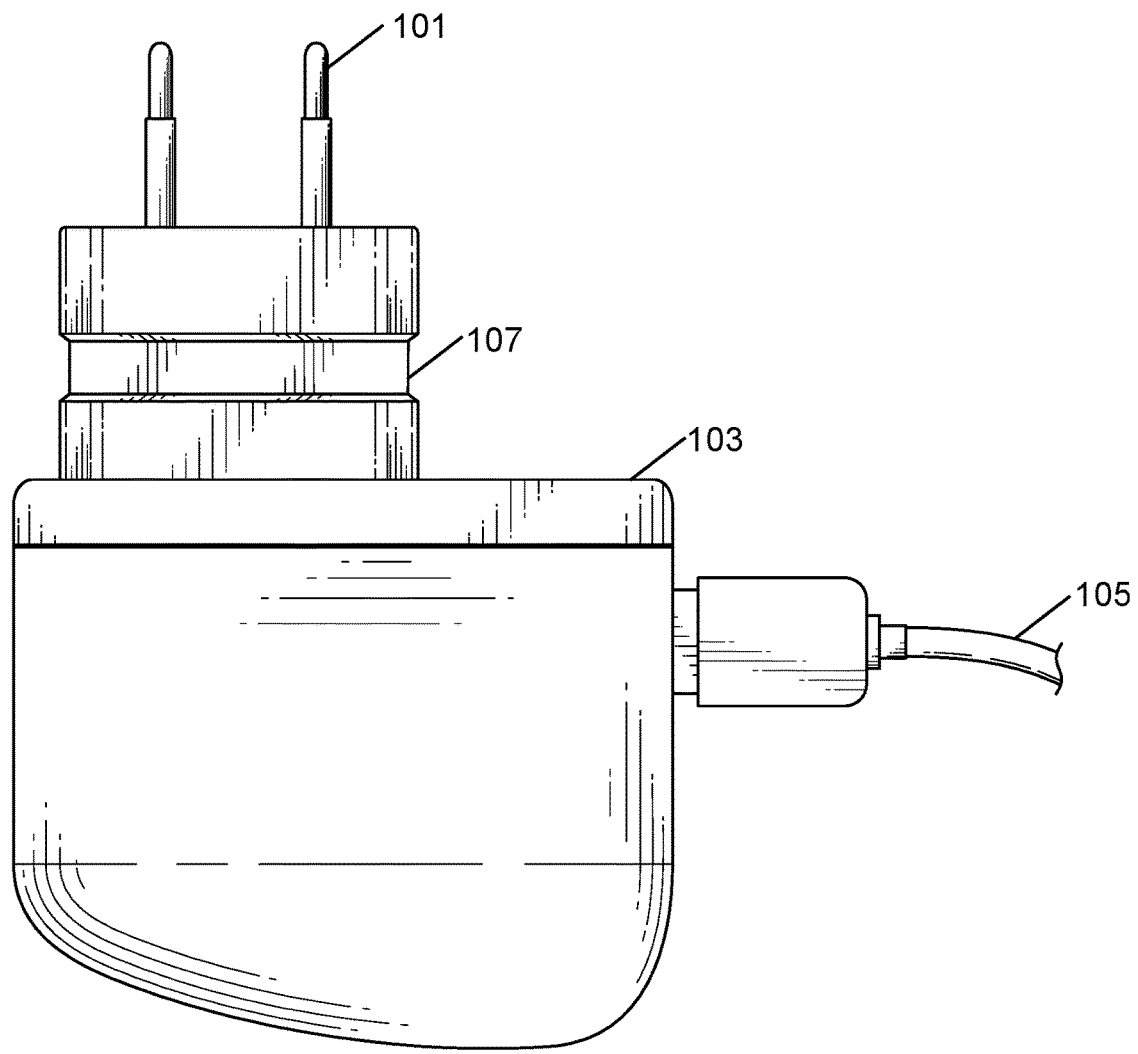
FIG. 1 depicts a top view of the electrical device charger (220 V electrical plug) with a holding channel in one of the embodiments of the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein the term "stopper" is intended to apply to slots, channels, grooves, protrusions, stops and other similar structures that are provided to the housing of a device charger to enable holding and retaining of electrical devices on or in the housing.

As used herein the terms "prongs" and "pins" are intended to encompass a class of structures provided to the housing of a electrical device charger to enable electrical connection of the housing to an electrical power sources.

As used herein, the term stopper refers to structure designed and intended to hold electrical devices on a wall mounted electrical device charger and/or adapter. In embodiments, a stopper may comprise a channel, slot, groove, protrusion, stop or other structure configured to hold electrical devices on a wall mounted electrical device charger and/or adapter. In one embodiment, a stopper can be defined by opposing sides that are parallel. In one embodiment, a stopper can be defined by opposing sides that are non-parallel. In one embodiment, a stopper may be defined by sides that have portions that are both parallel and non-parallel. In embodiments, the stopper comprises a cross-section with a u-shape or a v-shape or both a v-shape and a u-shape. In embodiments, a stopper may be outside or inside the housing of an electrical device charger and/or adapter. In one embodiment, a cross-sectional shape of the stopper is defined by a shape selected from the group consisting of a right angle, an angle other than a right angel, a curve, and a combination thereof.

Embodiments will now be described more fully hereinafter with reference to the accompanying drawings, in which embodiments are shown. These embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Figure 9:
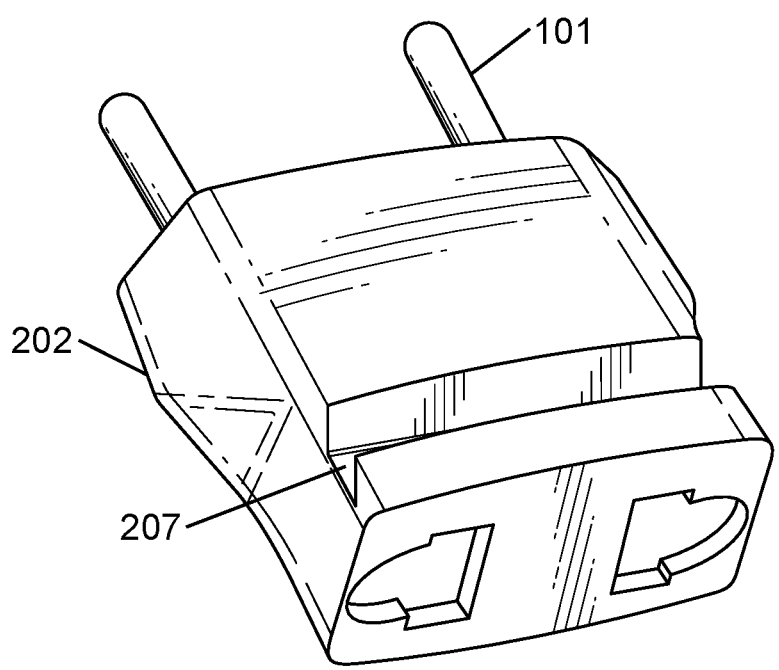
FIG. 9 depicts a perspective view of the 220 V electrical adapter having embodiment of device holding stopper and a socket arrangement for 110 V electrical plug.

In the present invention, the following embodiments are discussed. The first embodiment is electrical plug that goes into the outlet, with device holding slot(s) (see FIGS. 2 and 3). The second embodiment is the electrical adapter that goes into the outlet with the device holding channel/stopper (see FIGS. 9 and 13). The third embodiment is the assembling of the electrical adapter and the electrical plug (see FIGS. 22 and 24). The fourth embodiment is the arrangement having two separate parts which can be connected via snap on clamp mechanism (see FIG. 76). The fifth embodiment which is an adjustable device holder to compensate for non-horizontal electrical outlets with horizontal level keychain charger (see FIG. 76). Further, the device holding slot can be either vertical or angled (see FIGS. 50, 51, 53, and 55). Further, different types of various arrangements are provided in the Figures and are explained herein.

EXPLANATION OF DRAWINGS

Figure 2:
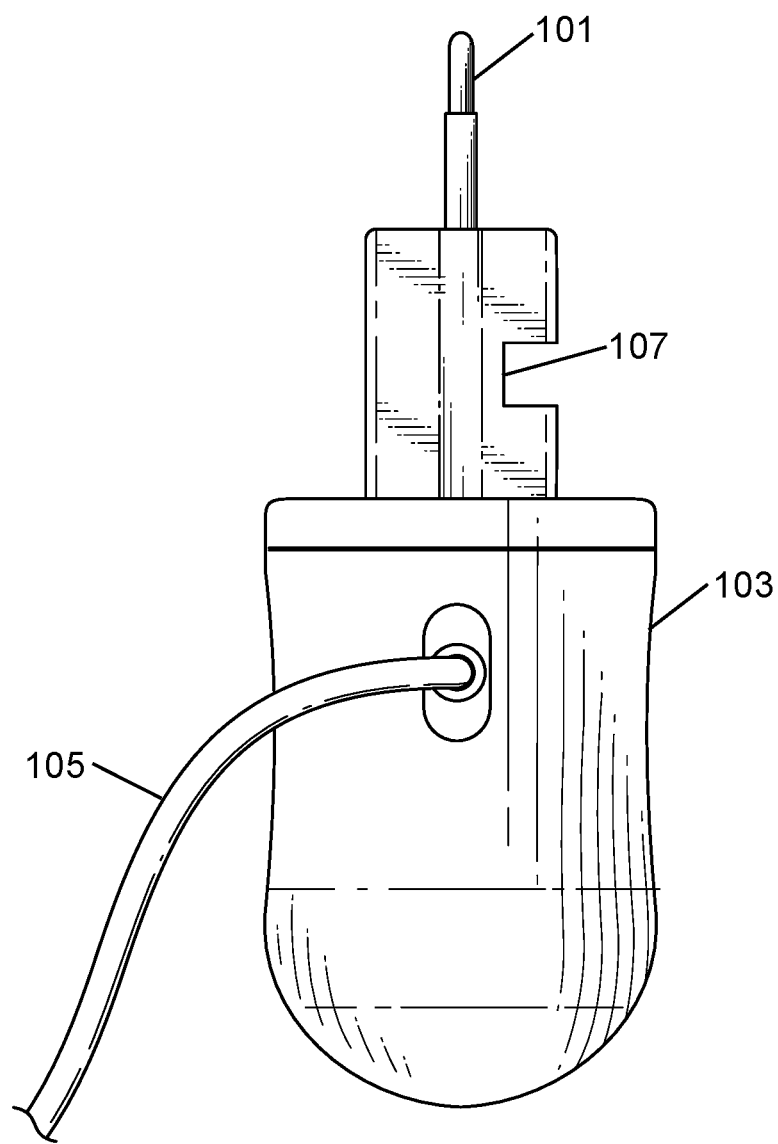
FIG. 2 depicts a side view of FIG. 1 embodiments of the present invention.

FIG. 1 depicts top view of the 220 V electrical device charger with vertical channel type device holding slot, one of the embodiments of the present invention. FIG. 2 depicts side view of FIG. 1 embodiments of the present invention. An electrical device charger with means of holding a plurality of electrical devices (not shown in the picture) which comprises: a main unit/housing 103 with at least one holding slot 107; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107 in this embodiment is channel type and it is vertical. The holding slot 107 is located at the top side of the main unit 103. Further, the cable cord 105 is connected to the main unit 103 from one of the side. The pins 101 in the present embodiment are of round type (normally used for providing 220 V electrical power sources). The electrical devices can be held vertically in the holding slot 107, in an embodiment when it is of channel type, in which an electrical device can held securely. The electrical device charger with means of holding a plurality of electrical devices as per the present invention, wherein said electric power source may include, but not limited to, alternating current AC or DC direct current also referred as constant polarity directional electric power, and the connection to the electric power source may be a direct connection, via a DC adapter, or via a USB connection.

Figure 3:
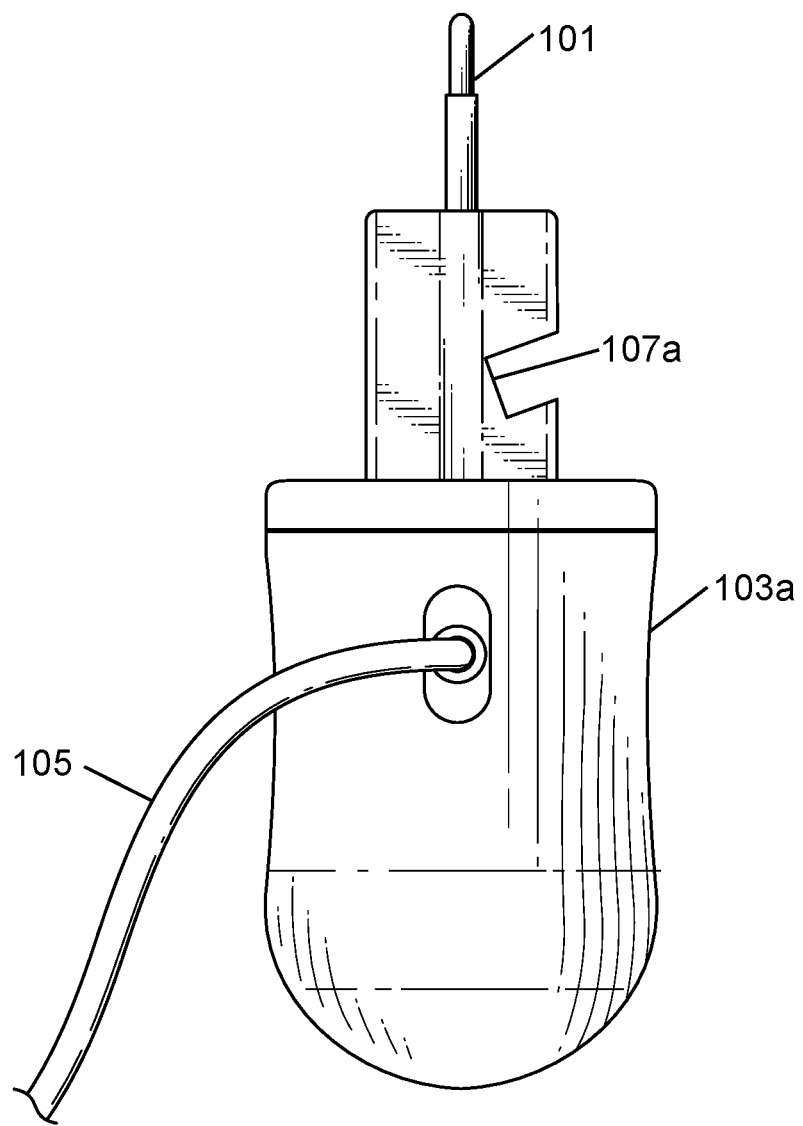
FIG. 3 depicts a side view of the electrical device charger (220 V electrical plug) with angled holding stopper in one of the embodiments of the present invention.

In an embodiment, as shown in FIG. 3, side view of the 220 V electrical device charger with angled channel type device holding slot. An electrical device charger with means of holding a plurality of electrical devices (not shown in the picture) which comprises: a main unit 103a with at least one holding slot 107a; a cable cord 105 for connecting main unit with said electrical devices; and Pins 101 for fitting said main unit 103a with an electric power source. The electrical device charger (i.e. main unit) in the present embodiment is 220 V electrical plug. The holding slot 107a in this embodiment is channel type and it is angled. This embodiment encourages the device being charged to lean against the wall near the electrical outlet. Among other considerations this promotes stability by moving the center of mass closer to the wall. The holding slot 107a is located at the top side of the main unit 103a. Further, the cable cord 105 is connected to the main unit 103a from one of the side. The pins 101 in the present embodiment are of round type (normally used for providing 220 V electrical power sources). The electrical devices can be held or on an angle in the holding slot 107a, in the present embodiment it is of channel type, in which an electrical device securely rests.

Figure 4:
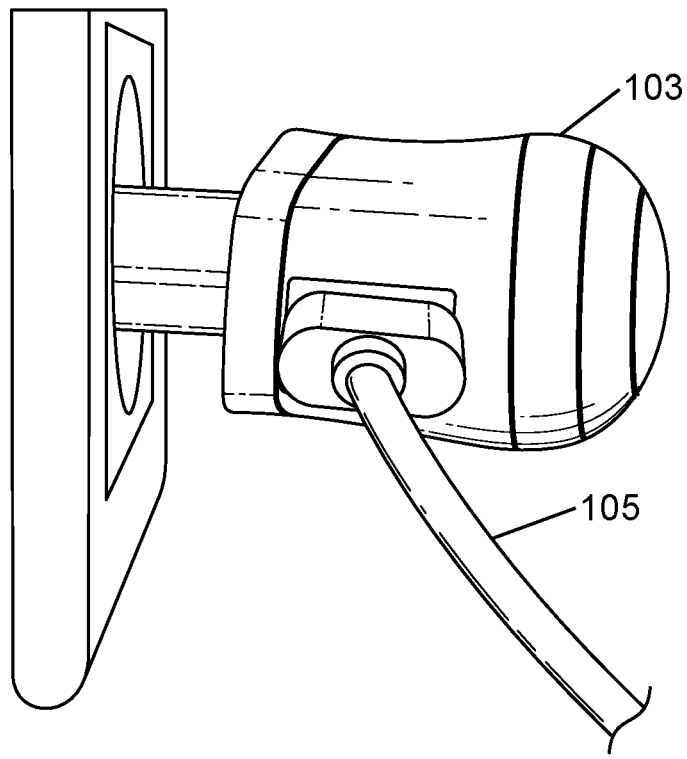
FIG. 4 depicts a 220 V electrical device charger with a cable cord according to prior art.
Figure 5:
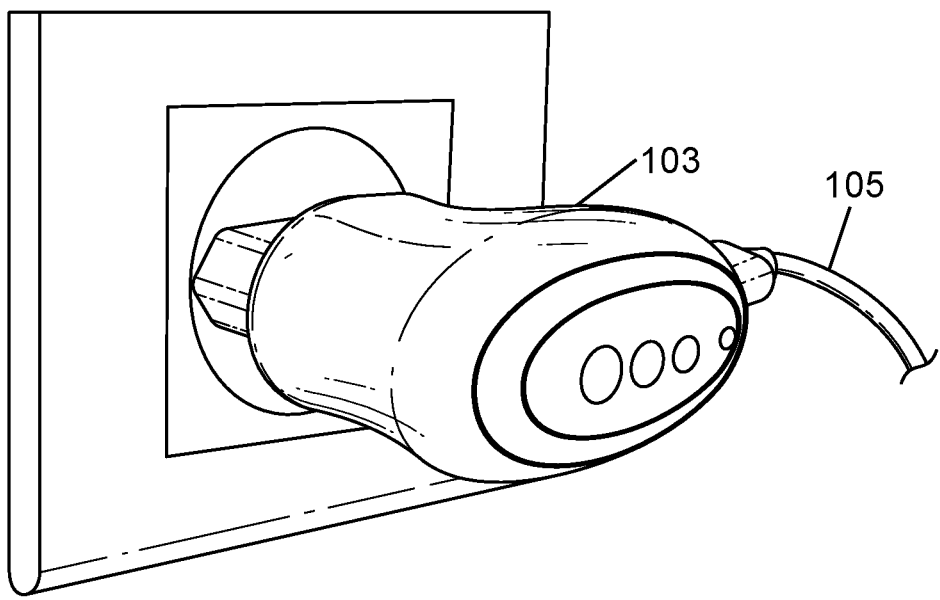
FIG. 5 depicts another 220 V electrical charger according to prior art.
Figure 6:
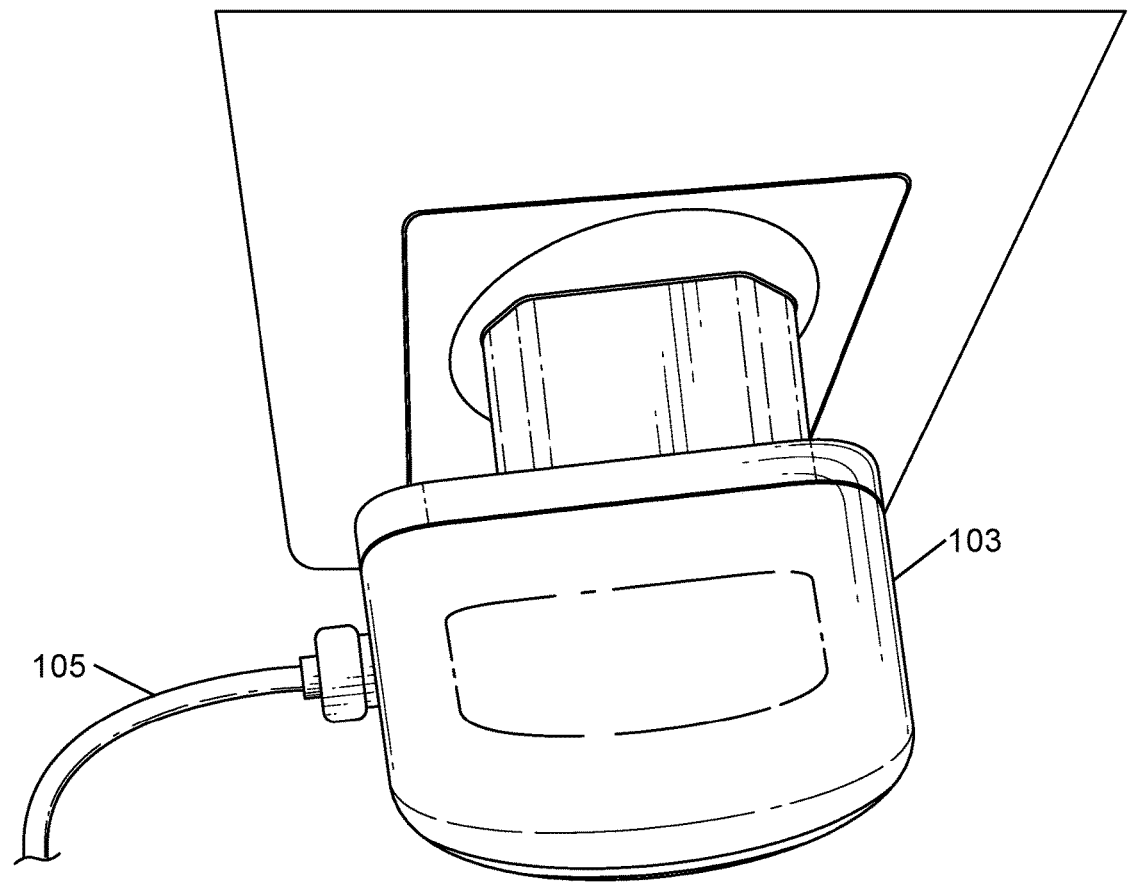
FIG. 6 depicts a top view of the 220 V electrical charger with a cable cord according to prior art.
Figure 7:
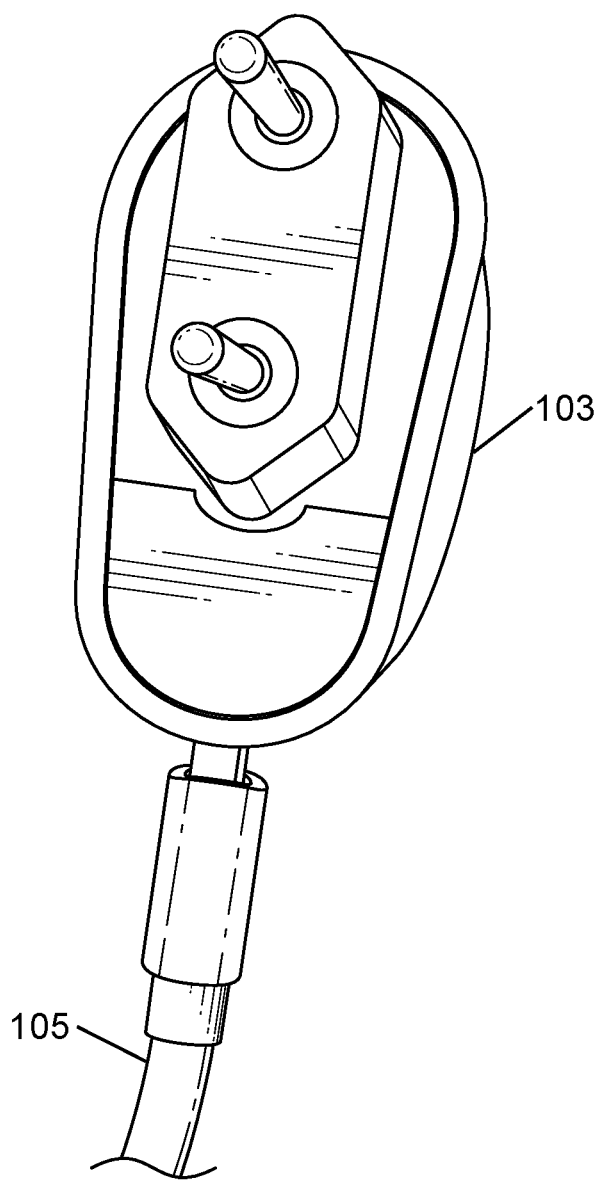
FIG. 7 depicts a frontal view of the 220 V electrical charger with a cable cord according to prior art.

FIGS. 4, 5, 6, and 7 depicts presently available 220 V electrical chargers in the market. 110 V electrical chargers may also have similar kinds of arrangements. FIG. 4 depicts 220 V electrical device charger with a cable cord according to prior art. FIG. 5 depicts another 220 V electrical charger according to prior art. FIGS. 6 and 7 depicts top view and frontal perspective view of the 220 V electrical charger with a cable cord according to prior art, respectively.

Figure 8:
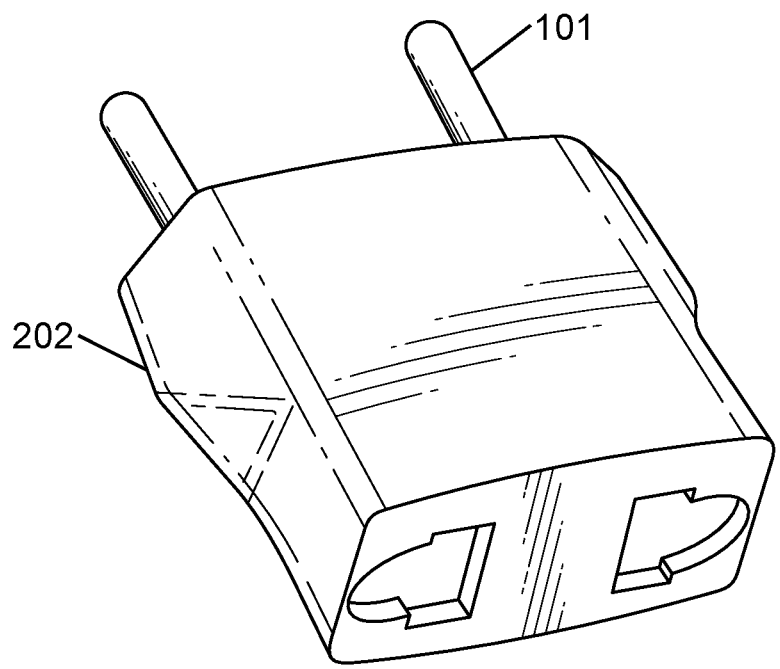
FIG. 8 depicts a 220 V electrical adapter having socket arrangement for normal 110 V electrical plug.

FIG. 8 depicts perspective view (from front side raised) of the 220 V electrical adapter having socket arrangement for 110 V electrical plug. In an embodiment, as shown in the FIG. 9, the 220 V electrical adapter having a holding slot and a socket arrangement for 110 V electrical plug (from front side raised). The electrical device charger 202 (i.e. main unit) in the present embodiment is 220 V electrical adapter. The 220 V electrical adapter 202 has socket arrangement at the front side of the unit to which 110 V flat pin electrical plug can be attached (optionally, there is also possibility of making an arrangement to have socket to which 220 V electrical plug can fit). The holding slot 207 in this embodiment is channel type and it is vertical. The holding slot 207 is located at the top side of the main unit 202. The pins 101 in the present embodiment are of round type (normally used for providing 220 V electrical power sources). The electrical devices can be held or on an angle in the holding slot 207, in the present embodiment it is of channel type, in which an electrical device is securely held.

Figure 10:
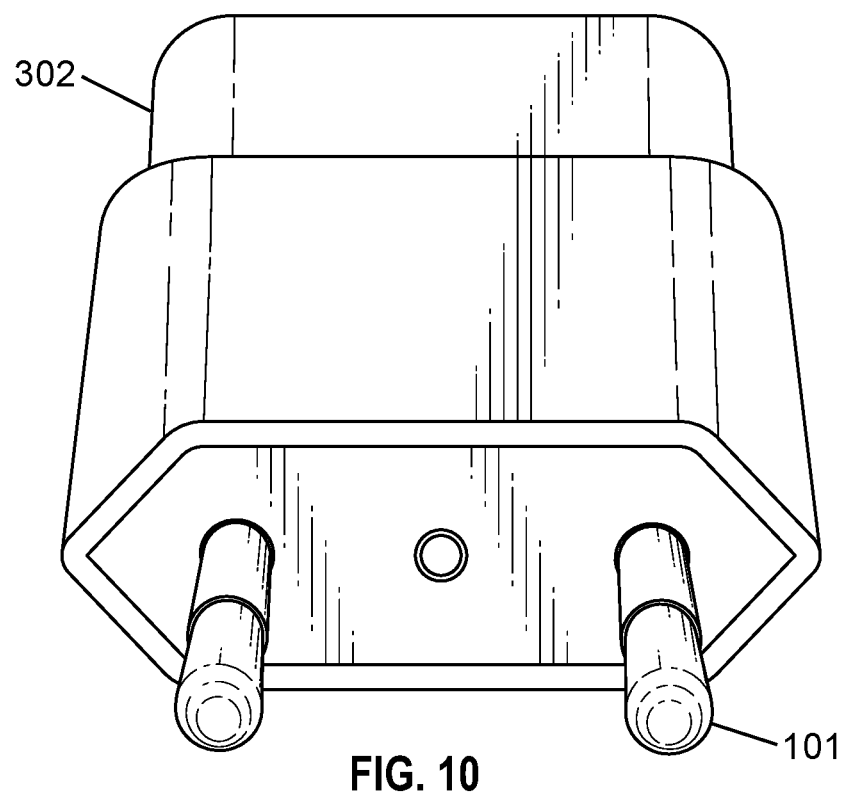
FIG. 10 depicts an another 220 V electrical adapter having socket arrangement for normal 110 V electrical plug.
Figure 11:
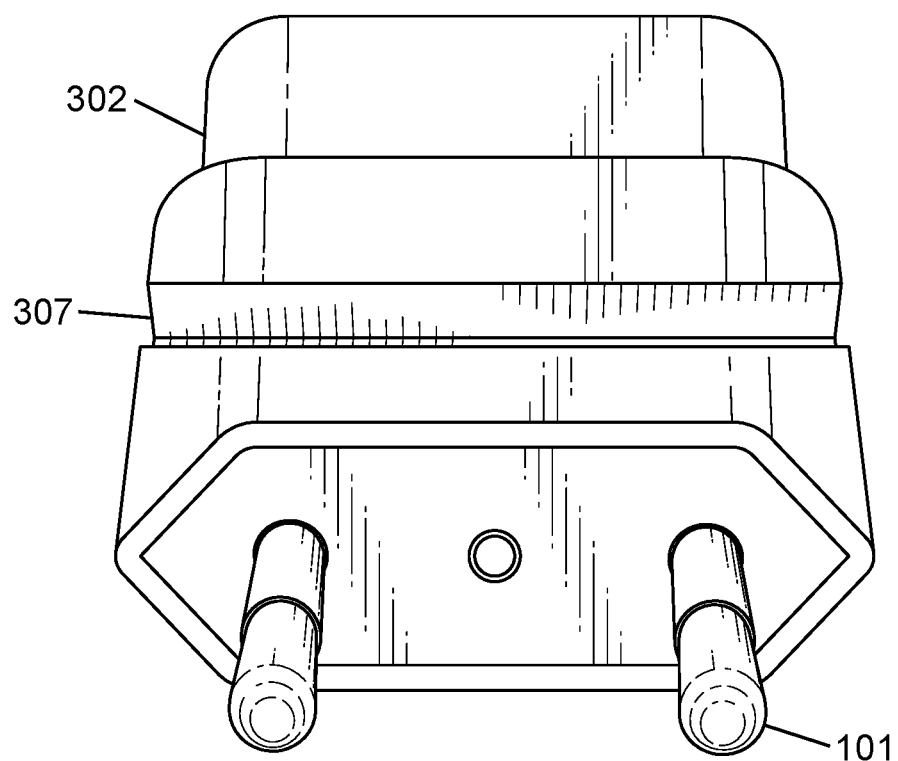
FIG. 11 depicts an elevated end view of another 220 V electrical adapter having embodiment of device holding stopper and a socket arrangement for 110 V electrical plug according to one of the embodiments of the present invention.

FIG. 10 depicts perspective view (from rear side elevated) of the 220 V electrical adapter having socket arrangement for 110 V electrical plug. In an embodiment, as shown in the FIG. 11, the 220 V electrical adapter having a holding slot and a socket arrangement for 110 V electrical plug (from rear side elevated). The electrical device charger 302 (i.e. main unit) in the present embodiment is 220 V electrical adapter. The 220 V electrical adapter 302 has socket arrangement at the front side of the unit to which 110 V flat pin electrical plug can be attached (optionally, there is also possibility of making an arrangement to have socket to which 220 V electrical plug can fit). The holding slot 307 in this embodiment is a channel type and it is vertical. The holding slot 307 is located at the top side of the main unit 302. The pins 101 in the present embodiment are of round type (normally used for providing 220 V electrical power sources). The electrical devices can held vertically or on an angle in the holding slot 307, in the present embodiment it is of channel type, in which an electrical device, which is being charged, can held securely.

Figure 12:
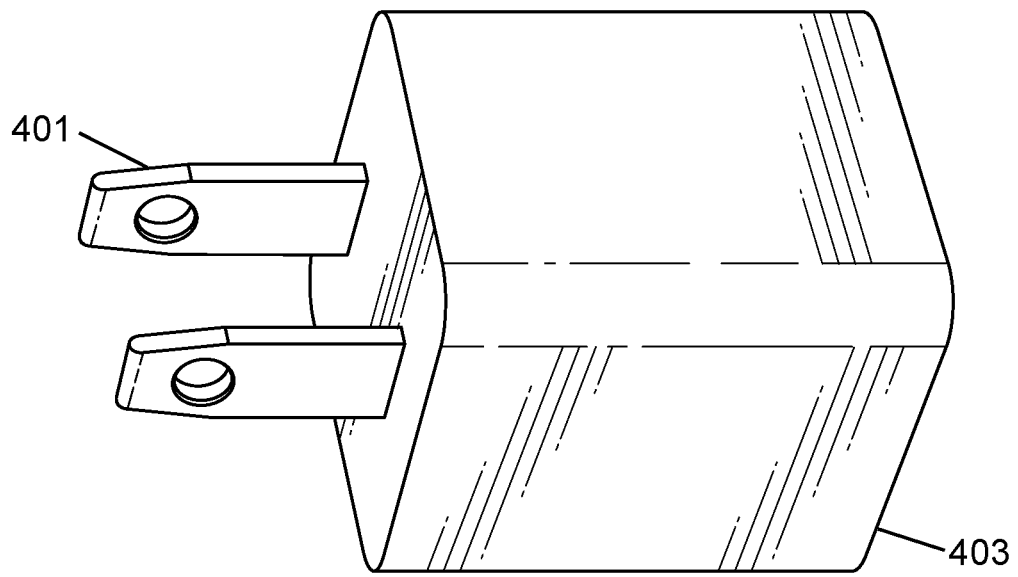
FIG. 12 depicts a 110 V electrical plug for charging electrical device (USB is in rear view—not shown).
Figure 13:
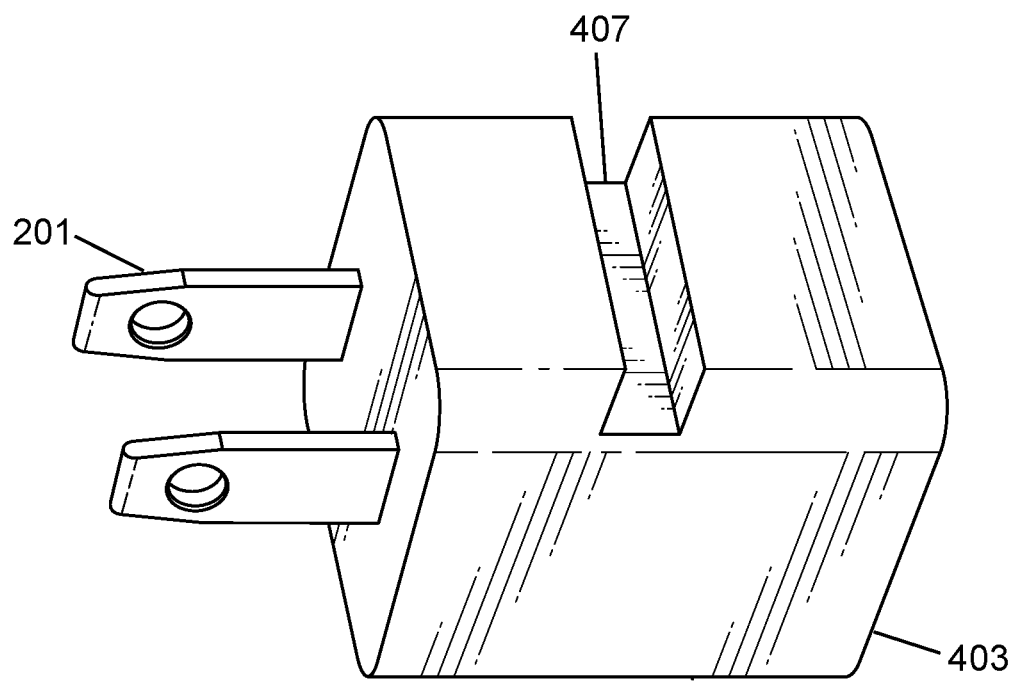
FIG. 13 depicts an isometric view of 110 V electrical plug having an embodiment of a vertical channel.
Figure 14:
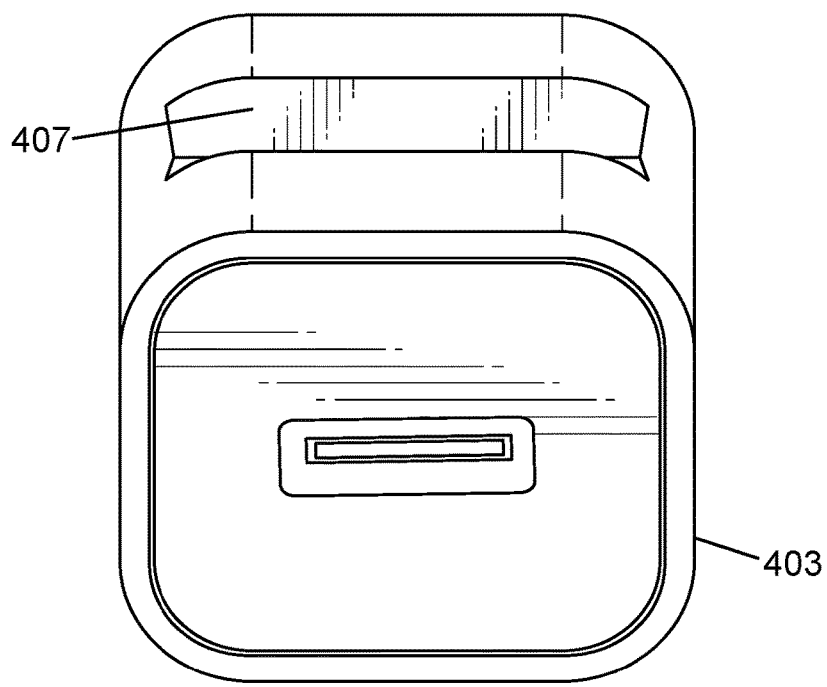
FIG. 14 depicts a rear elevated view of FIG. 13 according to one of the embodiments of the present invention.
Figure 15:
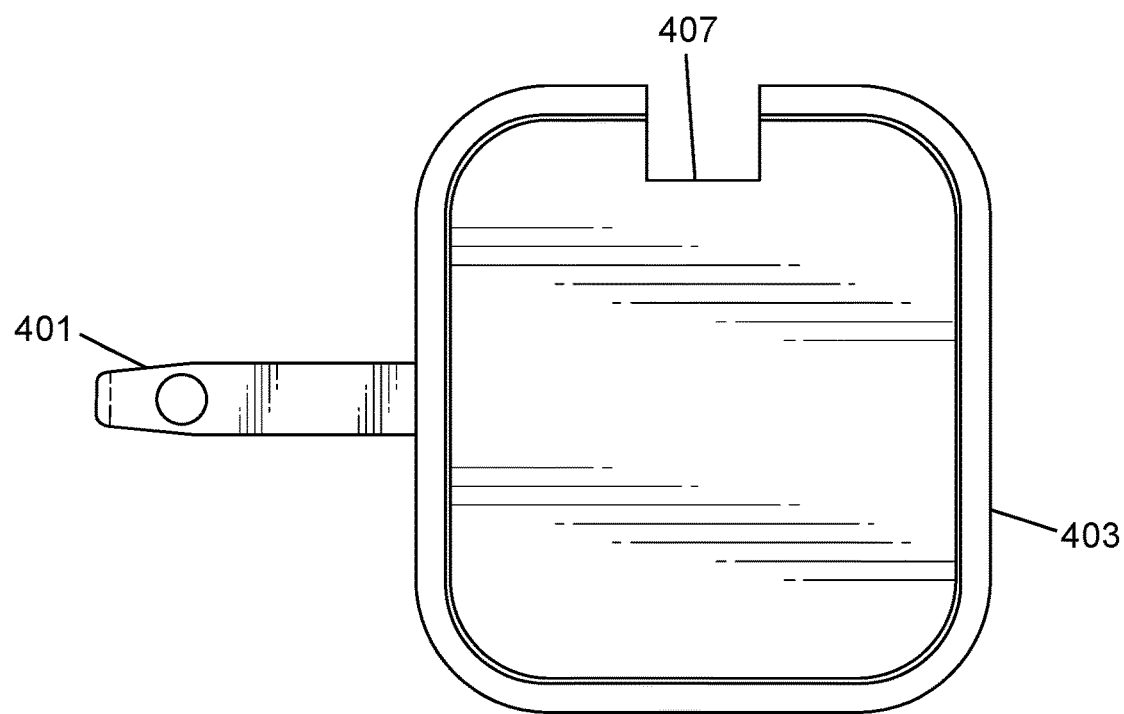
FIG. 15 depicts a side view of FIG. 13 according to one of the embodiments of the present invention.

FIG. 12 depicts perspective view of 110 V electrical plug. In an embodiment, FIGS. 13 to 15, shows different views of 110 V electrical plug having a holding slot on top of the electrical plug. An electrical device charger with means of holding a plurality of electrical devices (not shown in the picture) which comprises: a main unit 403 with at least one holding slot 407; and Pins 201 for fitting said main unit 403 with an electric power source. The electrical device charger (i.e. main unit) in the present embodiment is 110 V electrical plug. The holding slot 407 in this embodiment is channel type and it is vertical. The holding slot 407 is located at the top side of the main unit 403. Further, the cable cord (not shown) can be connected to the main unit 403 from front side (see. FIG. 14). The pins 201 in the present embodiment are of round type (normally used for providing 110 V electrical power sources). The electrical devices can be held vertically in the holding slot 307, in the present embodiment it is of channel type, in which an electrical device is securely placed.

Figure 16:
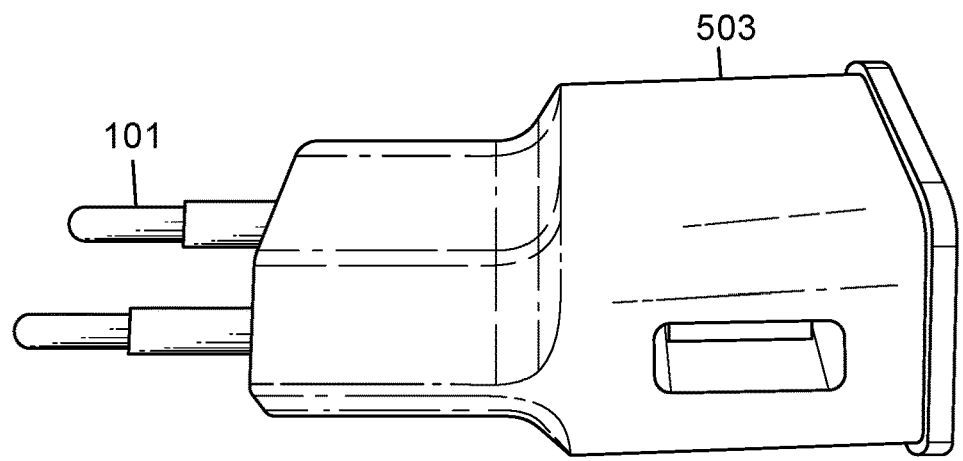
FIGS. 16 and 17 depicts an elevated side view and elevated rear view of 220 V electrical plug.
Figure 17:
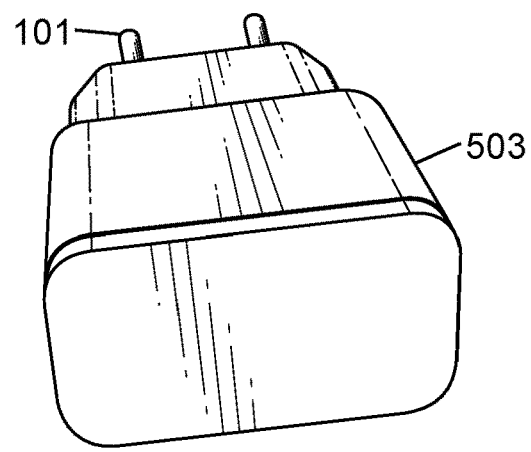
Figure 18:
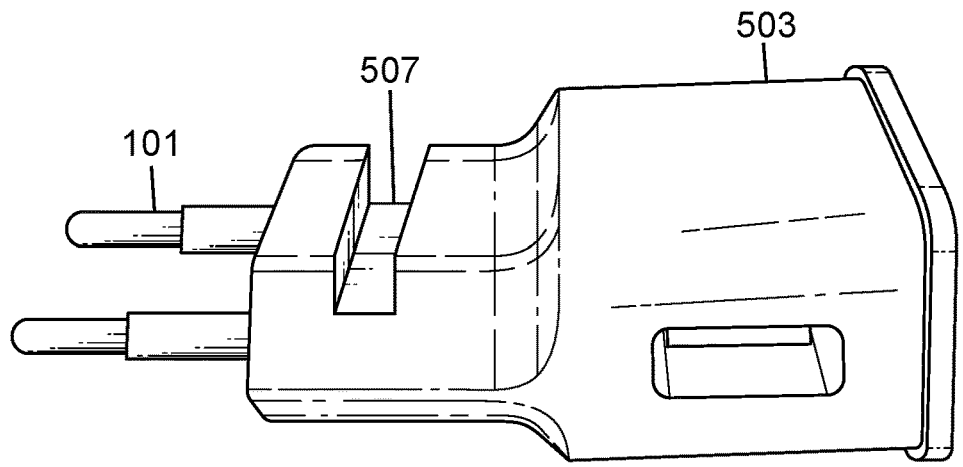
FIG. 18 depicts an elevated side view of the 220 V electrical plug having an embodiment of vertical holding stopper.

FIGS. 16 and 17 depicts elevated side view and elevated rear view of 220 V electrical plug. In an embodiment, FIG. 18 depicts perspective view of the 220 V electrical plug according to one of the embodiments of the present invention. Another different type of the 220 V electrical charger 503 with at least one holding slot 507; and Pins 101 for fitting said main unit 503 with an electric power source. The electrical device charger (i.e. main unit) in the present embodiment is 220 V electrical plug. The holding slot 507 in this embodiment is channel type and it is vertical. The holding slot 507 is located at the top side of the main unit 503. Further, the cable cord (not shown) can be connected to the main unit 503 from front side (see. FIG. 14). The pins 101 in the present embodiment are of round type (normally used for providing 220 V electrical power sources). The electrical devices can be held vertically in the holding slot 507, in the present embodiment it is of channel type, in which an electrical device is securely placed.

Figure 19:
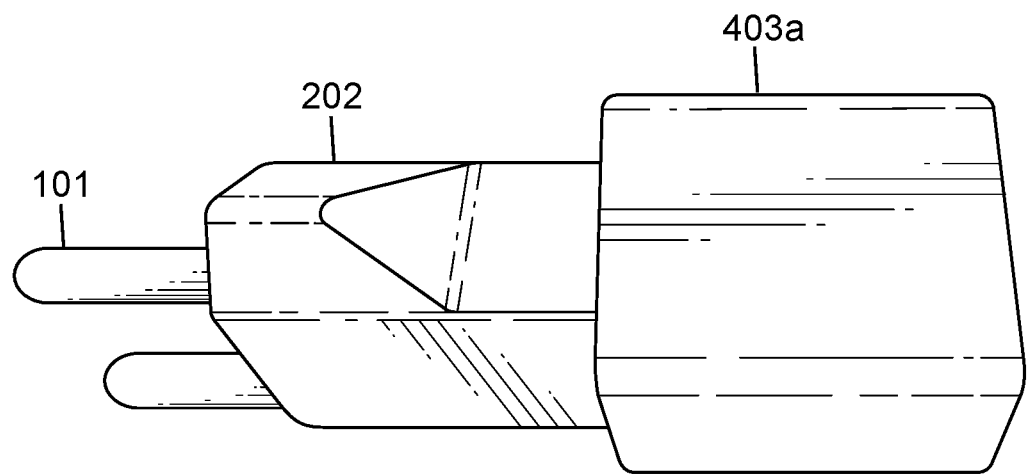
FIG. 19 depicts an elevated side view of the normal assembled arrangement including 220 V electrical adapter and 110 V electrical plug.
Figure 20:
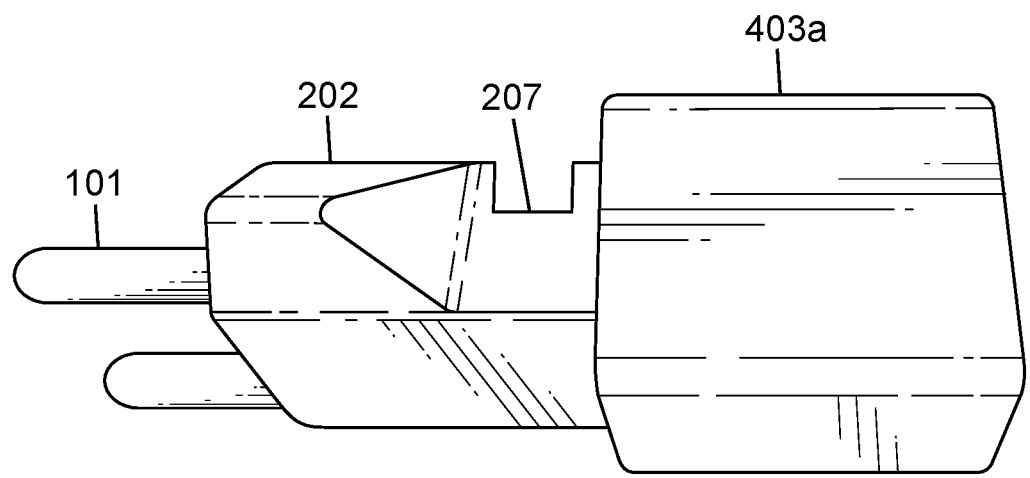
FIG. 20 depicts an elevated side view of the assembled arrangement including 220 V electrical adapter and 110 V electrical plug having an embodiment of a device holding stopper.

FIG. 19 depicts elevated side view of the assembled arrangement including a 220 V electrical adapter/housing and 110 V electrical plug/housing. In an embodiment, FIG. 20 depicts elevated side view of the assembled arrangement including 220 V electrical adapter and 110 V electrical plug having embodiment of device holding slot according to one of the embodiments of the present invention. The electrical device charger in the present embodiment is 220 V electrical adapter 202 and 110 V electrical plug 403*a*. The 220 V electrical adapter 202 has socket arrangement at the front side of the unit to which 110 V flat pin electrical plug 403*a* can be attached. The holding slot 207 in this embodiment is channel type and it is vertical. The holding slot 207 is located at the top side of 220 V electrical adapter 202 (alternatively one can also think another holding slot can located on top surface 110 V electrical plug 403*a*—not shown). The pins 101 in the present embodiment are of round type (normally used for providing 220 V electrical power sources). The electrical devices can be held vertically or angled in the holding slot 207. The present embodiment it is of channel type, in which an electrical device securely rests. The main difference between 110 V electrical plug 403 and 403*a* is that 403 has a device holding slot present which is absent in case of 403*a*.

Figure 21:
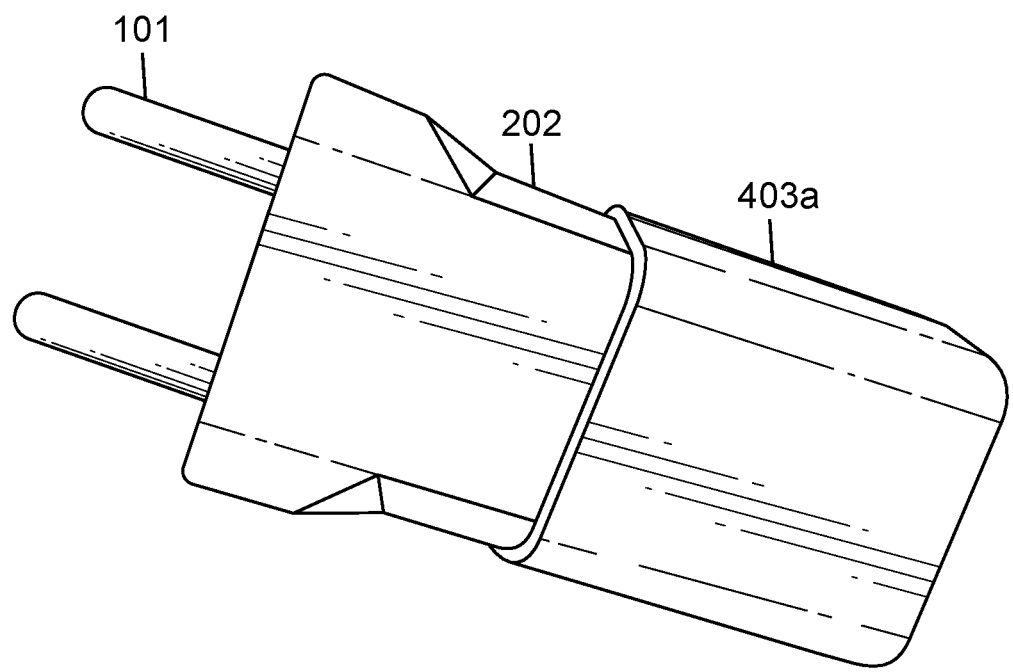
FIG. 21 depicts a top view of the assembled arrangement including 220 V electrical adapter and 110 V electrical plug.
Figure 22:
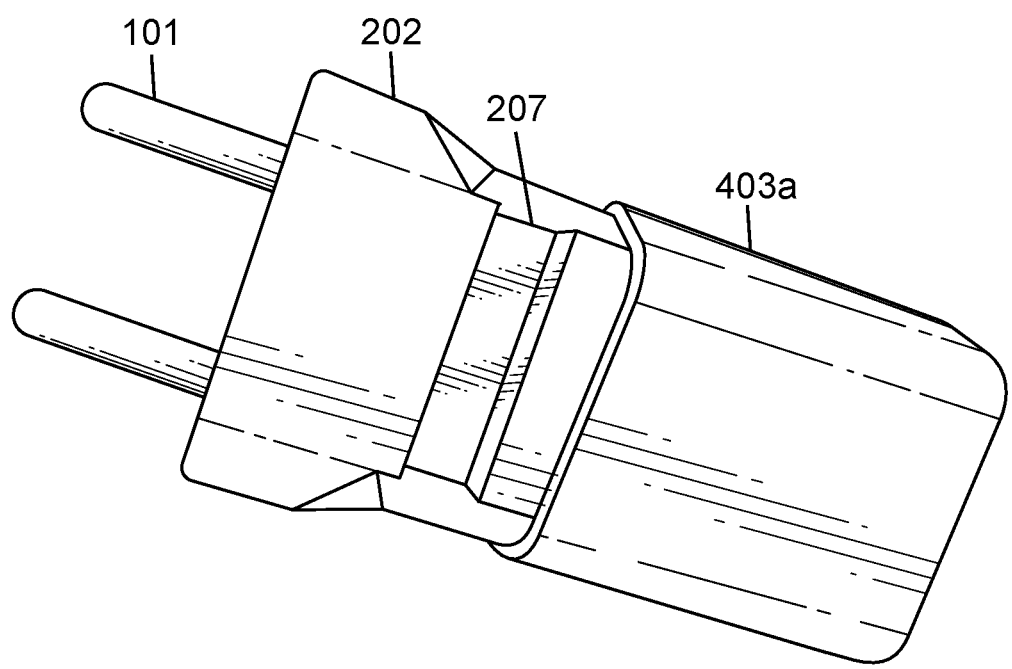
FIG. 22 depicts a top view of the assembled arrangement including 220 V electrical adapter and 110 V electrical plug having an embodiment of device holding stopper.

FIG. 21 depicts top view of the assembled arrangement including 220 V electrical adapter and 110 V electrical plug. In an another embodiment, FIG. 22 depicts top view of the assembled arrangement including 220 V electrical adapter and 110 V electrical plug having embodiment of device holding slot according to one of the embodiments of the present invention. FIG. 22 can be described as same way as that of the FIG. 20 description (above).

Figure 23:
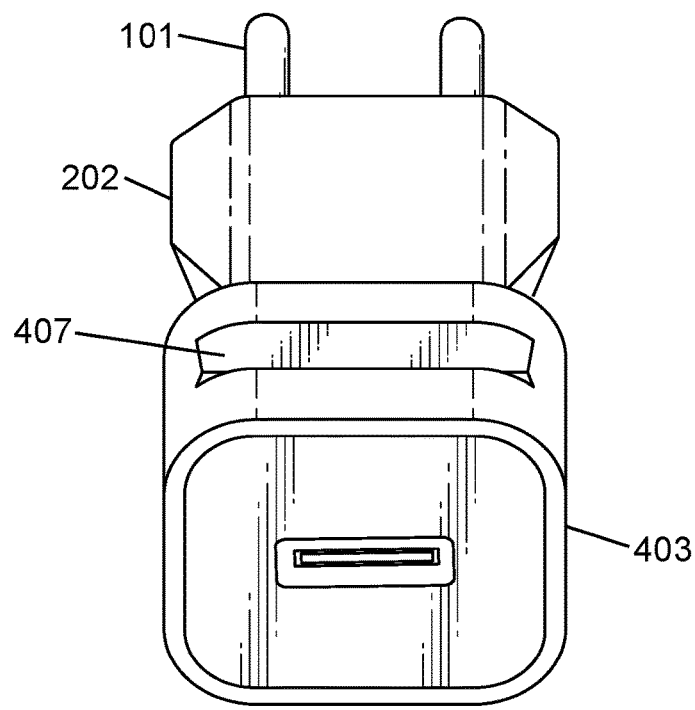
FIG. 23 depicts an elevated rear view of the assembled 220 V adapter and 110 V electrical plug with an embodiment of a device holder channel on a 110 V electrical plug.

In an embodiment, FIG. 23 shows perspective view (from the rear side) of the assembled 220 v adapter and 110 v electrical plug with embodiment device holder slot on 110 v electrical plug. The electrical device charger in the present embodiment is 220 V electrical adapter 202 and 110 V electrical plug 403. The 220 V electrical adapter 202 has socket arrangement at the front side of the unit to which 110 V flat pin electrical plug 403 can be attached (optionally, there is also possibility of making an arrangement to have socket to which 220 V electrical plug can fit). The holding slot 407 in this embodiment is channel type and it is vertical. The holding slot 407 is located at the top side of 110 V electrical adapter 403. The pins 101 in the present embodiment are of round type (normally used for providing 220 V electrical power sources). The electrical devices can be held or on an angle vertically in the holding slot 407, in the present embodiment it is of channel type, in which an electrical device can sits inside.

Figure 24:
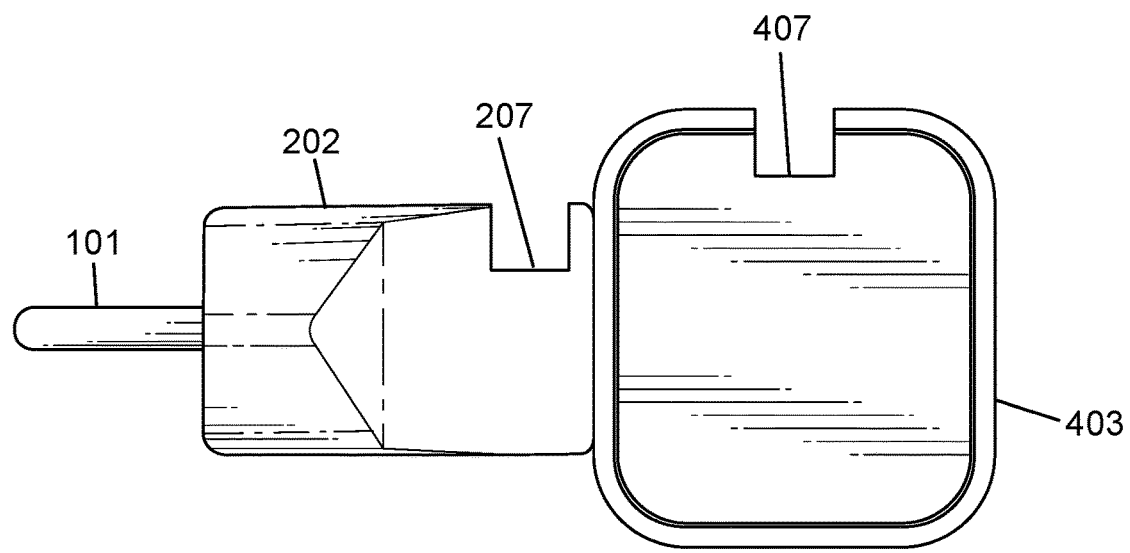
FIG. 24 depicts a side view of the assembled 220 V adapter plug and 110 V electrical plug each having two device holding channels (tandem application).

In an embodiment, FIG. 24 depicts side view of the assembled 220 V adapter plug and 110 V electrical plug each having embodiment device holder slot. The electrical device charger in the present embodiment is 220 V electrical adapter 202 and 110 V electrical plug 403. The 220 V electrical adapter 202 has socket arrangement at the front side of the unit to which 110 V flat pin electrical plug 403 can be attached (optionally, there is also possibility of making an arrangement to have socket to which 220 V electrical plug can fit). The present embodiment has two device holding slots. The device holding slots 207 and 407 in this embodiment are both device channel type and both are vertical. The first holding slot 207 is located at the top side of 220 V electrical adapter 202 and another device holding slot 407 is located at the top side of 110 V electrical plug 403. The pins 101 in the present embodiment are of round type (normally used for providing 220 V electrical power sources). The electrical devices can be held vertically or at an angle in the device holding slots 207 and 407, in the present embodiment it is of channel type, in which electrical devices (which is being charged) can held securely.

Figure 25:
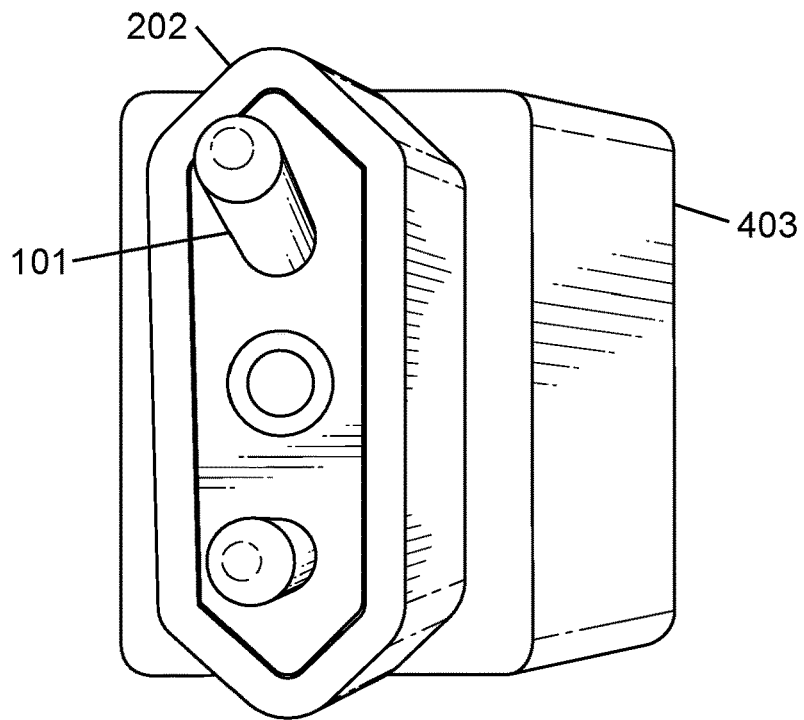
FIG. 25 depicts an end view (from rear side) of the assembled 220 V adapter plug and 110 V electrical plug.
Figure 26:
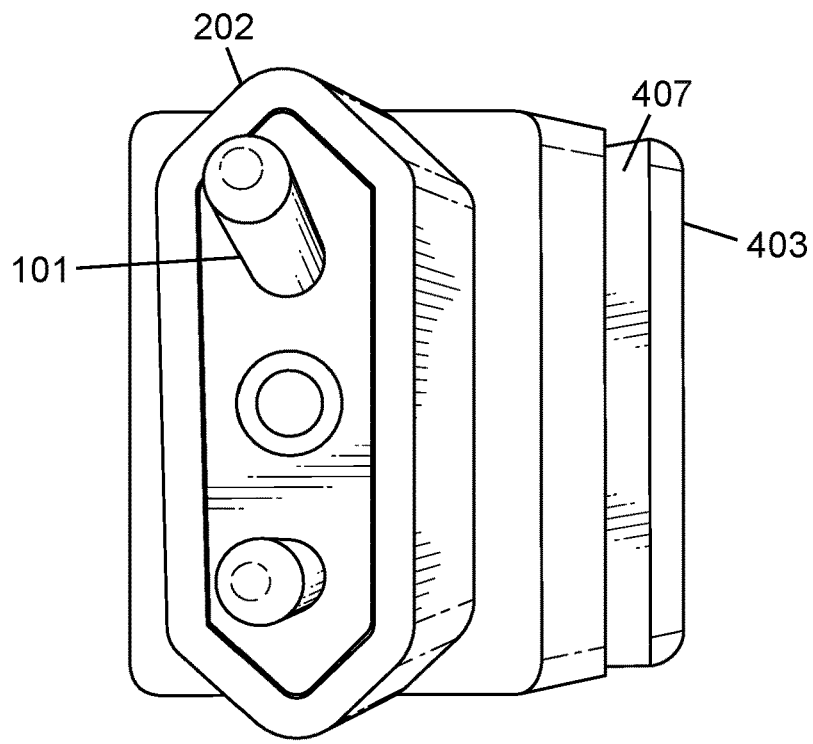
FIG. 26 depicts an end view (from rear side) of the assembled 220 V adapter plug and 110 V electrical plug with an embodiment device holder channel.

FIG. 25 depicts end view (from rear side) of the assembled 220 v adapter plug and 110 v electrical plug. In an embodiment, FIG. 26 depicts an end view (from rear side) of the assembled 220 v adapter plug and 110 v electrical plug with embodiment device holder slot. The assembled arrangement of FIG. 26 can be described same way as that earlier described assembly of FIG. 23.

Figure 27:
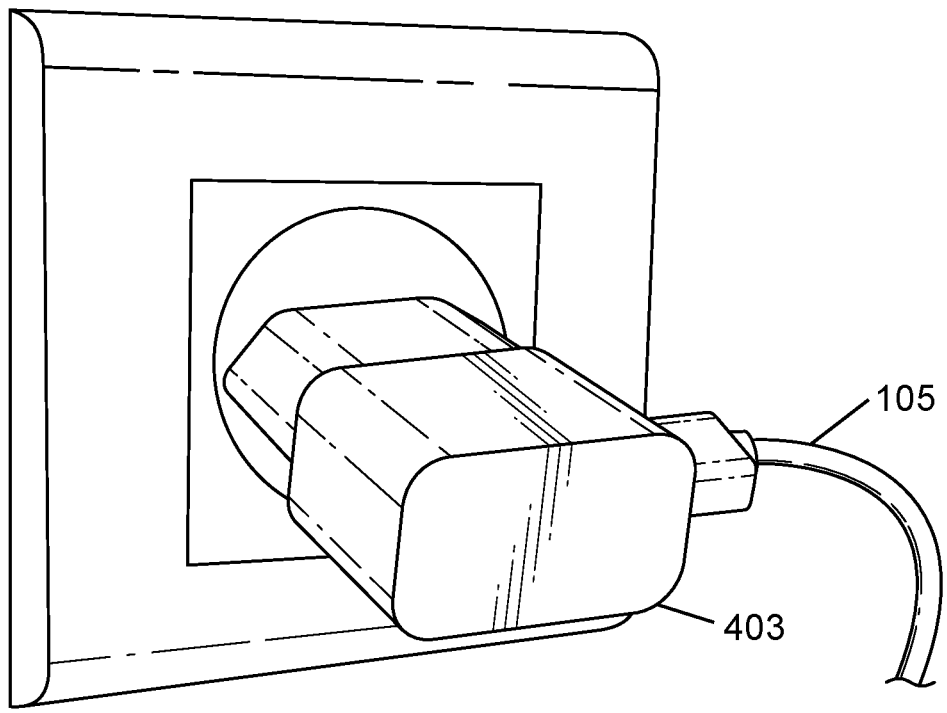
FIG. 27 depicts a view of the 220 V electrical plug mounted or connected on the electrical outlet.
Figure 28:
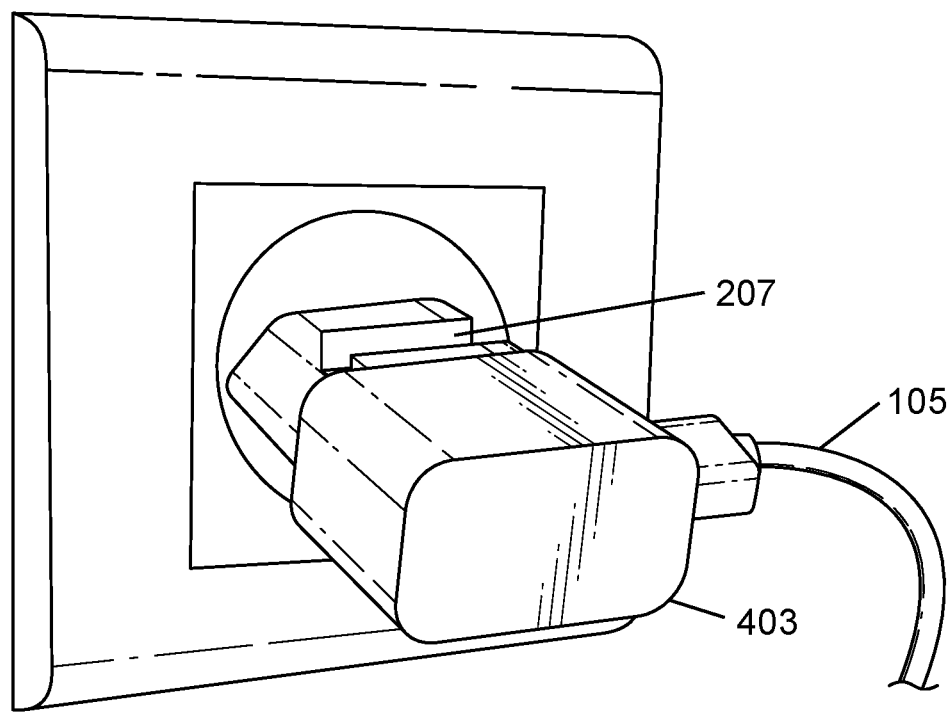
FIG. 28 depicts a view of the 220 V electrical plug having a device holding channel according to one of the embodiment of the present invention mounted on the electrical outlet.

FIG. 27 depicts view of the normal 220 V electrical plug mounted or connected on the electrical outlet. In an embodiment, FIG. 28 depicts view of the 220 V electrical plug having device holding slot according to one of the embodiment of the present invention connected or attached on the electrical outlet. Another different type of the 220 V electrical charger 403 with at least one holding slot 207; and a cable cord 105 for connecting main unit with said electrical devices. The electrical device charger in the present embodiment is 220 V electrical plug. The device holding slot 207 in this embodiment is channel type and it is vertical. The device holding slot 207 is located at the top side of the main unit 403. Further, the cable cord 105 can be connected to the main unit 403 from the side. The electrical devices can be held vertically in the holding slot 207, in the present embodiment it is of channel type, in which an electrical device can held securely. The FIG. 28 clearly shows that how the whole arrangement will look when the electrical charger 403 is connected or attached on the electrical outlet.

Figure 29:
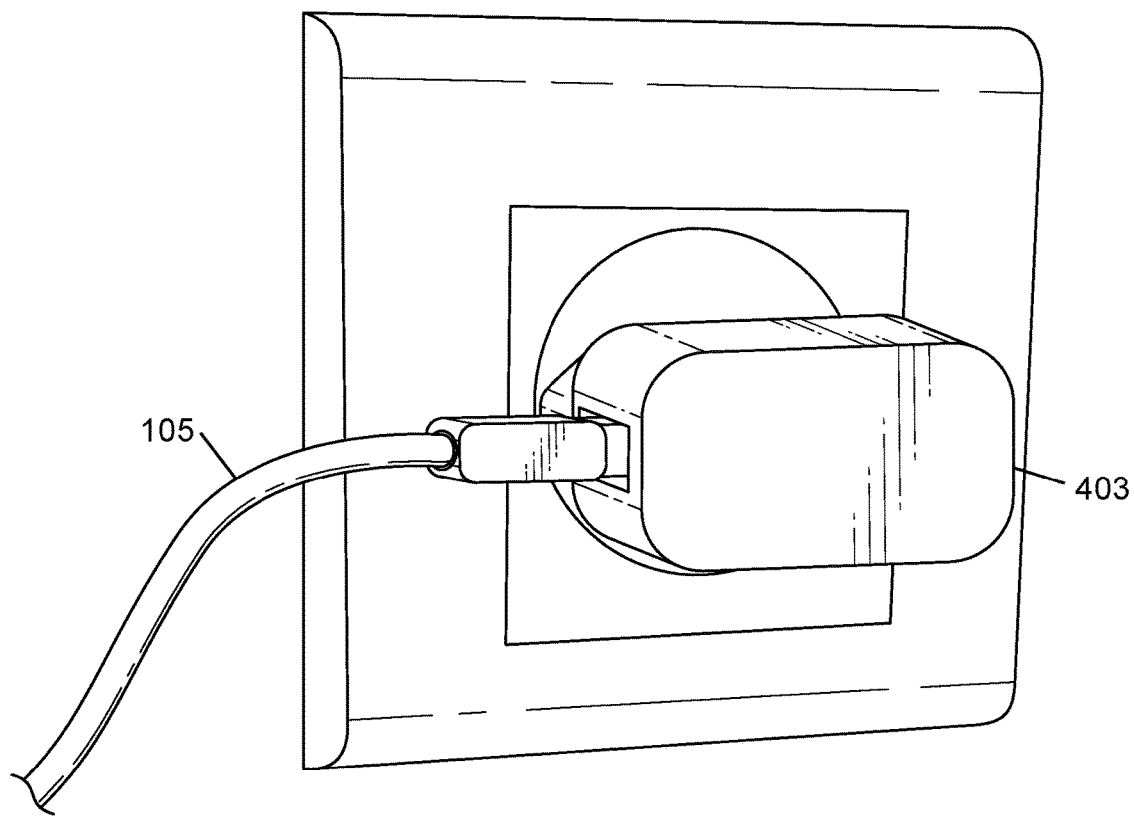
FIG. 29 depicts a view of the 220 V electrical plug in electrical outlet with a cable.
Figure 30:
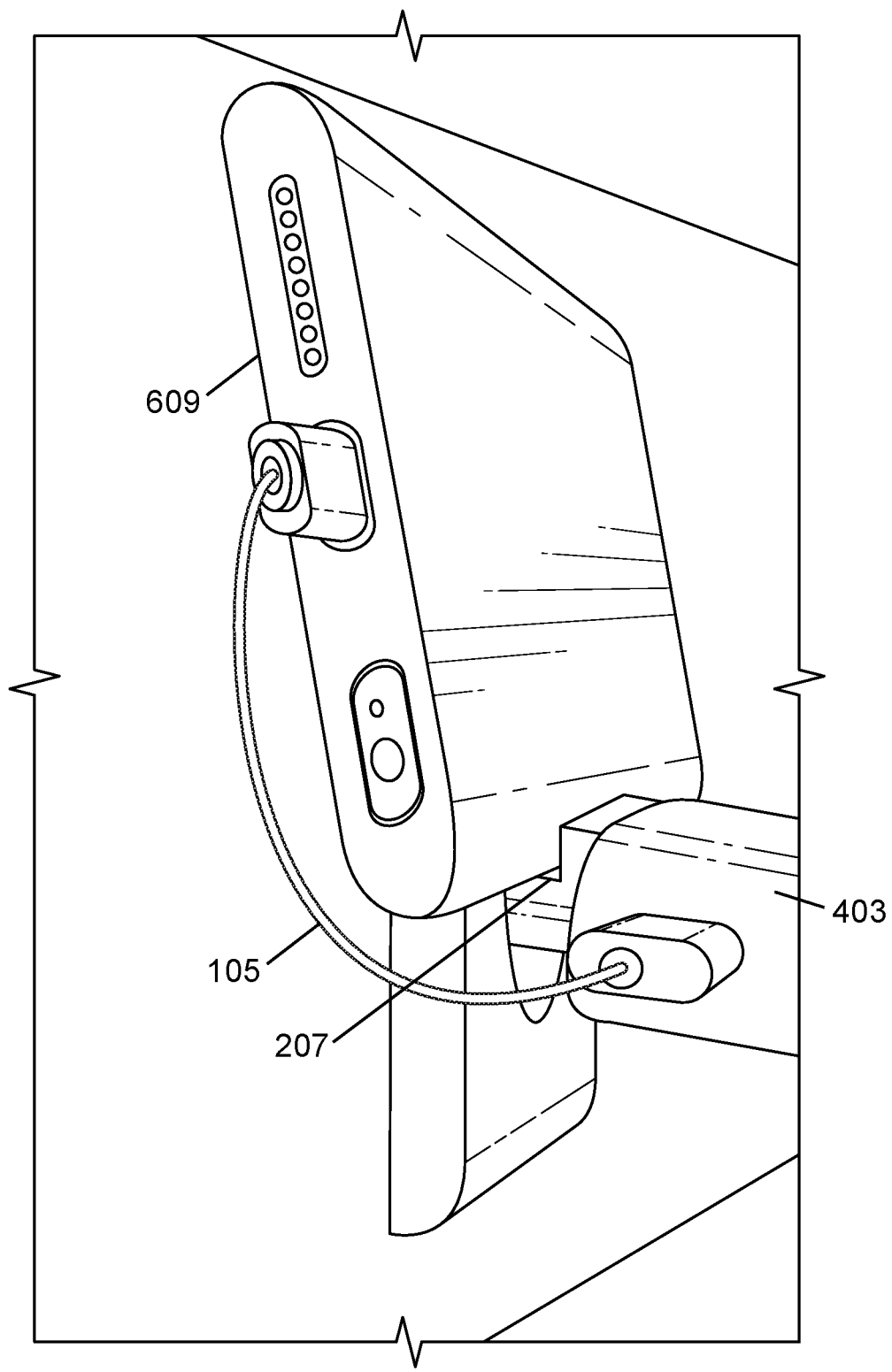
FIG. 30 depicts a view of the electrical device being charged with 220 V electrical plug having an embodiment of a device holding channel.

FIG. 29 depicts view of the 220 V electrical plug in electrical outlet with a cable cord. Further, in an embodiment, FIG. 30 depicts view of the electrical device being charged with 220 V electrical plug having embodiment of device holding slot. FIG. 30 has the same arrangement as discussed for FIG. 28. However, in this FIG. 30 an electrical device 609 is also shown for the clarity purpose. In this arrangement, the electrical device 609 is sitting on vertical holding slot 207, it is on an angle and leaning on the wall on the holding slot 207 and is connected to the electrical charger 403 via USB cable 105. Further, the electrical device 609 is power bank, which is being charged.

Figure 31:
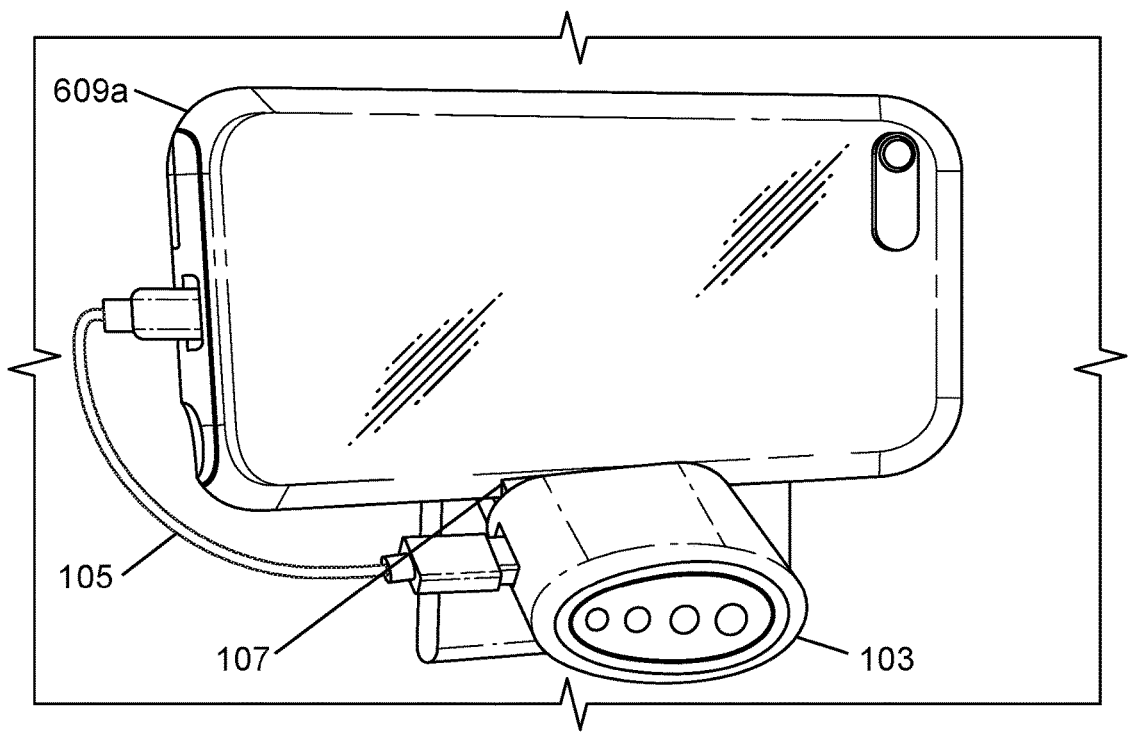
FIG. 31 depicts a perspective view of the electrical device being charged with 220 V electrical plug having an embodiment of a device holding channel.
Figure 32:
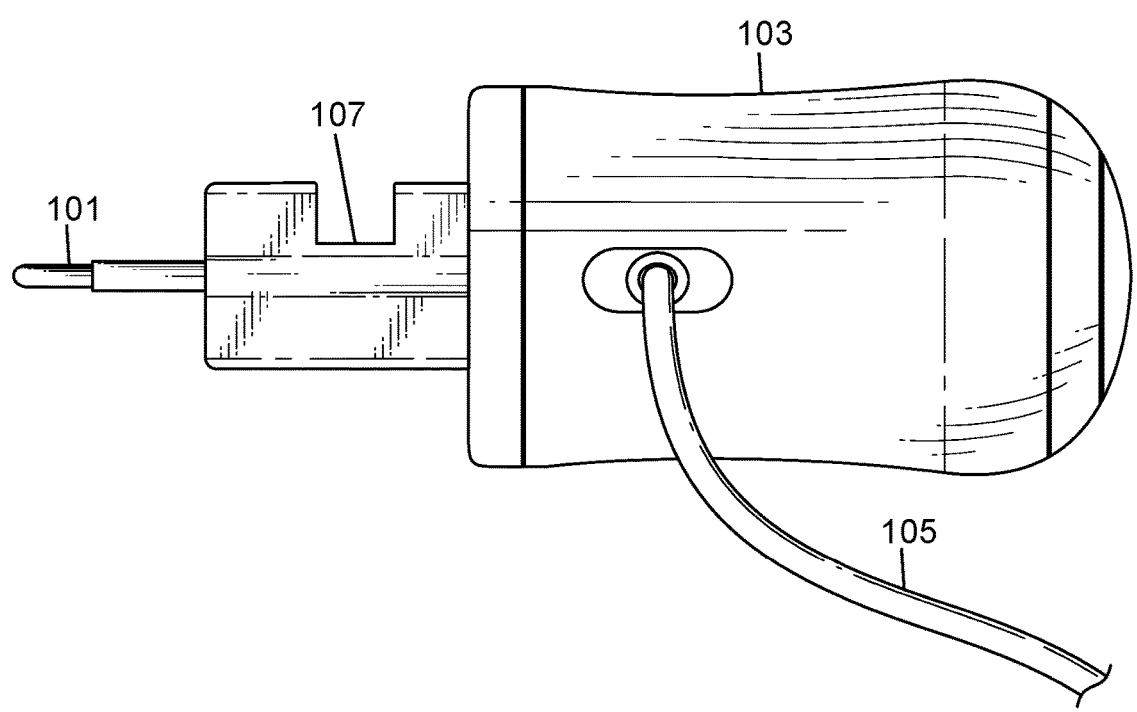
FIG. 32 depicts a side view of the electrical device charger (220 V electrical plug) with vertical device holding channel, one of the embodiments of the present invention.

In an embodiment, FIG. 31 depicts perspective view of the electrical device leaning against the wall being charged with 220 V electrical plug having embodiment of device holding slot. FIG. 32 has the same arrangement as discussed for FIG. 30. However, in this FIG. 32, the electrical device is mobile phone (or smart phone) and the electrical charger is (103) different type than shown in the FIG. 30.

Figure 33:
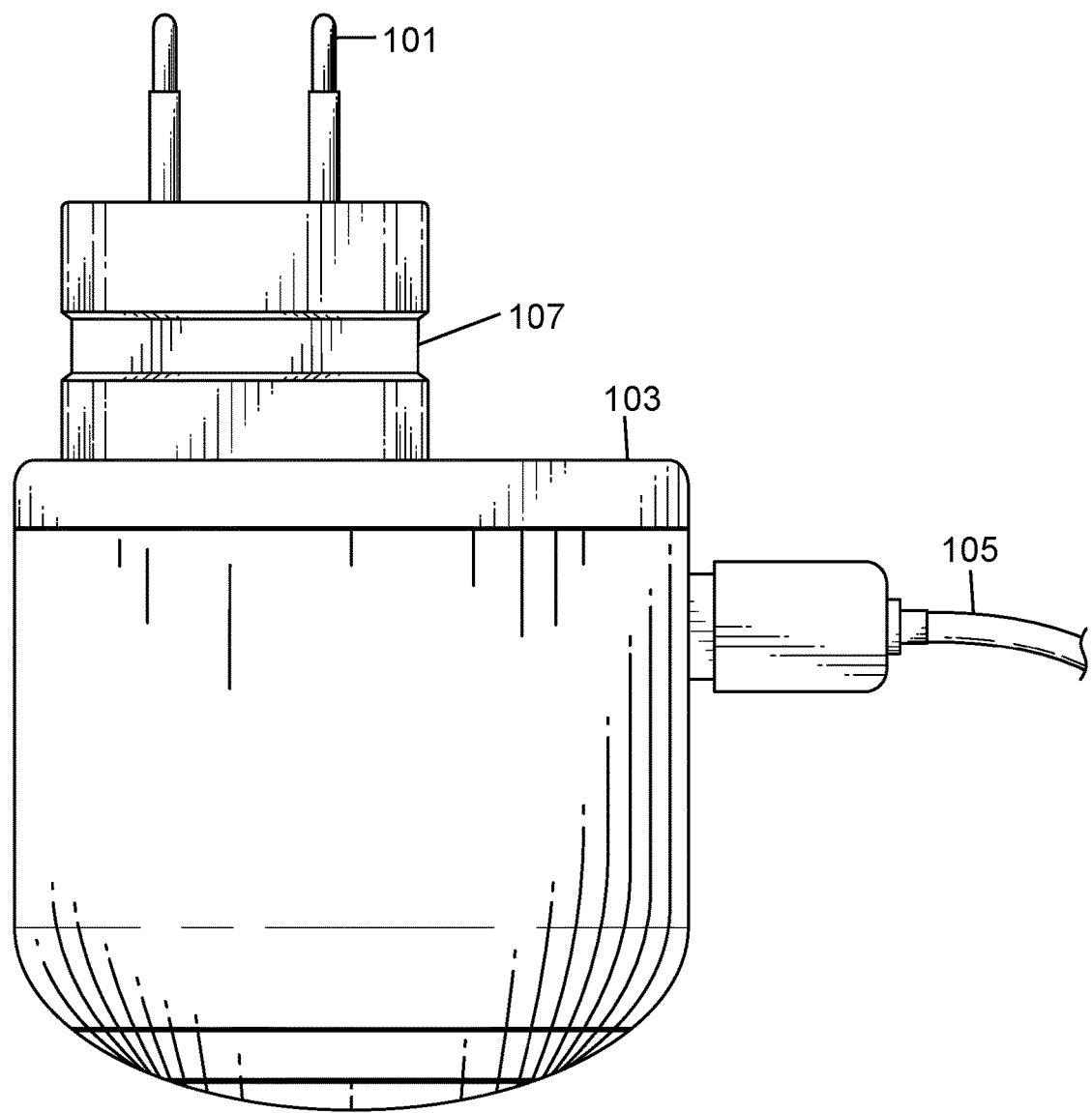
FIG. 33 depicts a top view of the electrical device charger (220 V electrical plug) with vertical holding channel of one of the embodiments of the present invention.

FIG. 32 and FIG. 33 depicts, side view and top view, respectively, of the electrical device charger (220 V electrical plug) with vertical channel type device holding slot, one of the embodiments of the present invention. An electrical device charger with means of holding a plurality of electrical devices (not shown in the picture) which comprises: a main unit 103 with at least one holding slot 107; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107 is channel type and it is vertical, but also includes a u-shaped portion having parallel opposite sides and slanted/tapered portions at an upper end of the parallel sides. The holding slot 107 is located along a top side of the main unit 103. Further, the cable cord 105 is connected to the main unit 103 from one of the side. The pins 101 in the present embodiment are of round type (normally used for providing 220 V electrical power sources). The electrical devices can be held vertically in the holding slot 107, in the present embodiment it is of channel type, in which an electrical device can held securely.

Figure 34A:
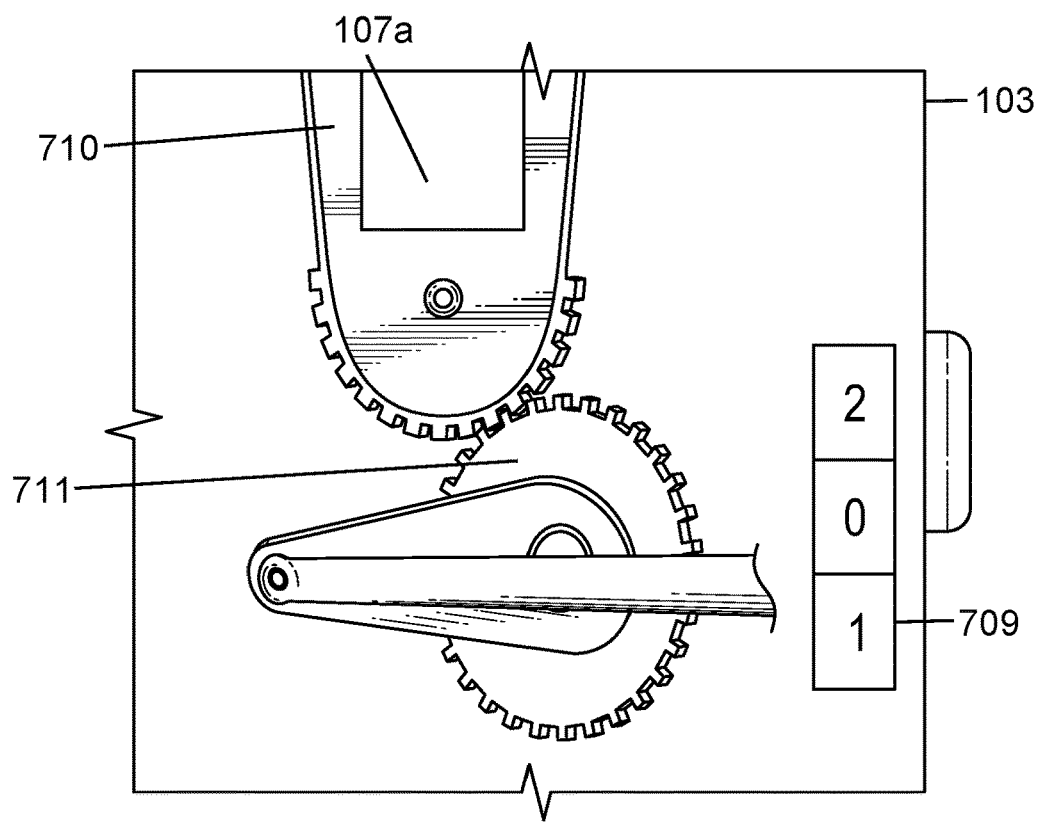
FIG. 34a depicts an adjustable device holding slot assembly mechanism in a vertical position.
Figure 34B:
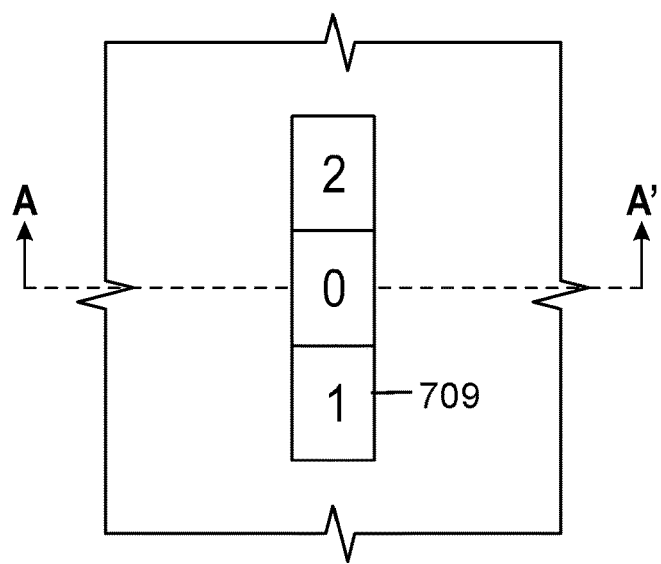
FIG. 34b depicts a dial for a adjustable device holding assembly mechanism in a vertical position.
Figure 35A:
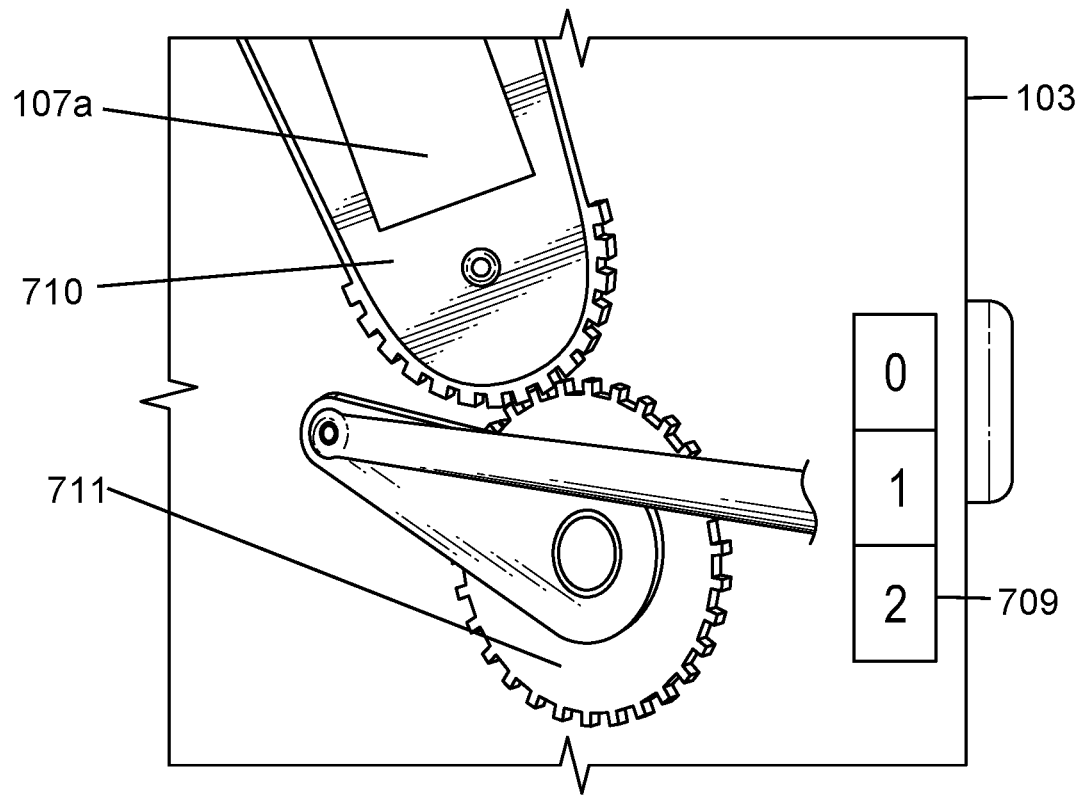
FIG. 35a depicts an adjustable device holding assembly with dial mechanism.
Figure 35B:
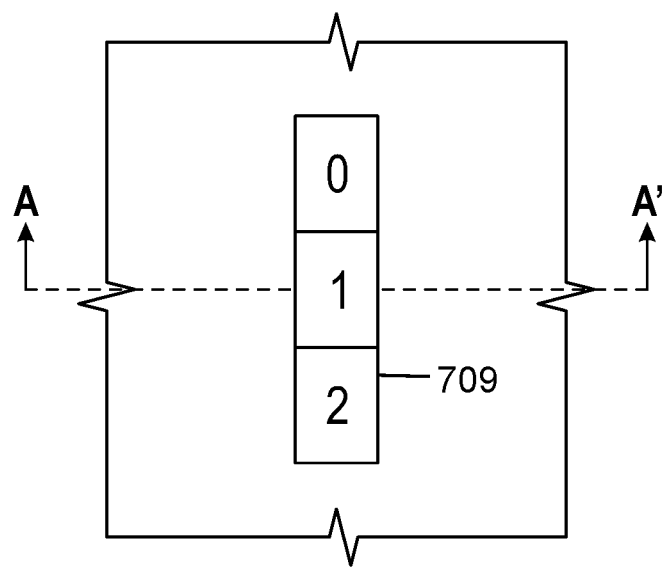
FIG. 35b depicts an adjustable dial for adjustable device holding assembly.
Figure 36:
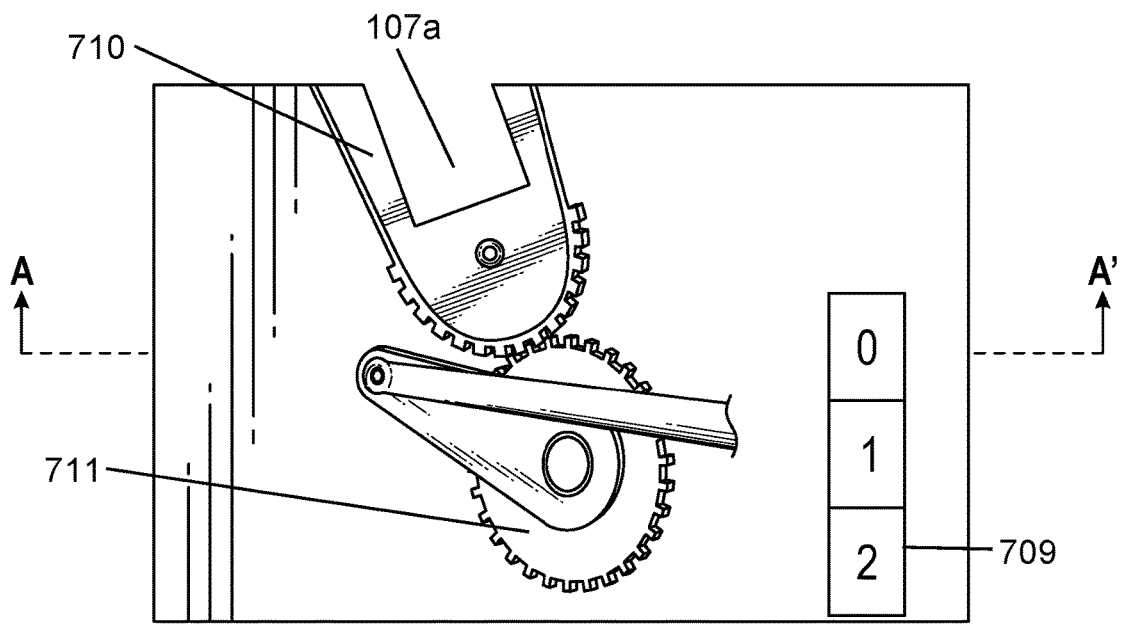
FIG. 36 depicts an adjustable device holding channel in an angled position.
Figure 37:
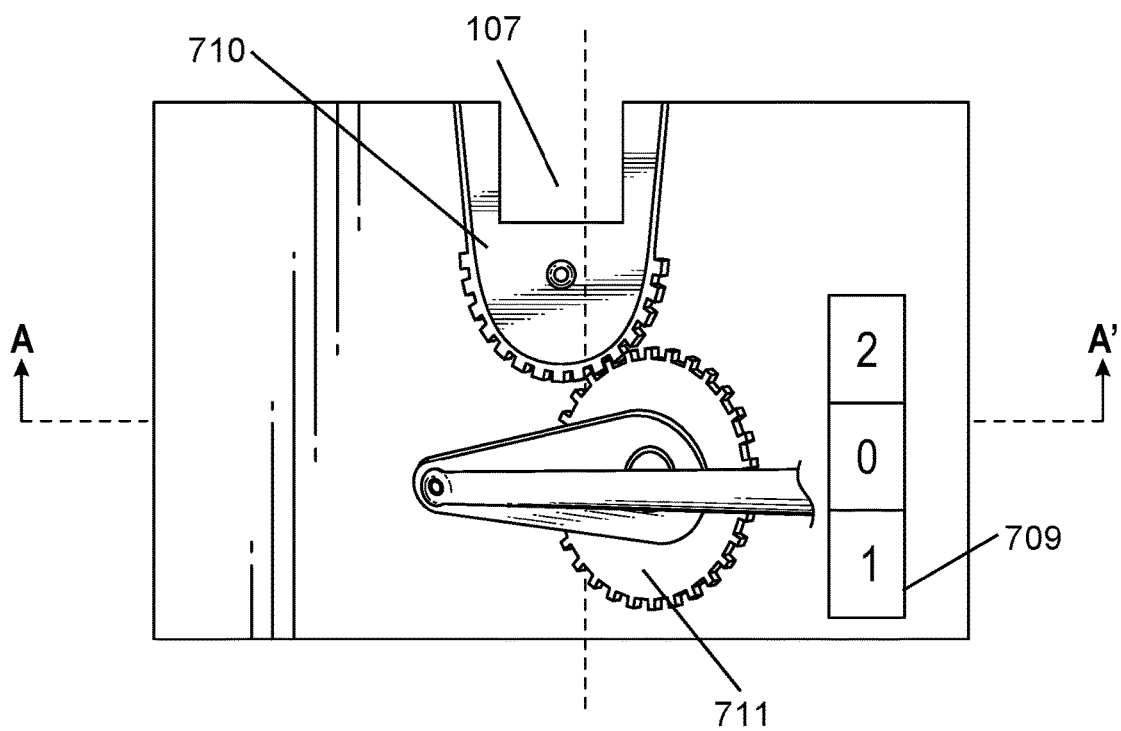
FIG. 37 depicts an adjustable device holding slot in vertical position.
Figure 38A:
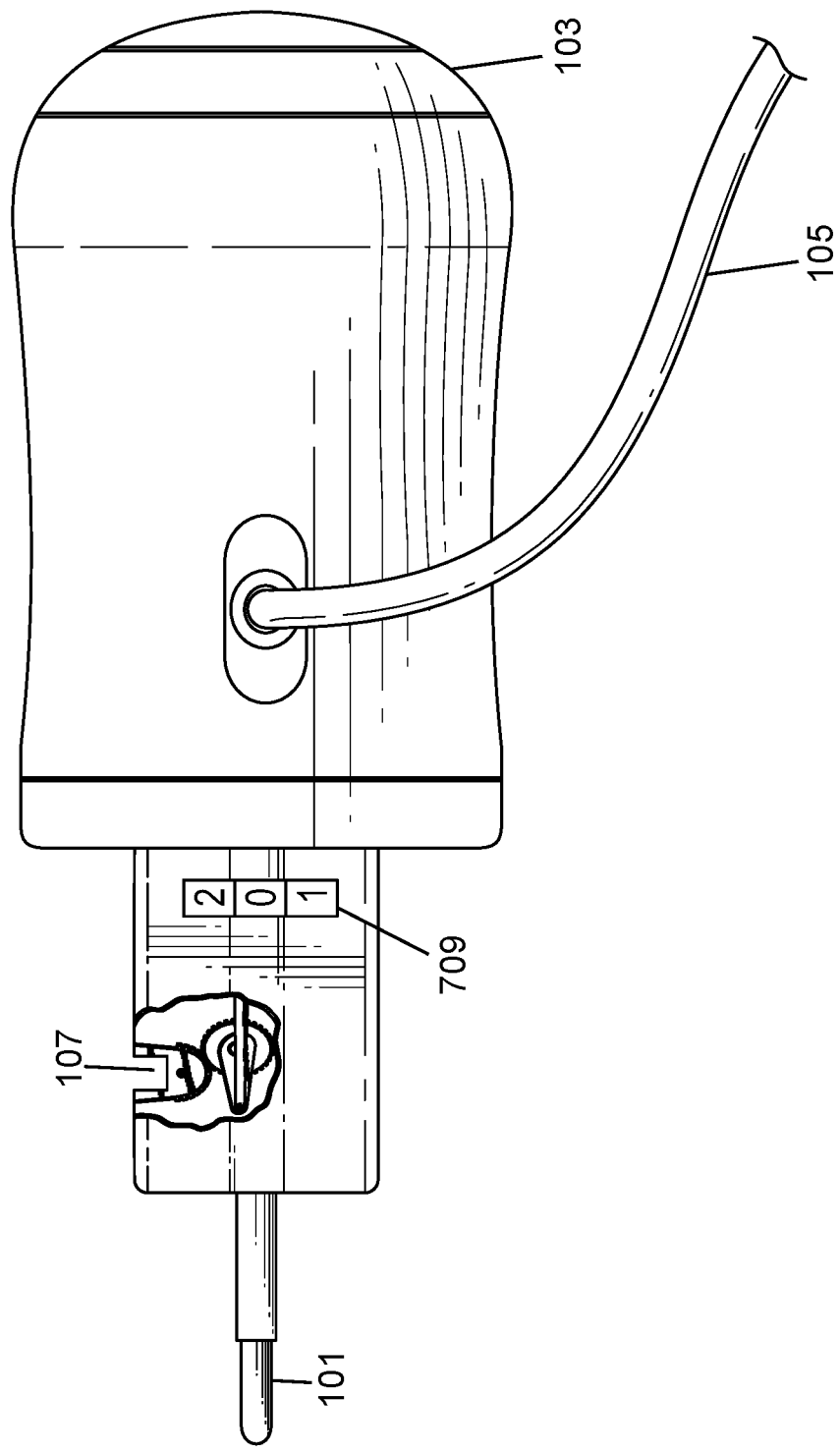
FIG. 38a depicts a 220 V electrical plug with an adjustable device holding slot in vertical position.
Figure 38B:
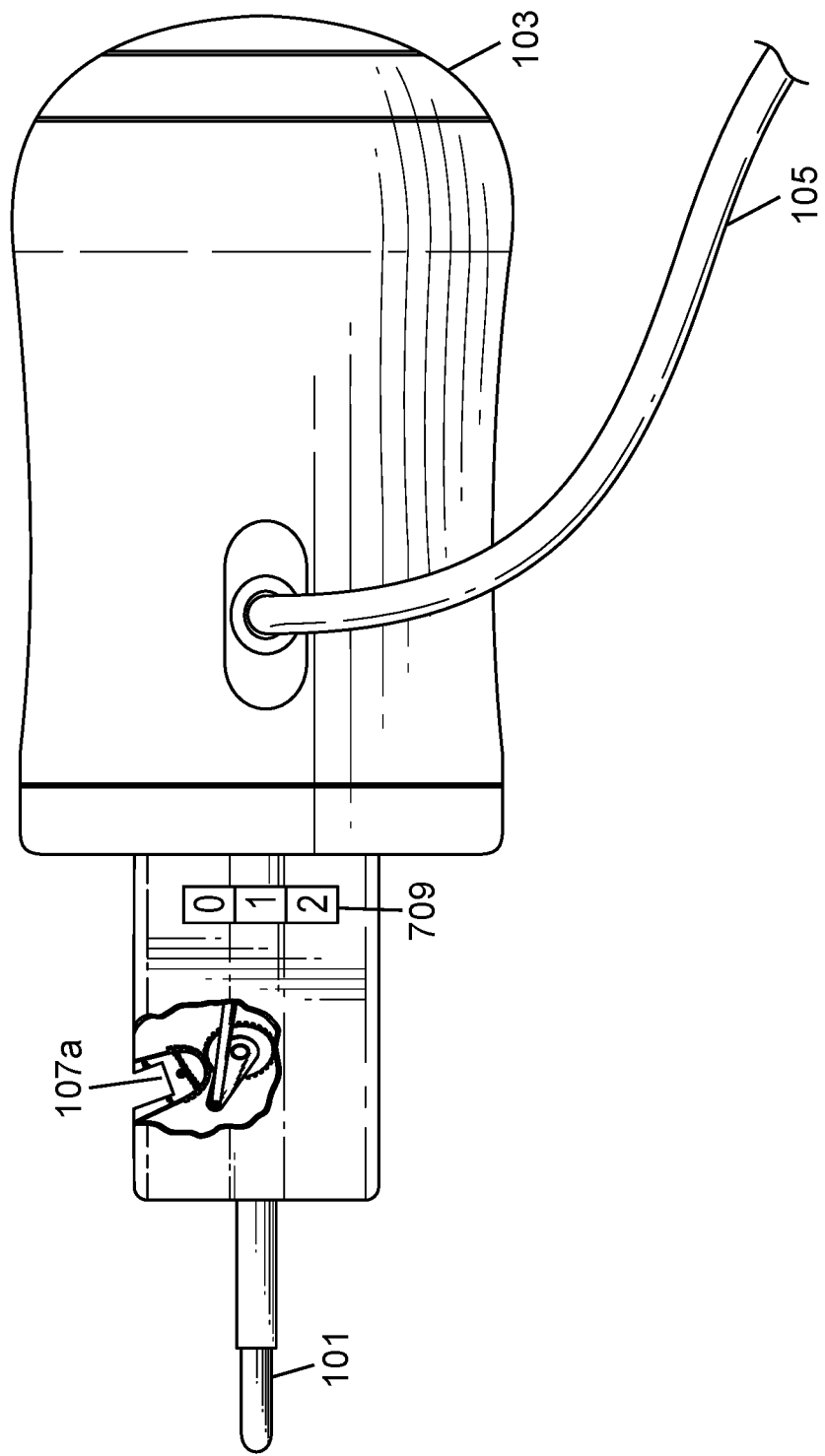
FIG. 38b depicts a 200 V electrical plug with an adjustable device holding slot in angled position.

In an embodiment, the present invention relates to an electrical device charger with means of adjusting the angle of the device holding slot. FIG. 34 to FIG. 38 shows an embodiment of how a device charger may look inside it and how it can function to adjust the inclination of the device held. FIG. 34a depicts adjustable device holding slot assembly mechanism in the vertical position. FIG. 34b depicts a dial for adjusting the device holding assembly mechanism for various angles to hold the device being charged. FIG. 35a depicts adjustable device holding assembly embodiment segmented planetary gear assembly with dial mechanism. FIG. 35b depicts adjustable dial for adjustable device holding assembly. The assembly mechanism mainly functions like a gear-type arrangement and having mainly one half-circle gear 710 and full-circle gear 711. The half-circle gear 710 comprises holding slot 107a which has exposure outside of the electrical device charger to held securely an electrical devices. Teeth of the half-circle gear 710 are meshes with the full-circle gear 711. The full-circle gear 711 is attached or connected with the dial 709. When the half-circle gear 710 is in the vertical position then the dial position is 2,0,1 (FIG. 34b). When the half-circle gear 710 is in the angled position then the dial position is 0,1,2 (FIG. 35b). FIG. 36 depicts adjustable device holding slot in angled position. FIG. 37 depicts adjustable device holding slot in vertical position. For further the clarity purpose, FIG. 38 represents how holding assembly mechanism will look like inside the electrical device charger. FIG. 38a depicts 220 v electrical plug with adjustable device holding slot in vertical position. FIG. 38b depicts an electrical plug with an adjustable device holding slot/channel in angled position.

Figure 39:
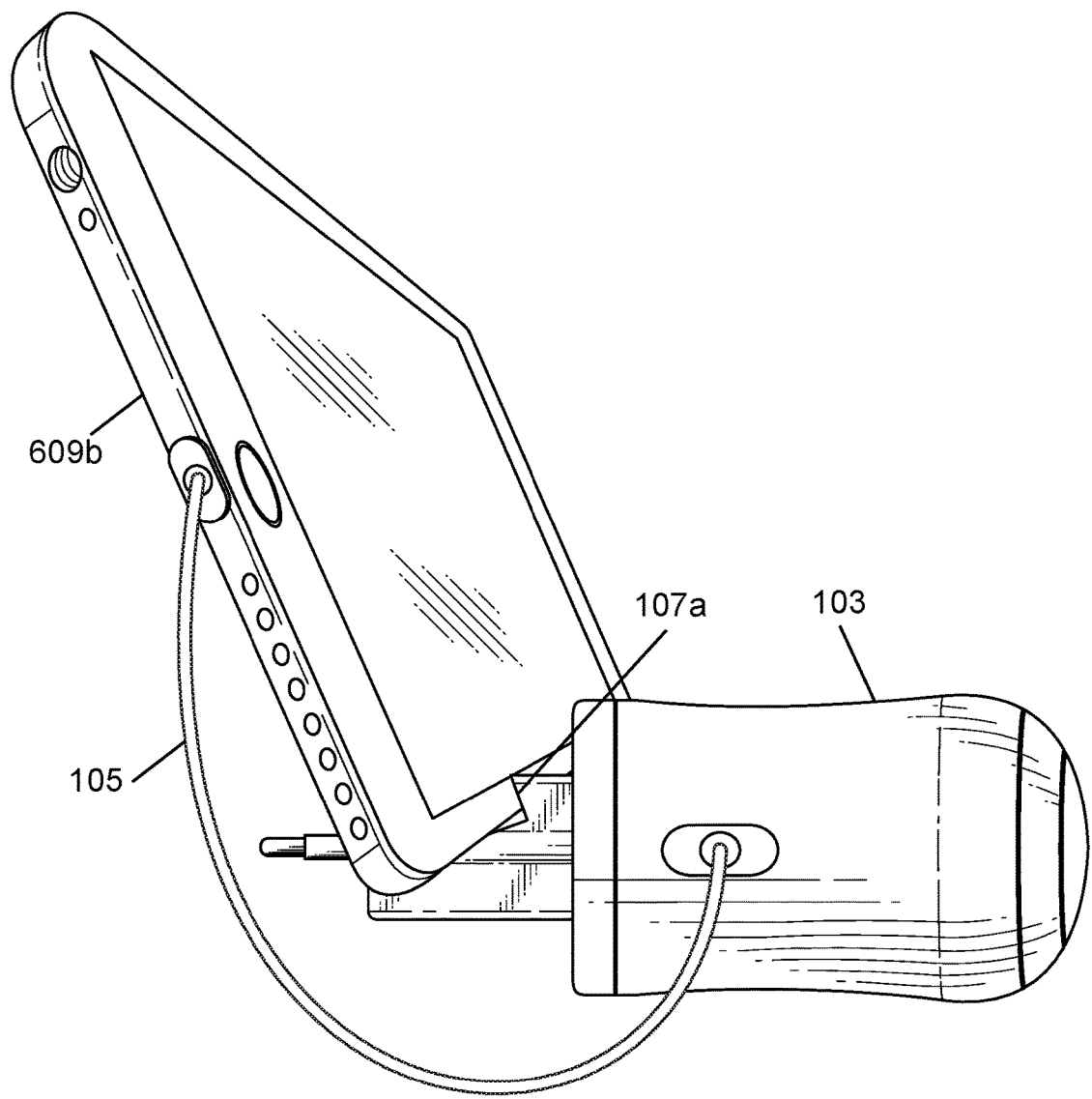
FIG. 39 depicts a 220 V electrical plug with an angled device holding slot in an embodiment holding an electrical device charging cell phone.
Figure 40:
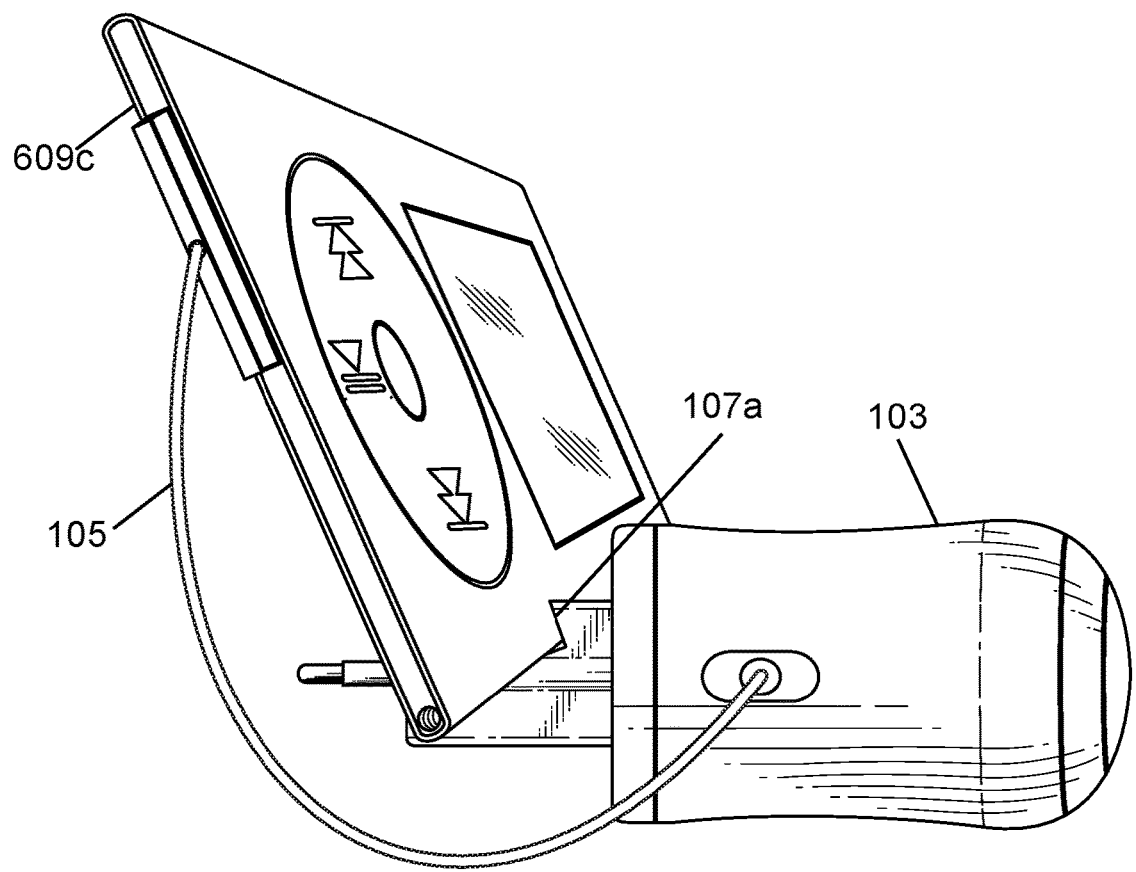
FIG. 40 depicts a 220 V electrical plug with an angled device holding slot in an embodiment holding electrical device charging CD player.
Figure 41:
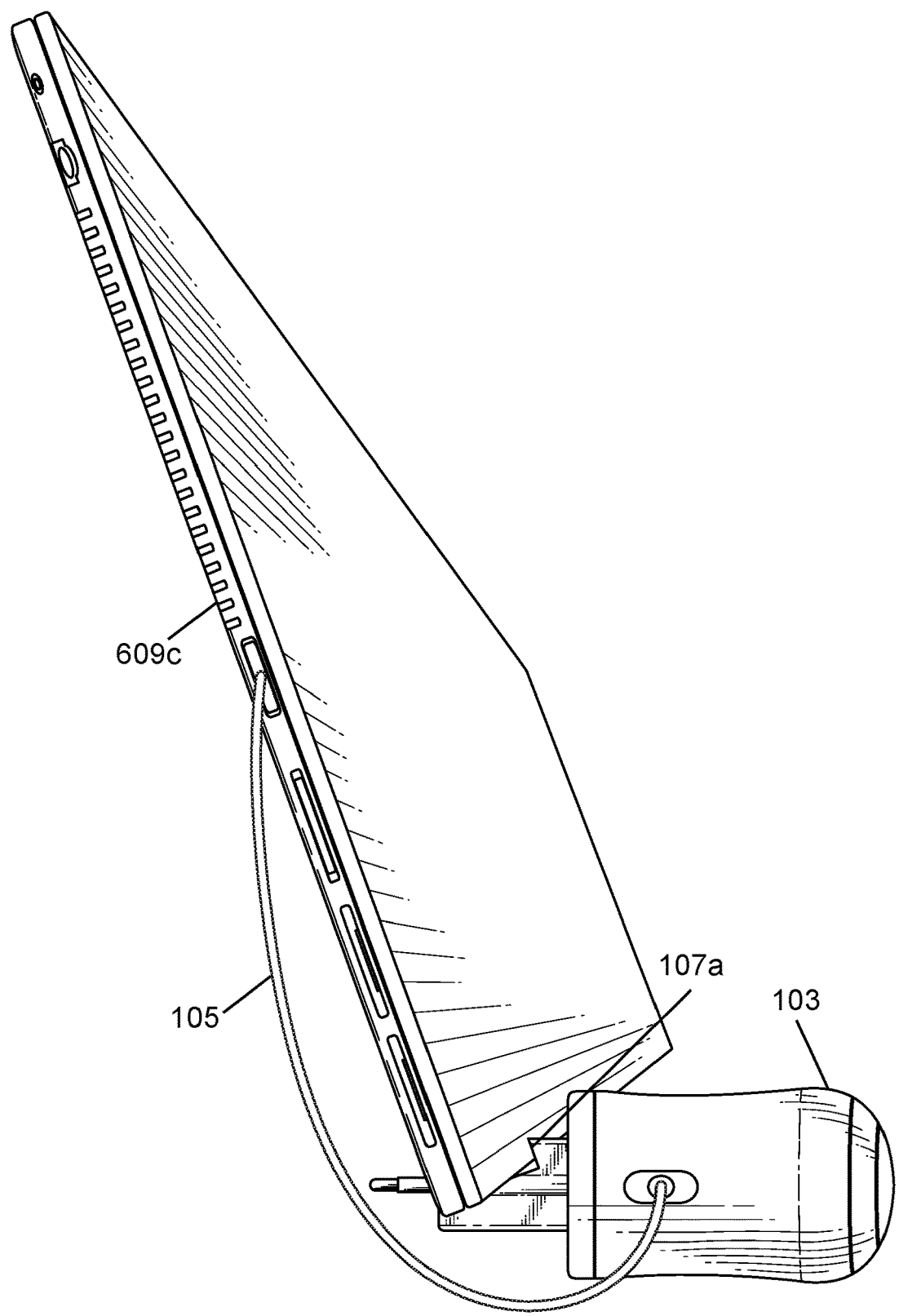
FIG. 41 depicts a 220 V electrical plug with an embodiment of an angled device holding slot charging laptop.

In embodiments, FIG. 39 to 41 depicts electrical plug with angled device holding slot embodiment holding electrical devices, such as cell phone, CD player, and laptop, respectively. An electrical device charger with means of holding a plurality of electrical devices (not shown in the picture) which comprises: a main unit 103 with at least one holding slot 107a; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107a in this embodiment is channel type and it is angled. The holding slot 107a is located at the top side of the main unit 103. Further, the cable cord 105 is connected to the main unit 103 from one of the side. The pins 101 in the present embodiment are of round type (normally used for providing 220 V electrical power sources). The electrical devices 609a, 609b, and 609e (respectively in FIGS. 39 to 41) can be held or on an angle in the holding slot 107a, in the present embodiment it is of channel type, in which an electrical device held securely in the device holding channel.

Figure 42:
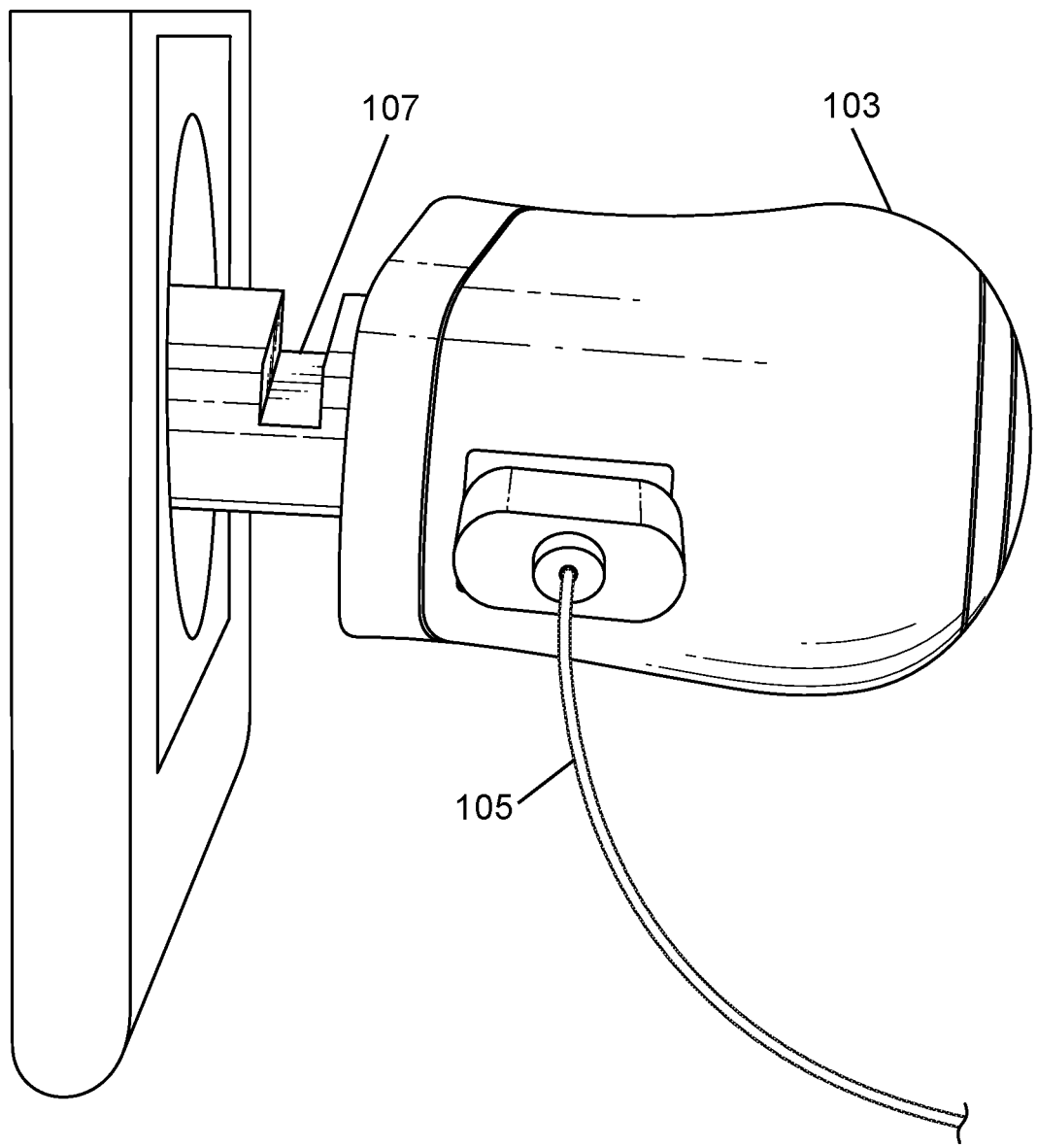
FIG. 42 depicts elevated side view 220 V charger with an embodiment of a vertical device holding slot in electrical outlet.
Figure 43:
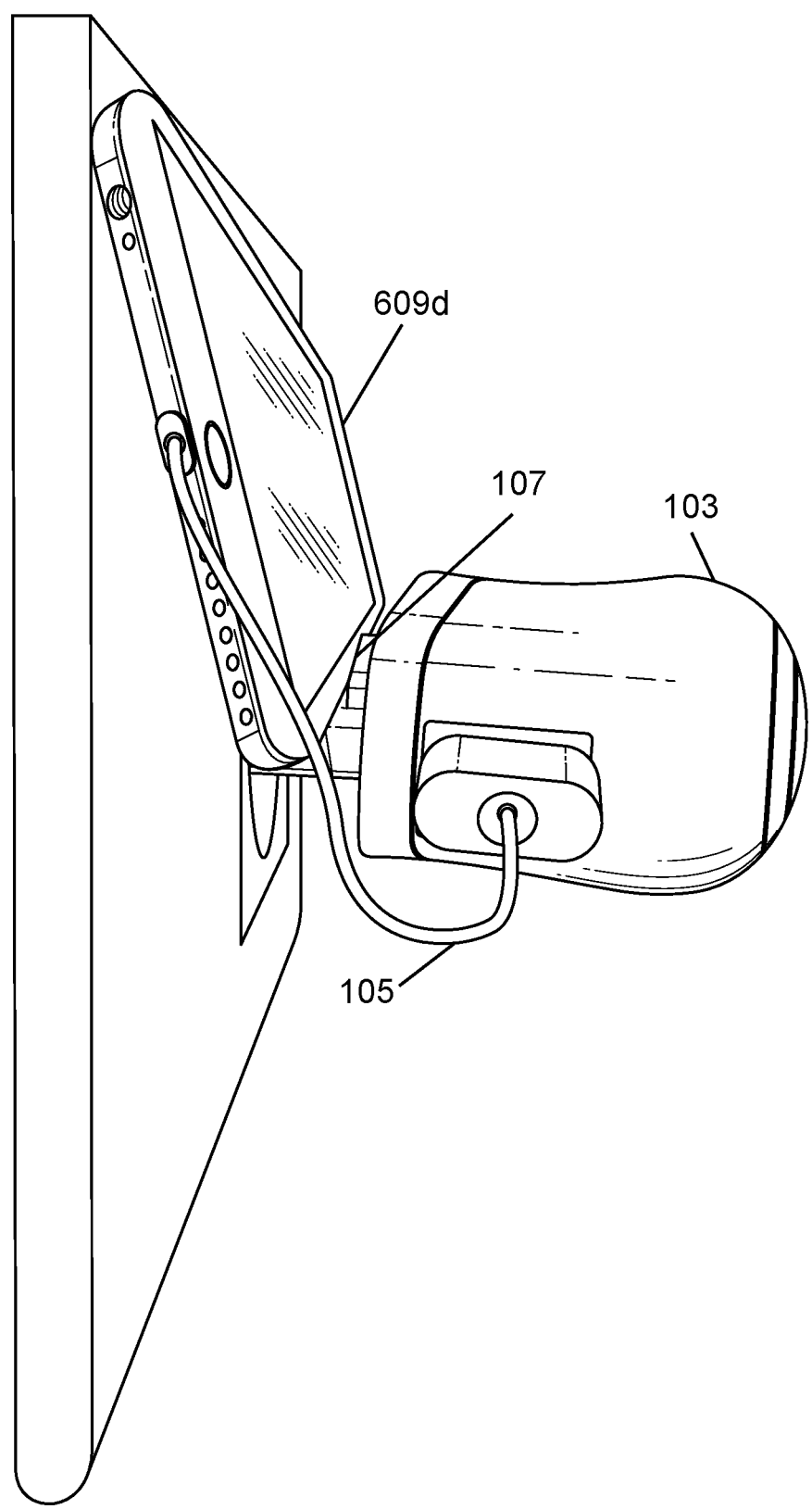
FIG. 43 depicts an elevated side view 220 V charger with a device vertical holding slot embodiment holding a cell phone being charged.

FIGS. 42 and 43 show the electrical plugs, having embodiment of device holding slot, being connected or mounted on the electrical outlet. The electrical charge device or electrical plug of the embodiment is the same as one depicted in FIG. 1. FIG. 42 depicts elevated side view 220 V charger with embodiment device holding slot in electrical outlet. FIG. 43 depicts elevated side view 220 V charger with device holding slot embodiment holding cell phone being charged.

Figure 44:
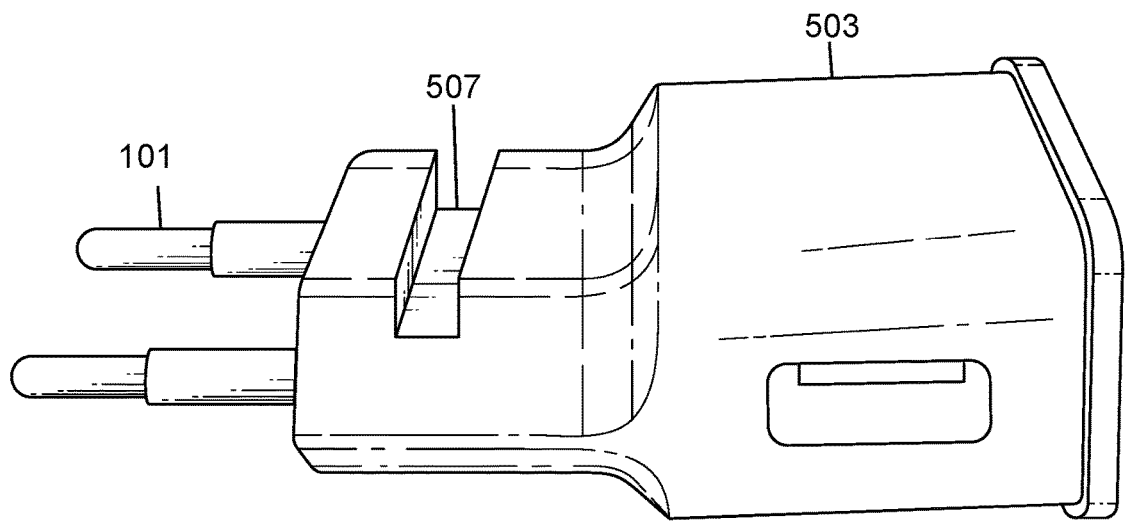
FIG. 44 depicts an elevated side view 220 v electrical plug with an embodiment of a vertical device holding slot.
Figure 45:
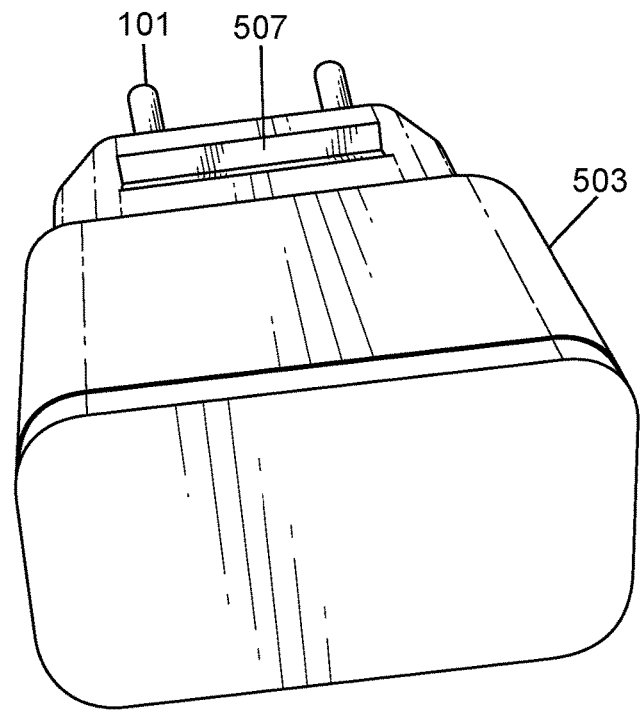
FIG. 45 depicts an elevated front view 220 v plug with embodiment device holding slot embodiment.

Further, in embodiments, FIGS. 44 and 45 depicts elevated side view and elevated front view of the 220 v electrical plug with embodiment device holding slot, respectively. The electrical charger device or electrical plug is having the same arrangement and description as described earlier for FIGS. 17 and 18.

Figure 46:
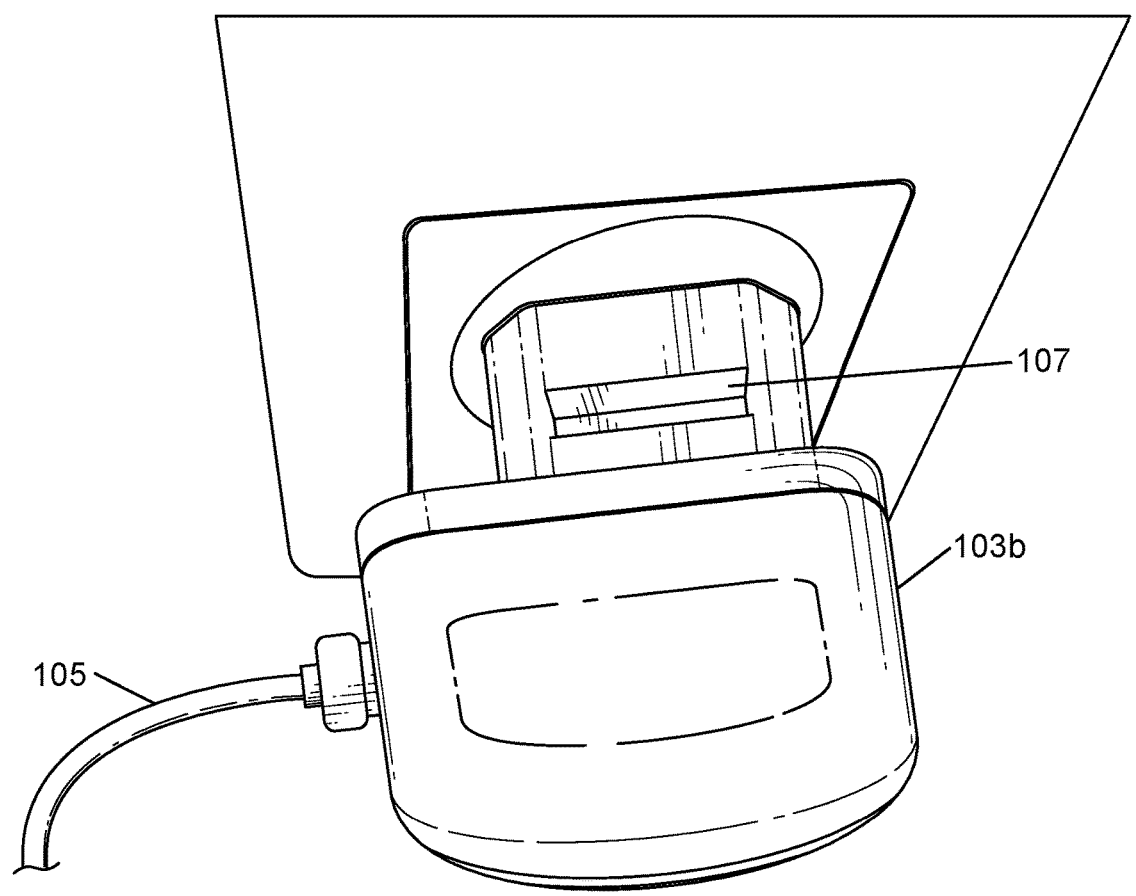
FIG. 46 depicts a top view 220 v electrical plug in an outlet with embodiment device holding slot.

In an embodiment, FIG. 46 depicts top view 220 v electrical plug in outlet with embodiment device holding slot. An electrical device charger with means of holding a plurality of electrical devices (not shown in the picture) which comprises: a main unit 103b with at least one holding slot 107; a cable cord 105 for connecting main unit with said electrical devices; and Pins 101 for fitting said main unit 103b with an electric power source. The electrical device charger (i.e. main unit) in the present embodiment is 220 V electrical plug. The holding slot 107 in this embodiment is device holding channel type and it is vertical. The device holding slot 107 is located at the top side of the main unit 103b. Further, the cable cord 105 is connected to the main unit 103b from one of the side. The pins 101 in the present embodiment are of round type (normally used for providing 220 V electrical power sources). The electrical devices can be held vertically in the device holding slot 107, in the present embodiment vertical device holding channel type, in which an electrical device is securely held.

Figure 47:
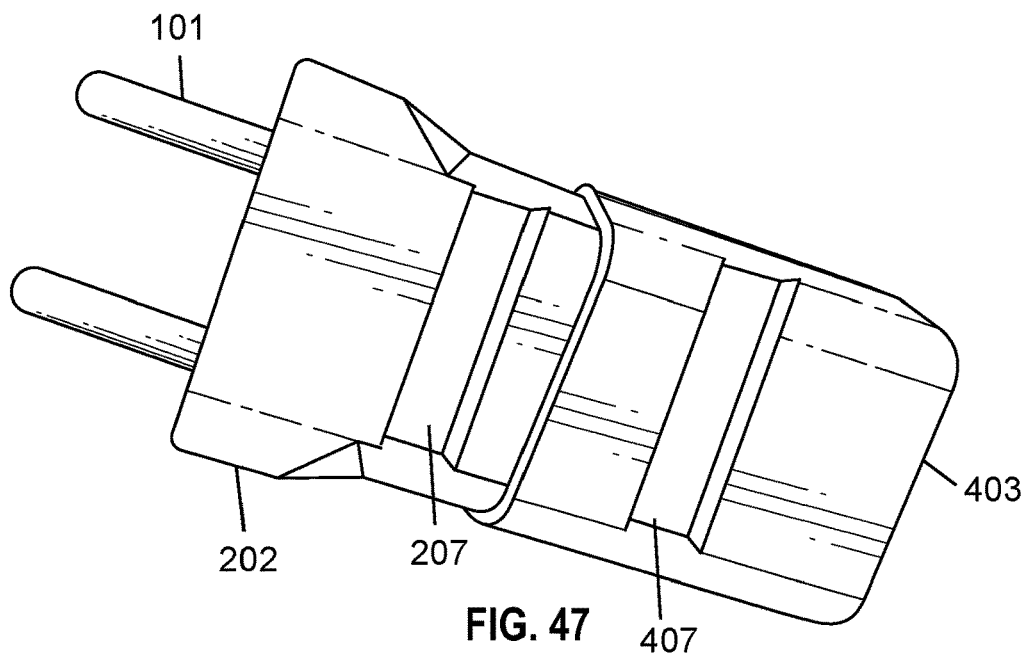
FIG. 47 depicts a top view 220 v electrical plug and 110 v electrical plug each having a vertical device holding slot (tandem application).
Figure 48:
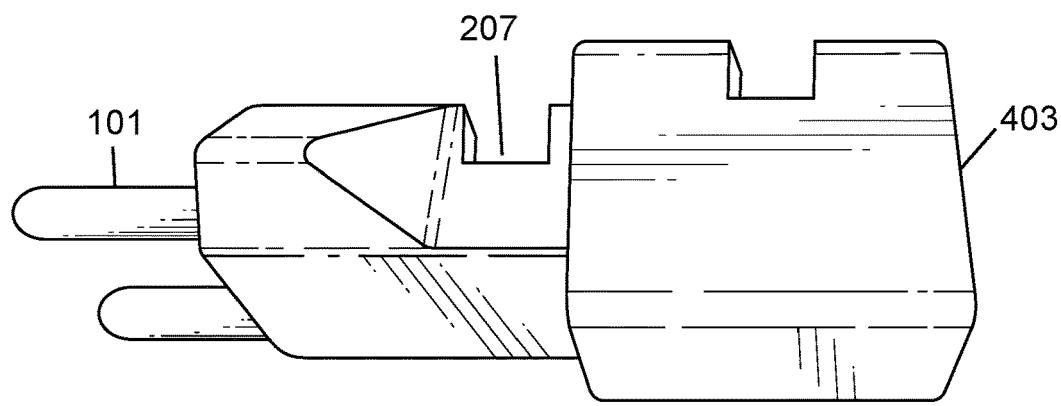
FIG. 48 depicts an elevated side view of FIG. 47.
Figure 49:
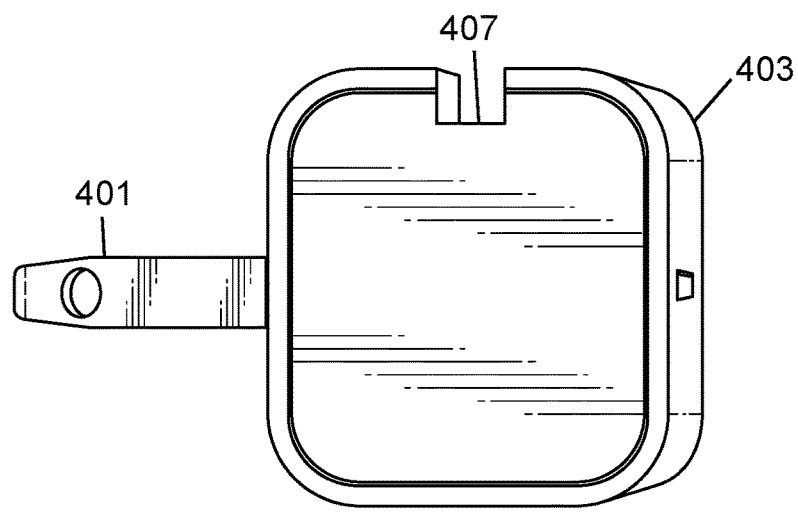
FIG. 49 depicts a side view 100 V of an electrical plug with a vertical embodiment device holding slot.
Figure 50:
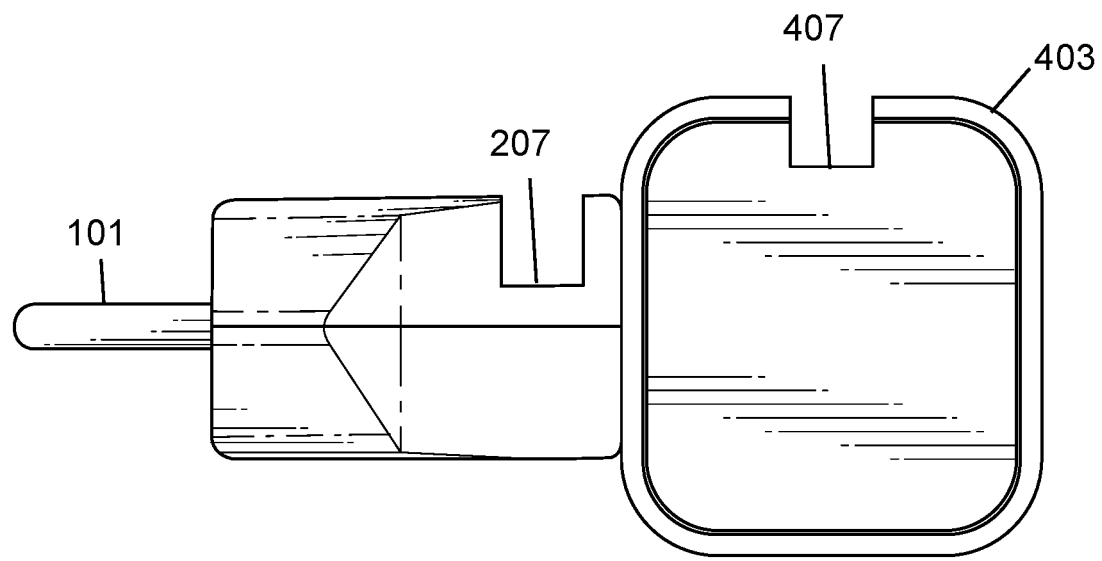
FIG. 50 depicts an assembled 220 V adapter and 110 V plug each with a holding slot (tandem application).
Figure 51:
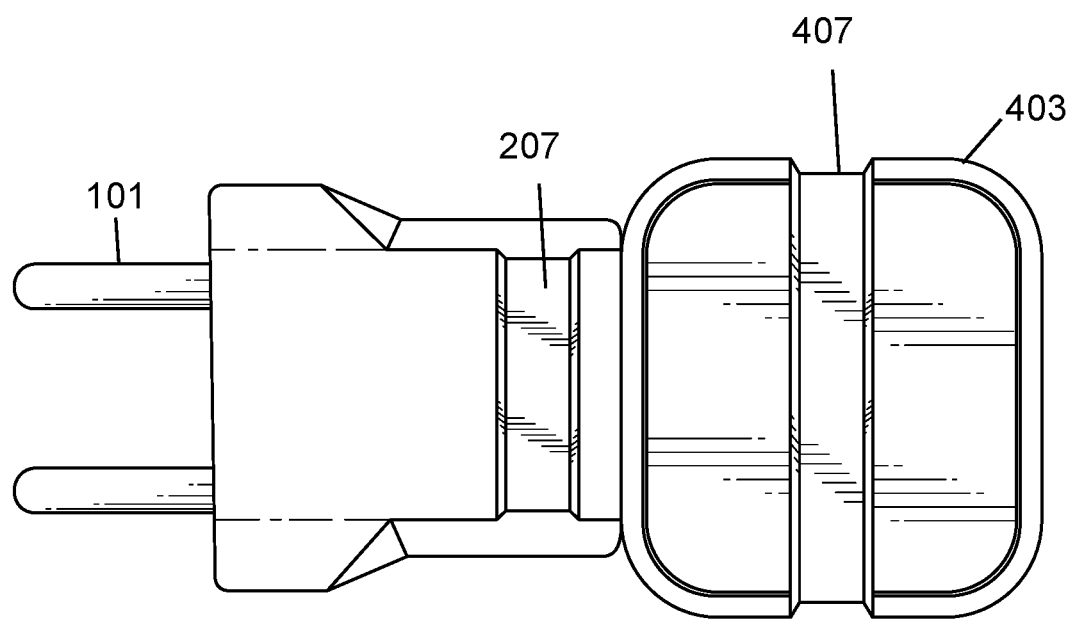
FIG. 51 depicts a top view of the embodiment of FIG. 50.

In an embodiment, FIGS. 47 and 48 depicts different views of assembled electrical charger device comprising 220 V electrical plug and 110 V electrical plug. The assembled charger device has two device holding slots 207 and 407 (tandem application). Similarly, another embodiment, FIGS. 50 and 51 depicts different views of assembled electrical charger device comprising 220 V electrical adapter and 110 V electrical plug (tandem application) with device holding embodiments. While, FIG. 49 depicts side view 100 V electrical plug with embodiment device holding slot.

Figure 52:
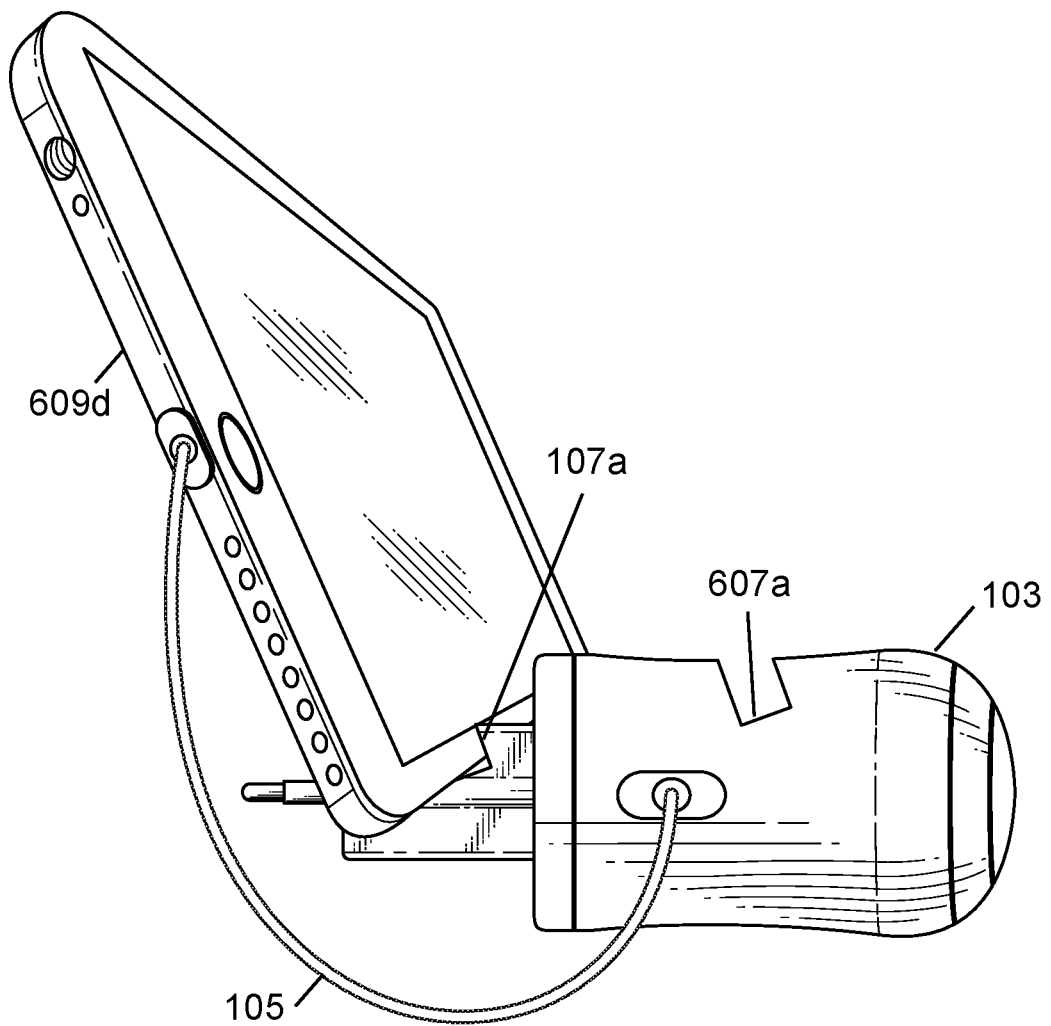
FIG. 52 depicts a side view 220 v electrical charging plug with two angled device holding slots (tandem application).
Figure 53:
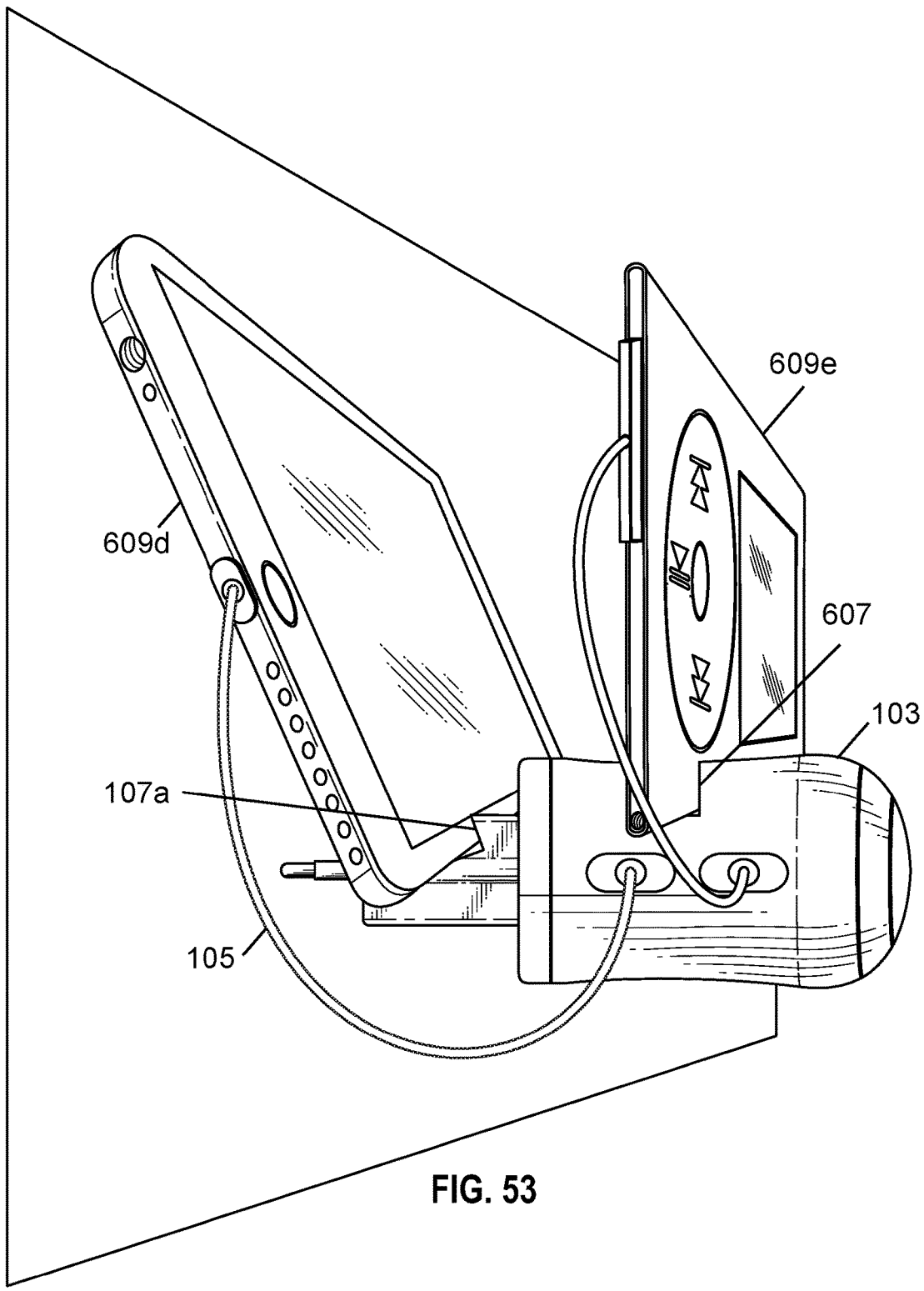
FIG. 53 depicts a side view 220 v electrical charging plug with angled and vertical device holding slots (tandem application).
Figure 54:
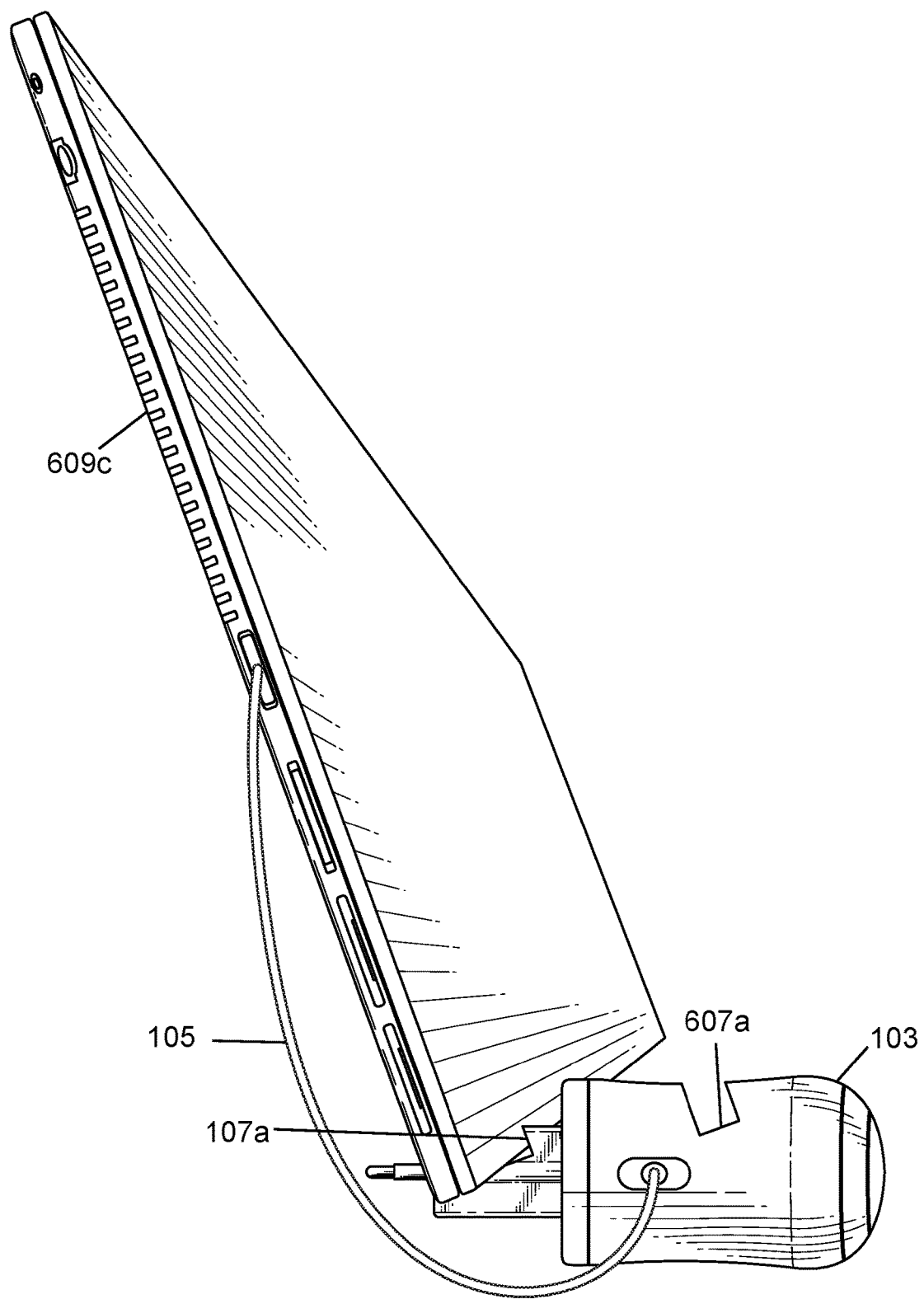
FIG. 54 depicts an electrical plug charging 220 v plug charging laptop with angled device holding slots.
Figure 55:
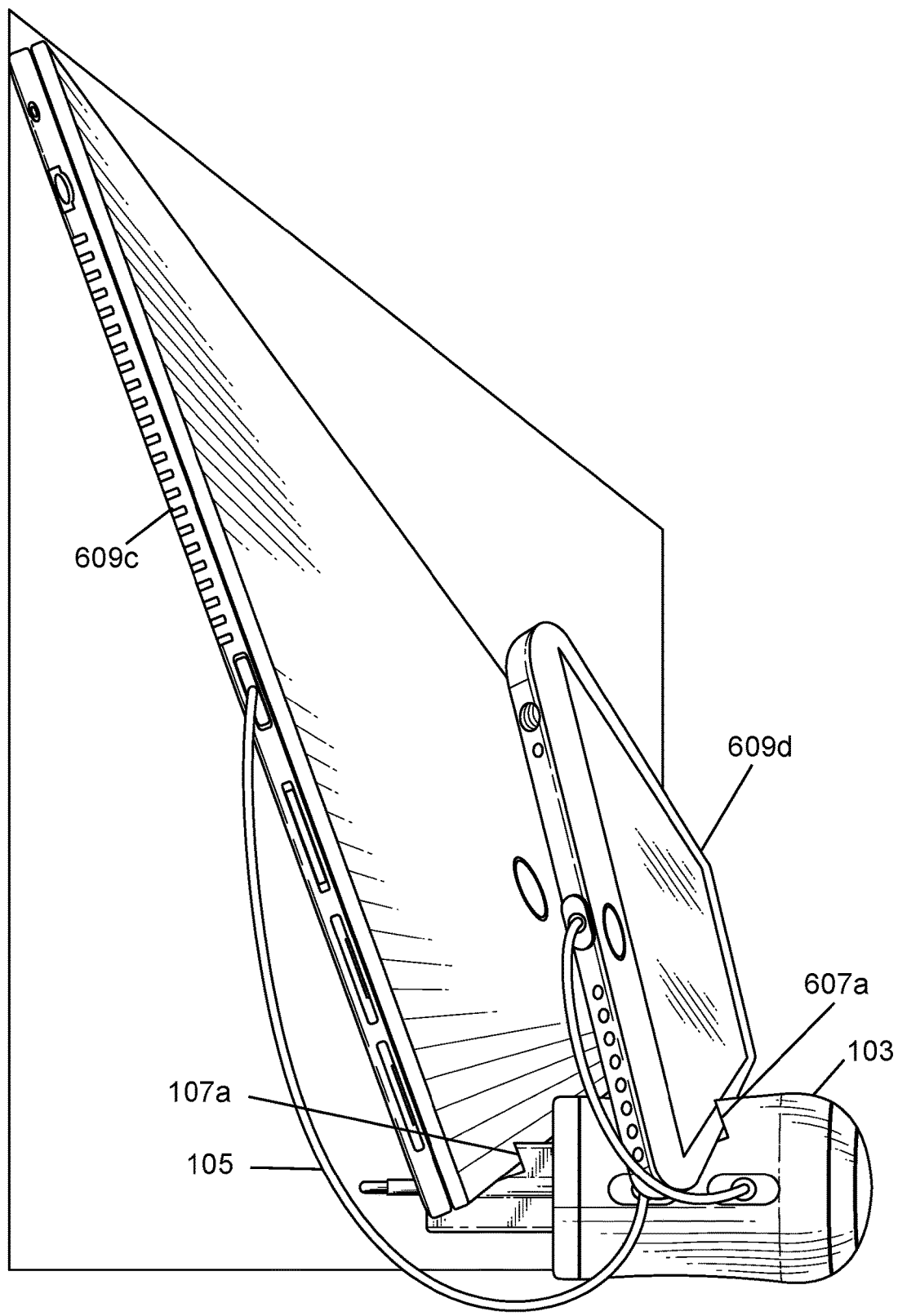
FIG. 55 depicts a side view with multiple electrical devices in multiple holding slots.

Further, FIG. 52 to 55 shows various examples of the electrical charging devices (electrical plugs) with two device holding slots of the embodiments of the present invention. FIG. 52 depicts side view 220 v electrical charging plug with two angled device holding slots (tandem application). FIG. 53 depicts side view 220 v electrical charging plug with angled and vertical device holding slots (tandem application). FIG. 54 depicts electrical plug charging 220 v plug charging laptop with angled device holding slots. FIG. 55 depicts side view tandem embodiment charging multiple electrical devices. The device holding slots can be vertical or angled shape. Accordingly, the electrical devices can be held securely on the device holding slots.

Figure 56:
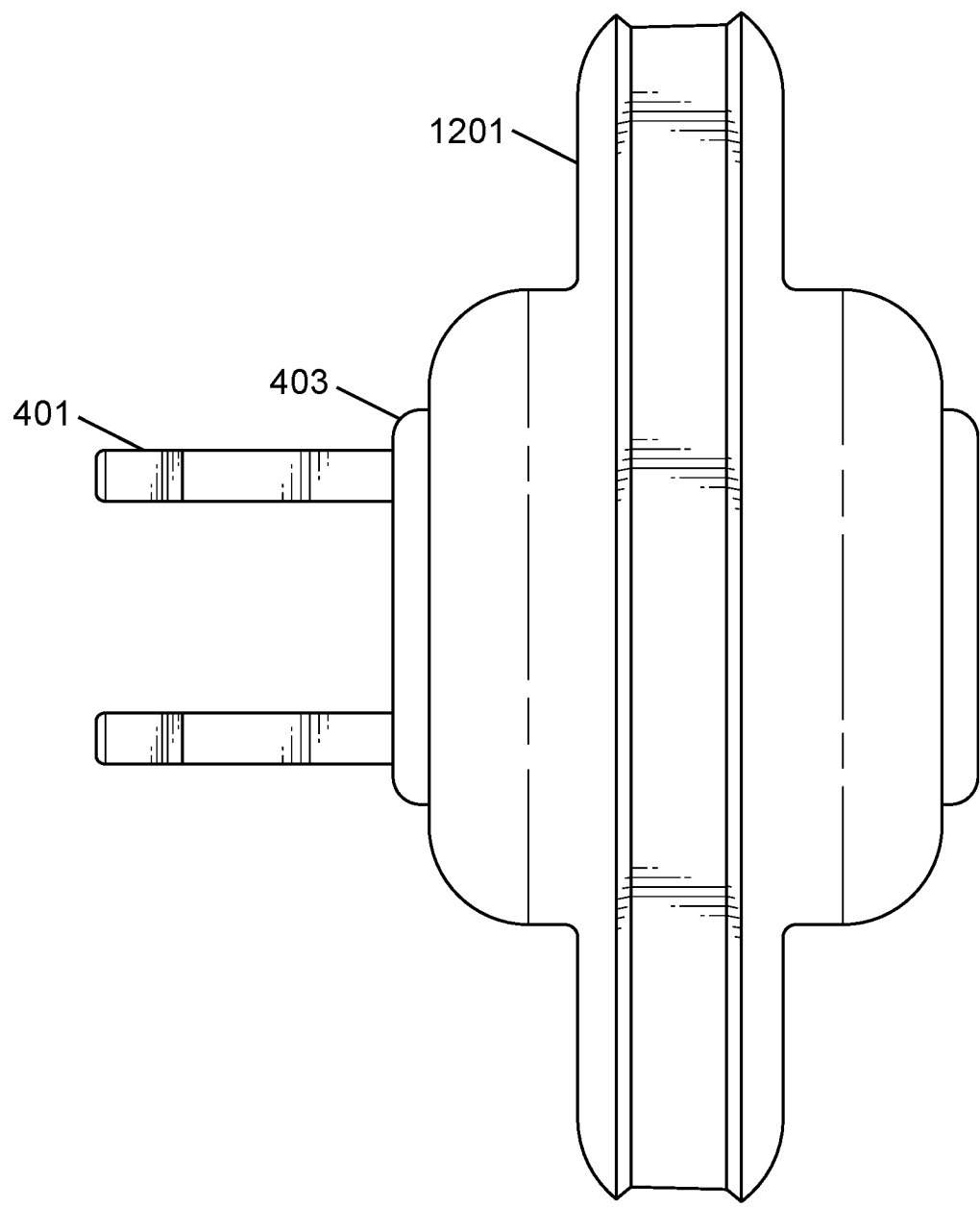
FIG. 56 depicts a top view 110 v electrical plug (of FIG. 12) with elastic device holding clamp.
Figure 57:
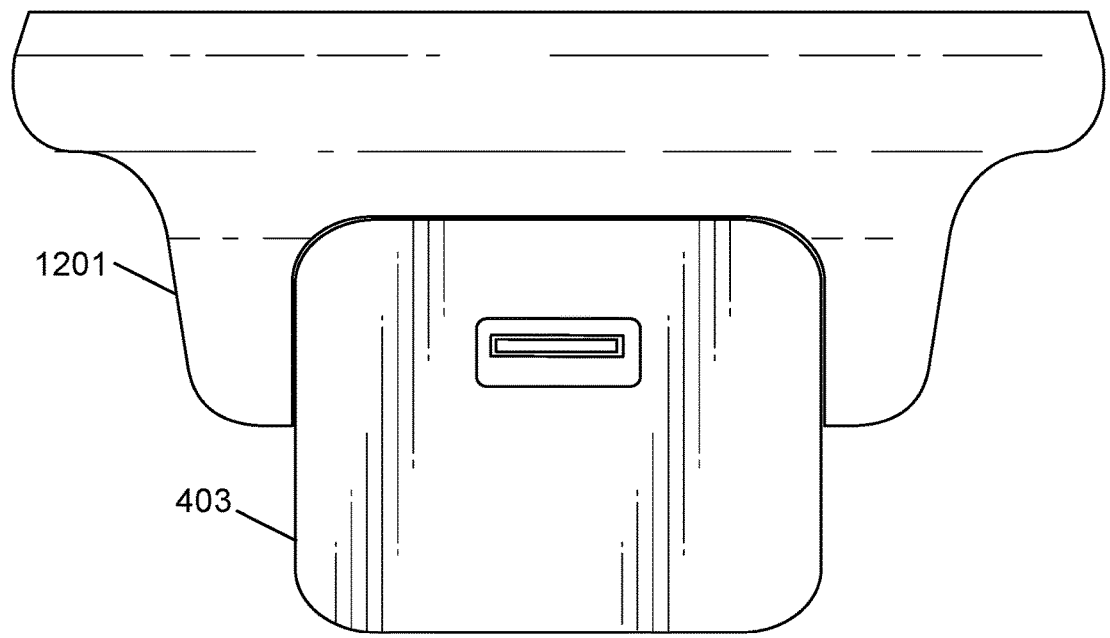
FIG. 57 depicts a front view of electrical plug (of FIG. 12) with embodiment elastic device holding clamp.
Figure 58:
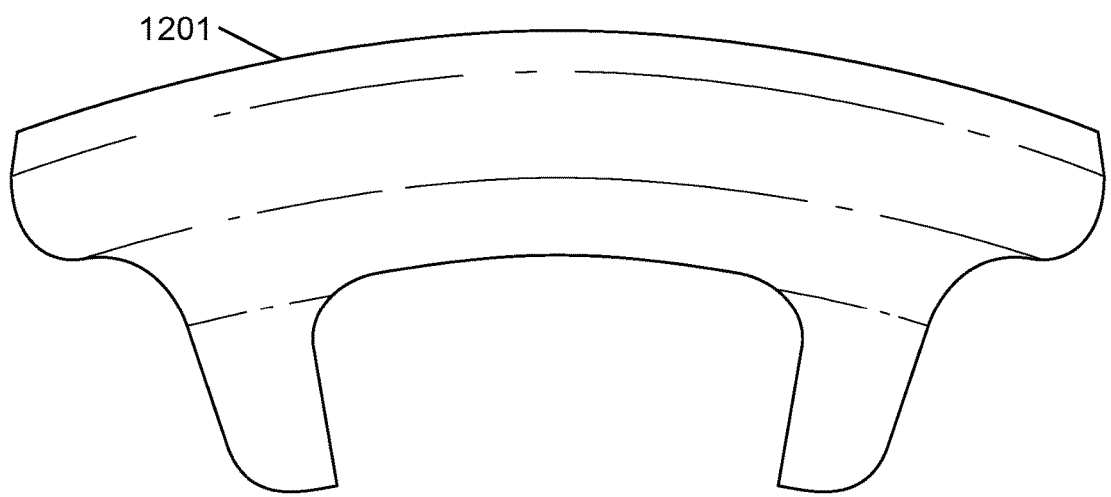
FIG. 58 depicts an embodiment of an elastic device holding clamp in free state.

In embodiments, FIGS. 56 to 58 depict different views of an arrangement of elastic device holding clamp used to clamp securely onto an electrical plug to increase the load bearing support for electrical devices being charged. FIG. 56 depicts top view 110 v electrical plug (of FIG. 12) with elastic device holding clamp. FIG. 57 depicts front view of electrical plug (of FIG. 12) with elastic device holding clamp in a free state. FIG. 58 depicts elastic device holding clamp. The elastic device holding clamp 1201 is holding a 110 V electrical plug.

Figure 59:
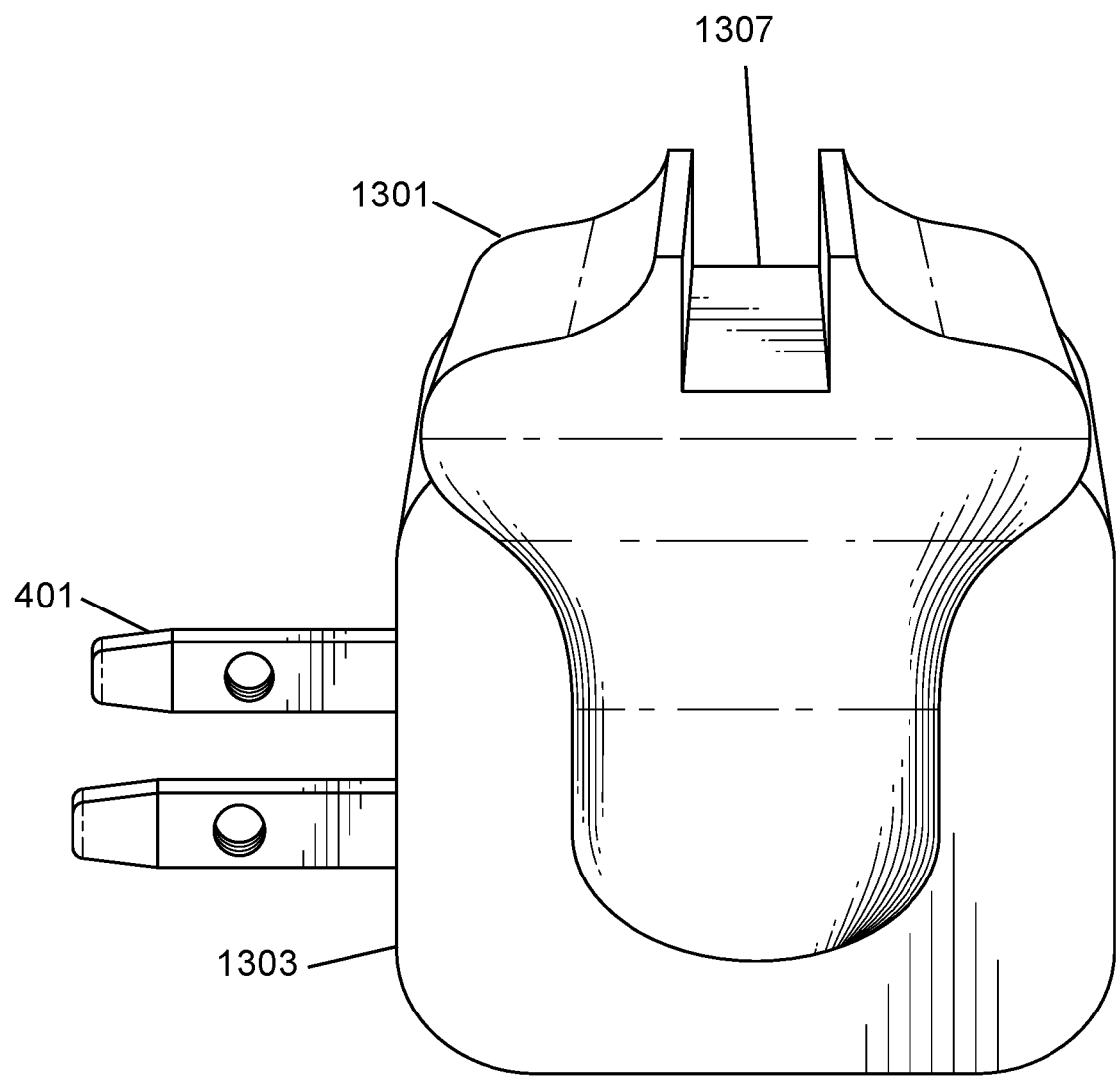
FIG. 59 depicts an elevated side view 110 V electrical plug with an embodiment an elastic device holding clamp with device holding slot.
Figure 60:
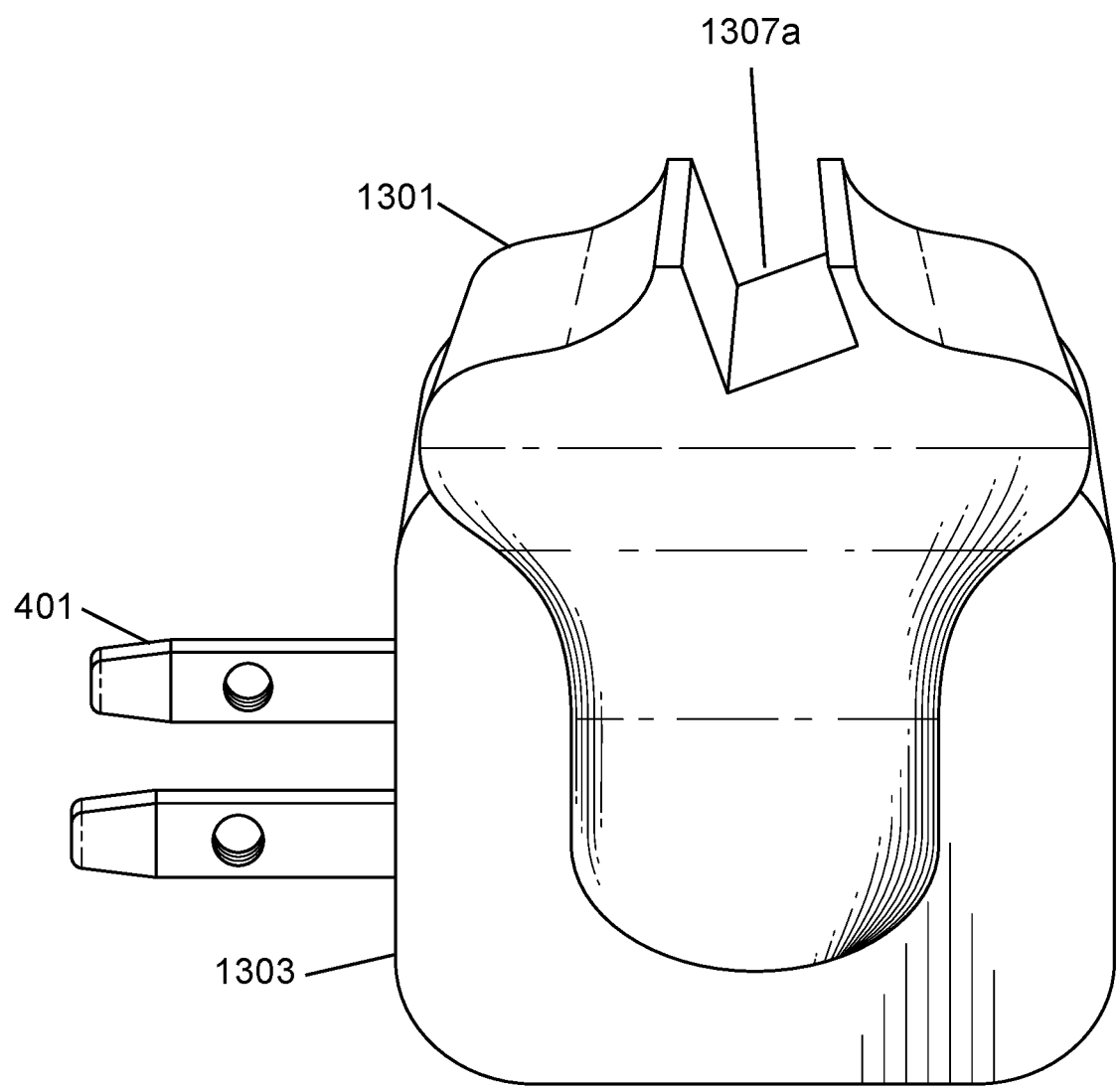
FIG. 60 depicts an elevated side view 110 V electrical plug with an embodiment of an elastic device holding clamp with angled device holding slot.
Figure 61:
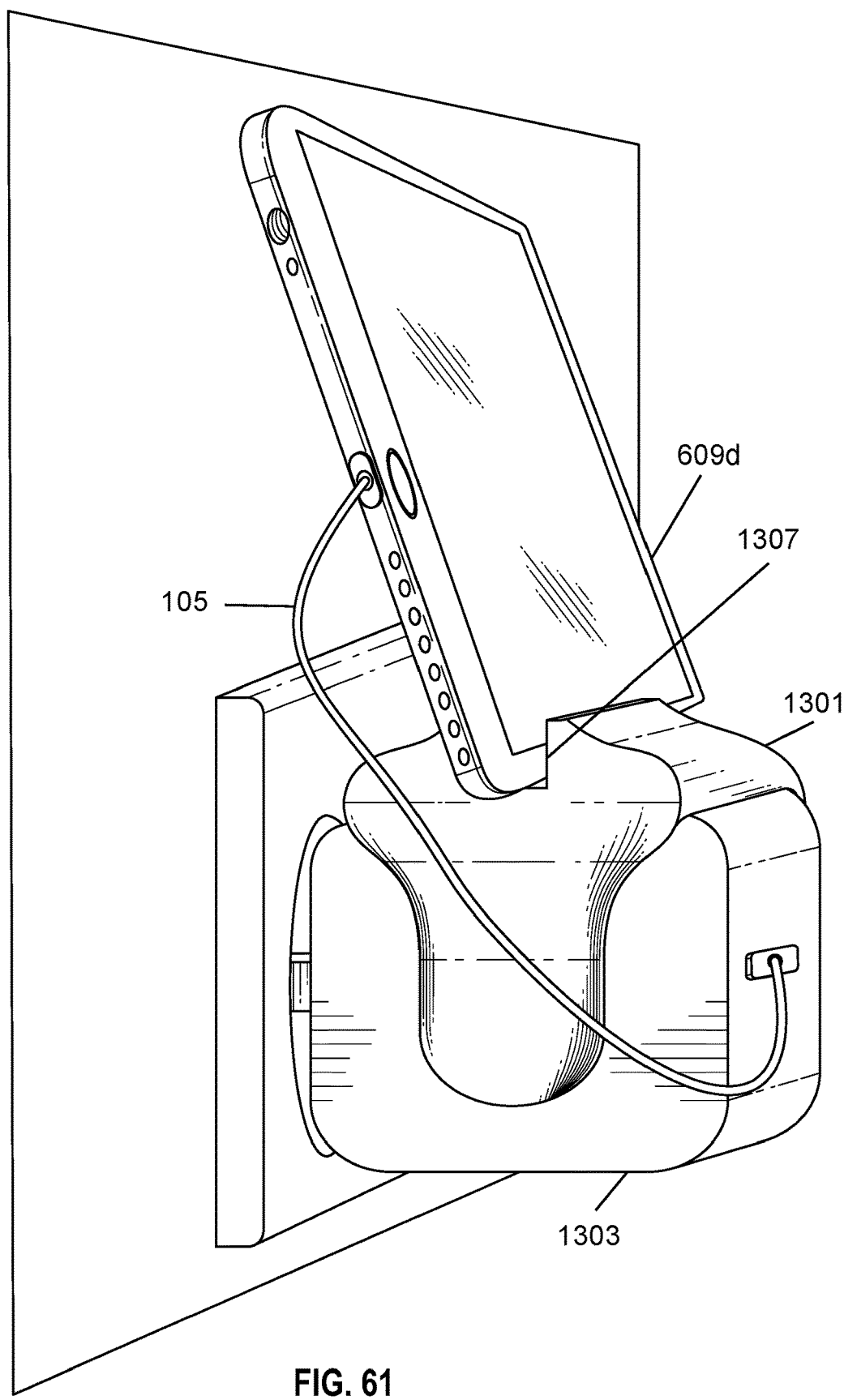
FIG. 61 depicts an elevated side view 110 v electrical plug assembled with embodiment device holding plug holding a cell phone being charged.

Further, in an embodiment, FIGS. 59 to 61 shows an elastic device holding clamp having device holding slot, further the elastic device holding clamp holds securely 110 V electrical plug. FIG. 59 depicts elevated side view 110 V electrical plug with elastic device holding clamp with device holding slot. FIG. 60 depicts elevated side view 110 V electrical plug with elastic device holding clamp with angled holding slot. The elastic device holding clamp 1301 having embodiment of vertical device holding slot 1307 (in FIG. 59) and angled device holding slot 1307a (in FIG. 60) is disclosed. FIG. 61 depicts elevated side view 110 v electrical plug with embodiment device holding plug holding cell phone being charged.

Figure 62:
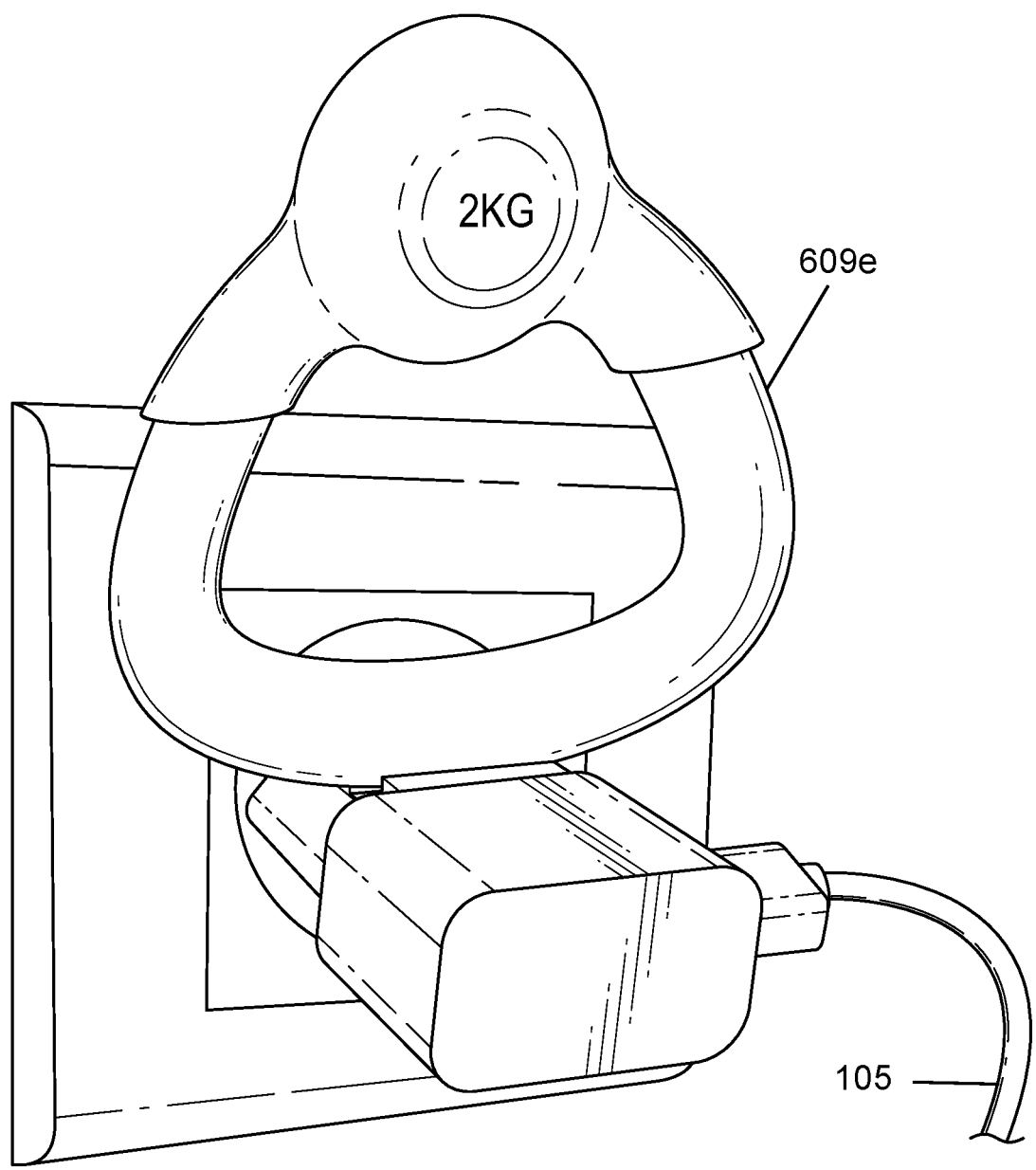
FIG. 62 shows a 2 kg weight resting on 220 V electrical plug in wall with device holding slot yielding a safety factor of 10.

FIG. 62 shows proof of concept 2 kg weight resting on 220 V electrical plug in wall with device holding slot. FIG. 62 clearly shows that embodiment of the present invention, 220 V electrical plug, which can hold securely 2 kg. Weighing bar 609e. This clearly proves that electrical plug or electrical adapter can hold securely 2 kg. (which is equal to 4.4 pounds) approximately 10 times the weight of an iphone (safety factor S.F. 10).

Figure 63:
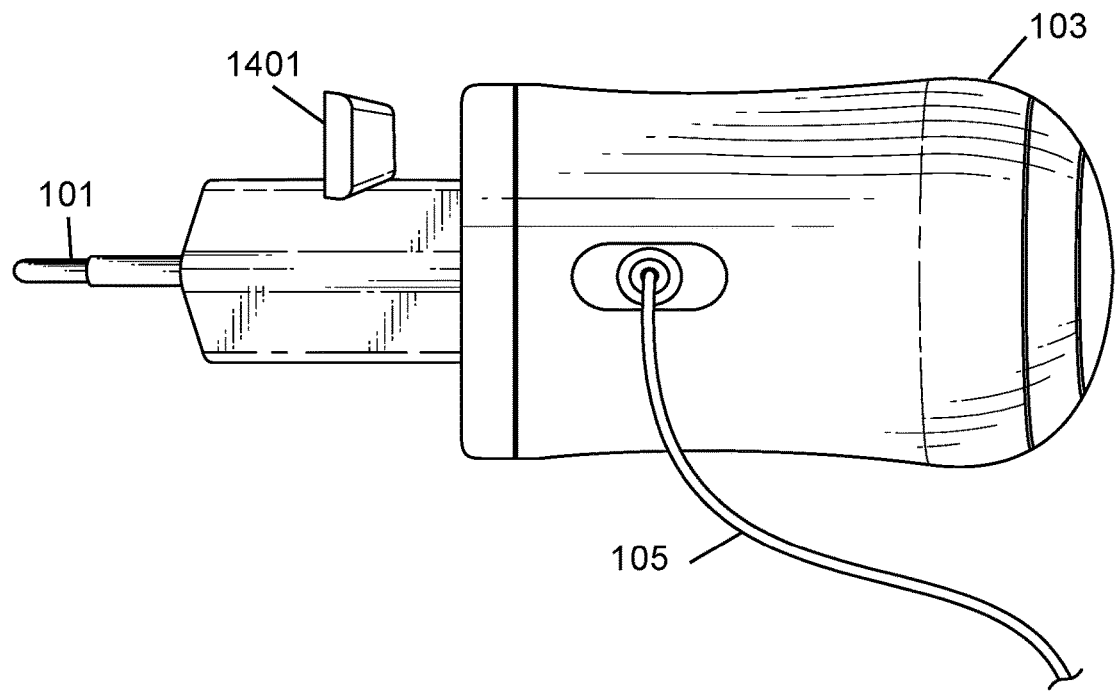
FIG. 63 depicts an electrical plug with vertical protruding stop for holding an electrical device.

In an embodiment, FIG. 63 depicts electrical plug with a protrucing vertical stop for holding electrical device. An electrical device charger with means of holding a plurality of electrical devices (not shown in the picture) which comprises: a main unit 103 with at least one holding slot 1401; a cable cord 105 for connecting main unit with said electrical devices; and Pins 101 for fitting said main unit 103 with an electric power source. The electrical device charger (i.e. main unit) in the present embodiment is 220 V electrical plug. The holding slot 1401 in this embodiment is vertical stopper type. The holding slot 107 is located at the top side of the main unit 103. Further, the cable cord 105 is connected to the main unit 103 from one of the side. The pins 101 in the present embodiment are of round type (normally used for providing 220 V electrical power sources). The electrical devices can be held vertically in the holding slot 1401, in the present embodiment it is vertical stopper, in which an electrical device can held securely.

Figure 64:
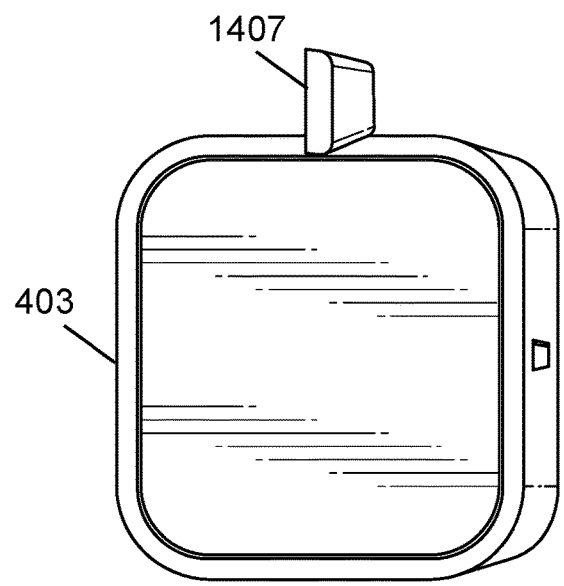
FIG. 64 depicts a 110 V electrical plug with electrical device prongs/pins retracted.

FIG. 64 depicts drawing 110 V electrical plug with an embodiment of a vertical stop for holding electrical device. This embodiment is having same arrangement or structure as that of the FIGS. 13 to 15, only difference is that holding slot is of different design that the earlier one. The holding slot is vertical stopper 1407 for holding securely holding electrical device.

Figure 65:
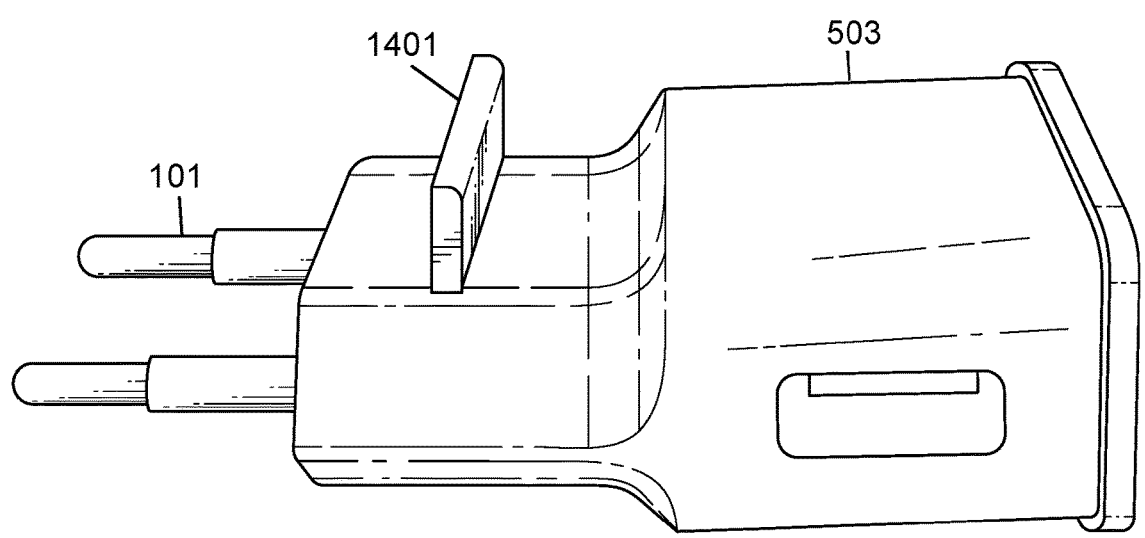
FIG. 65 depicts an elevated side view of a 220 V of electrical plug embodiment.

FIG. 65 depicts elevated side view 220 V electrical plug with an embodiment of a vertical stop for holding an electrical device. This embodiment is having same arrangement or structure as that of the FIG. 18, only difference is that holding slot is of different design that the earlier one. The holding slot is vertical stopper 1401 for holding securely holding electrical device.

Figure 66:
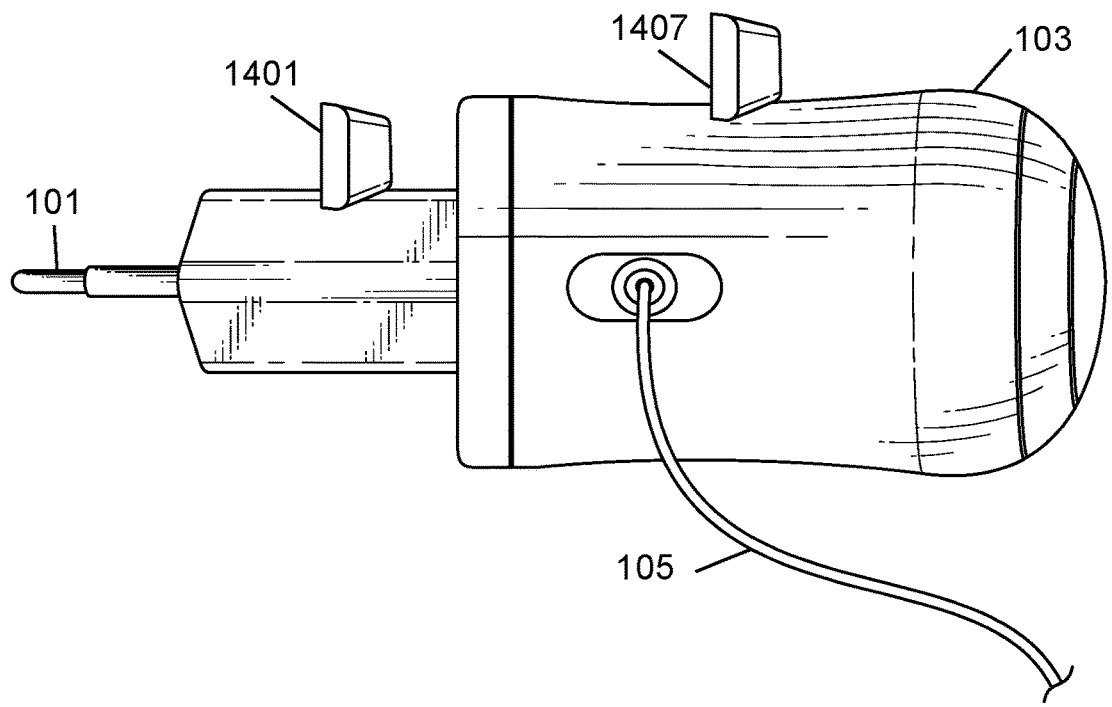
FIG. 66 depicts an elevated side view of an electrical charging plug with an embodiment with tandem vertical protursions for holding electrical devices to be charged (tandem application).
Figure 67:
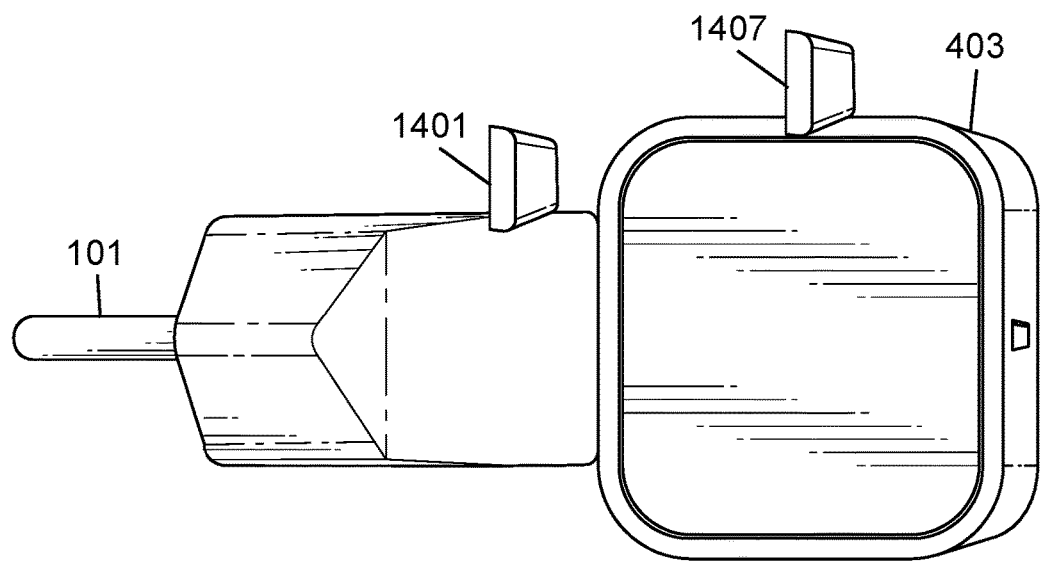
FIG. 67 depicts an assembled 220 V adapter plug and 110 v electrical plug with vertical stops to hold electrical devices being charged (tandem application).
Figure 68:
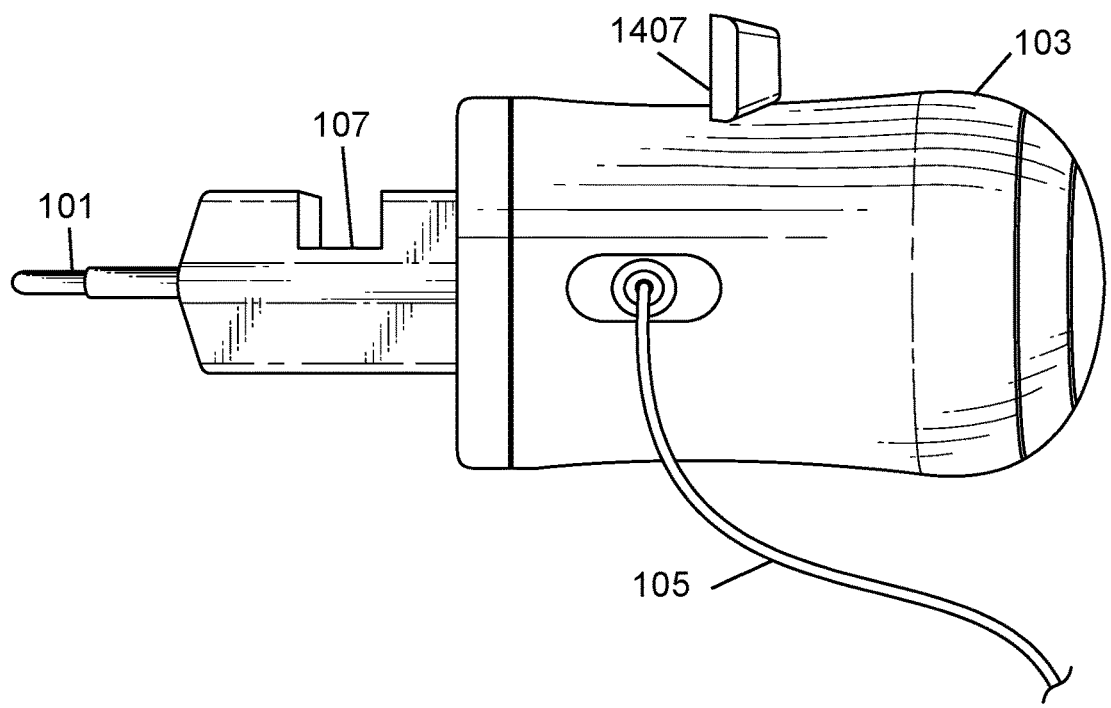
FIG. 68 is a side view of a 220 V electrical charger with an embodiment of a vertical device holding slot in front and an vertical stop in rear (tandem application).
Figure 69:
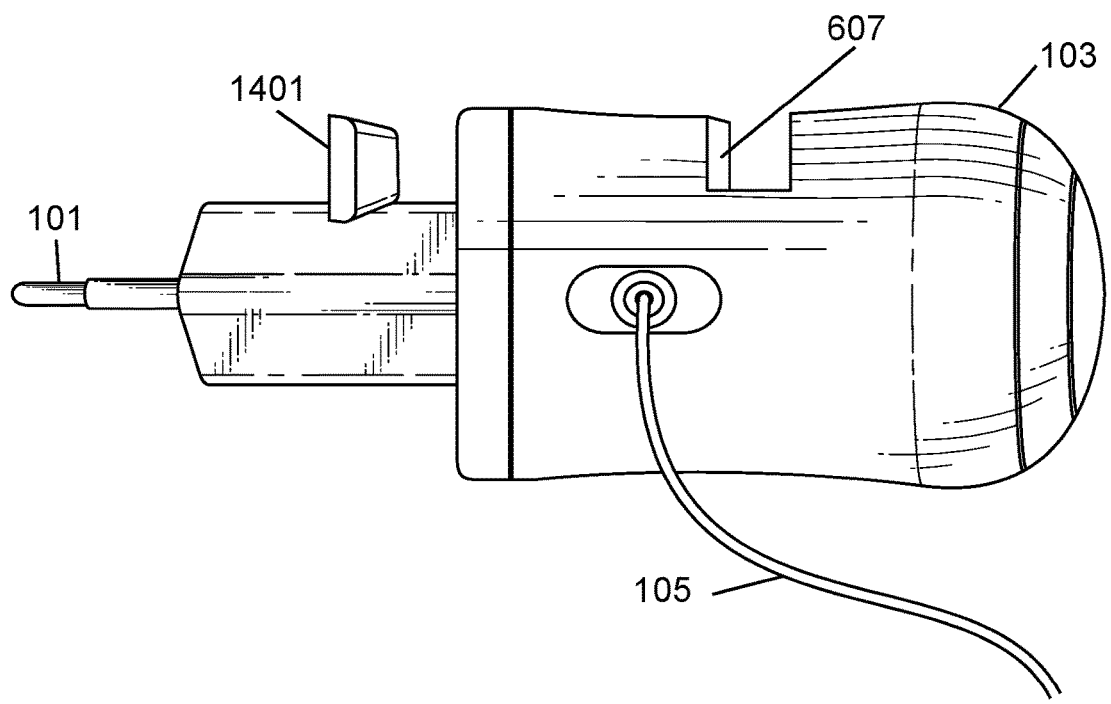
FIG. 69 depicts a side view of FIG. 68 with protrusions reversed (tandem application).

In embodiments, FIG. 66 to 68 shows electrical charging devices (i.e., electrical plug and/or electrical adapter) with two device holding slots. The device holding slots can be vertical stoppers (1401 and 1407) and vertical channels (107 and 607). FIG. 66 depicts elevated side view electrical charging plug with embodiment tandem vertical stops for holding electrical devices to be charged. FIG. 67 depicts assembled 220 V adapter plug and 110 v electrical plug with embodiment vertical stops to hold electrical devices being charged. FIG. 68 side view 220 V electrical charger with embodiment vertical device holding slot in front and embodiment vertical stop in rear. FIG. 69 depicts side view FIG. 68 with embodiments reversed.

Figure 70:
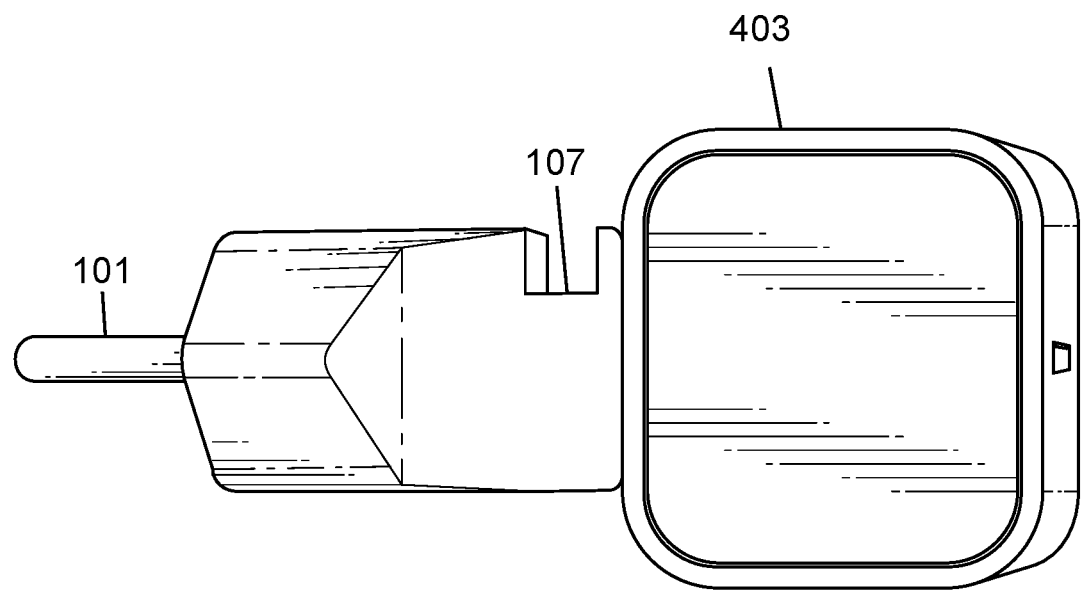
FIG. 70 depicts an assembled 220 v adapter and a 10 v electrical plug with a vertical device holder slot in the 220 v adapter.
Figure 71:
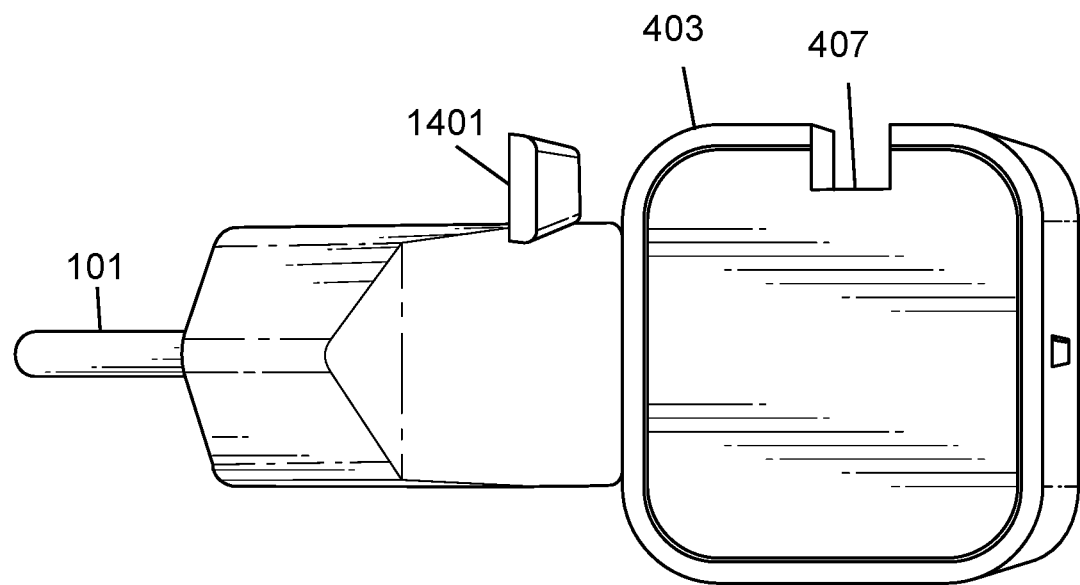
FIG. 71 depicts an assembled 220 v adapter plug with a vertical stop and a 110 v electrical plug with a vertical device holding channel (tandem application).

FIG. 70 depicts assembled 220 V electrical adapter and 110 V electrical plug with an embodiment of vertical device holder slot in 220 V adapter. FIG. 71 depicts assembled 220 V electrical adapter plug with an embodiment of a vertical stop and 110 V electrical plug with embodiment vertical device holding channel. This embodiment is having same arrangement or structure as that of the FIG. 24, only difference is that holding slot is of different design that the earlier one. The holding slot is vertical stopper 1401 is attached on top of the electrical adapter for holding securely holding electrical device.

Figure 72:
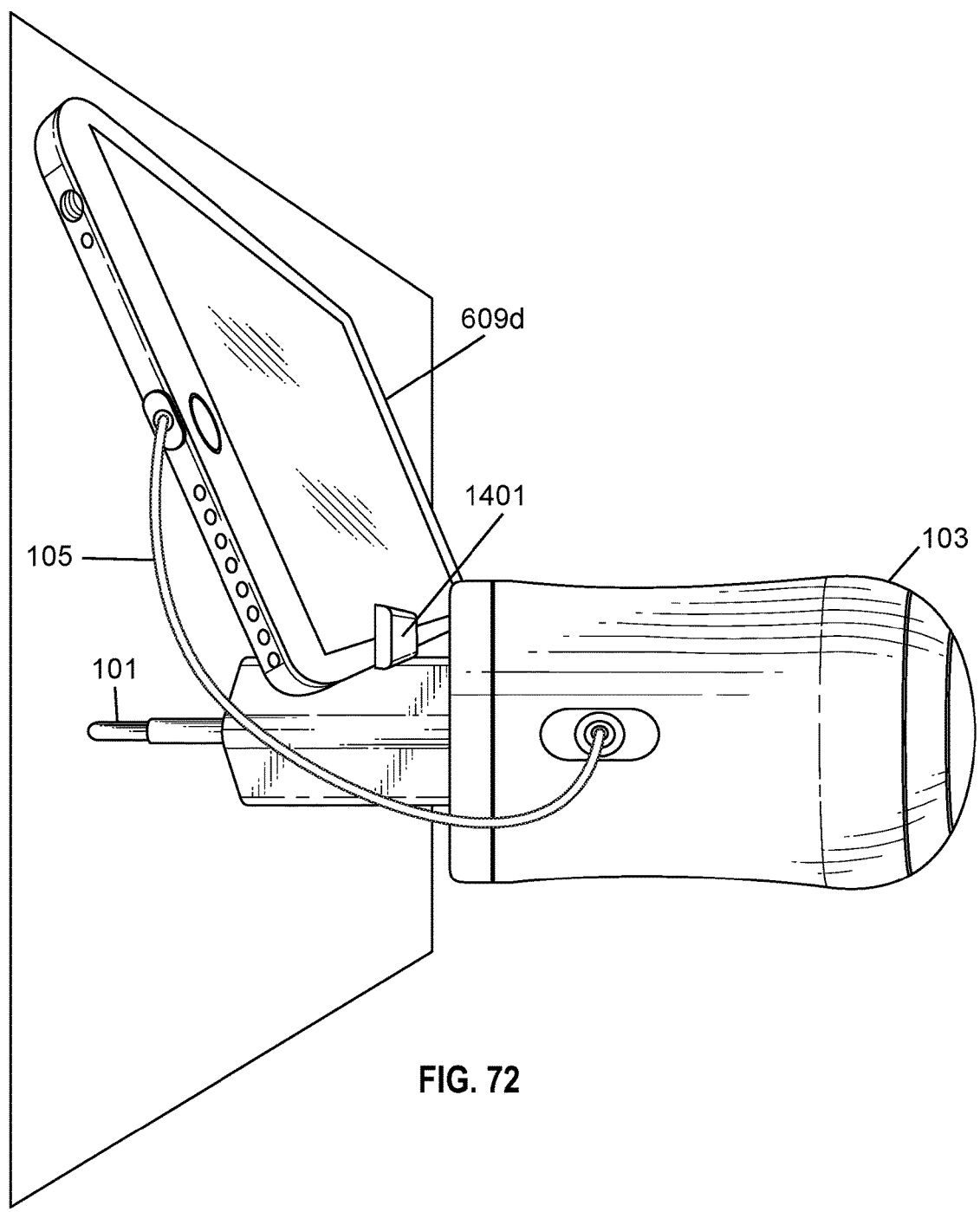
FIG. 72 depicts a 220 v charging plug with a vertical stop charging cell phone.
Figure 73:
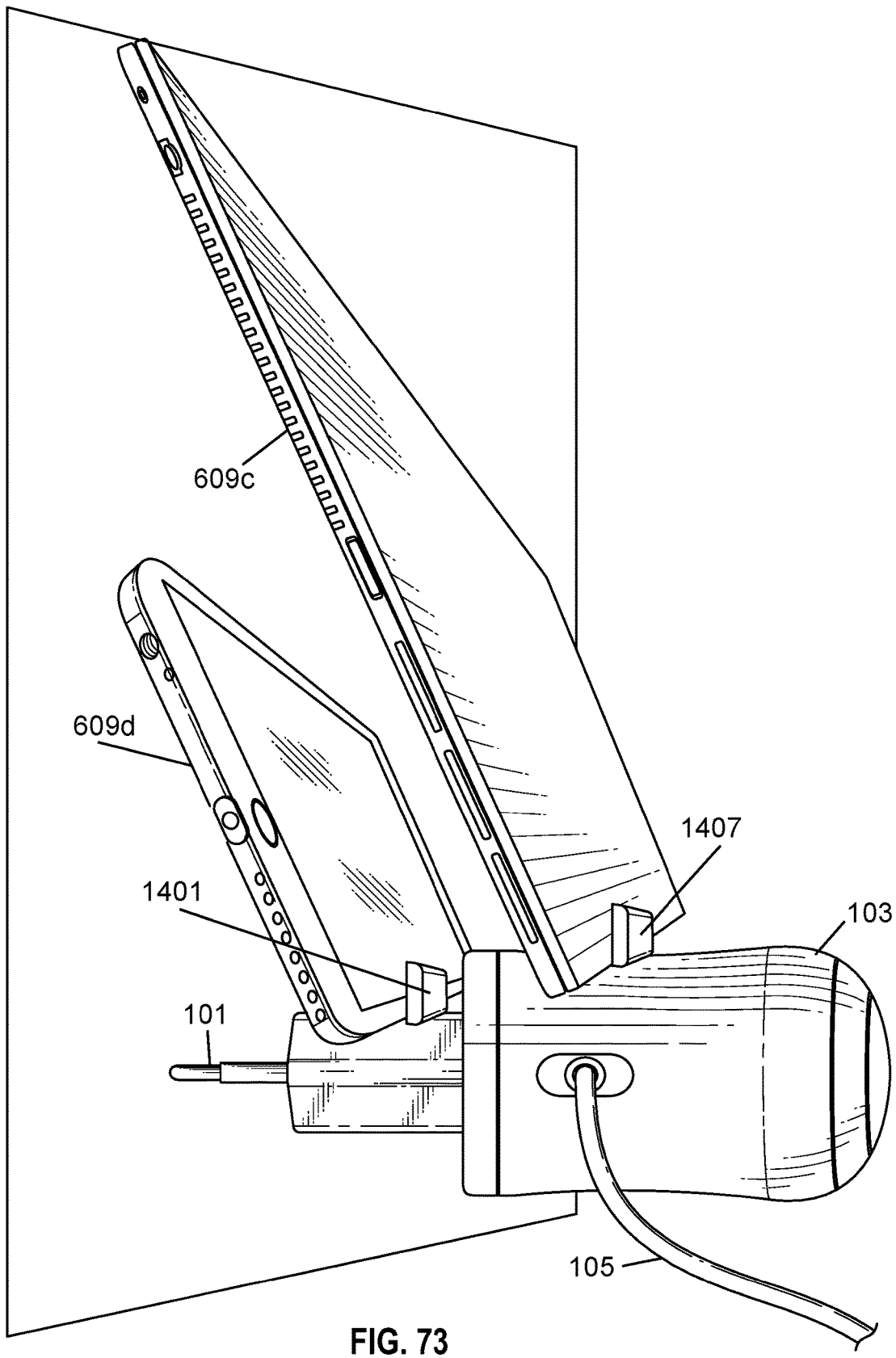
FIG. 73 depicts a side view with two vertical stops charging electrical devices (tandem application).
Figure 74:
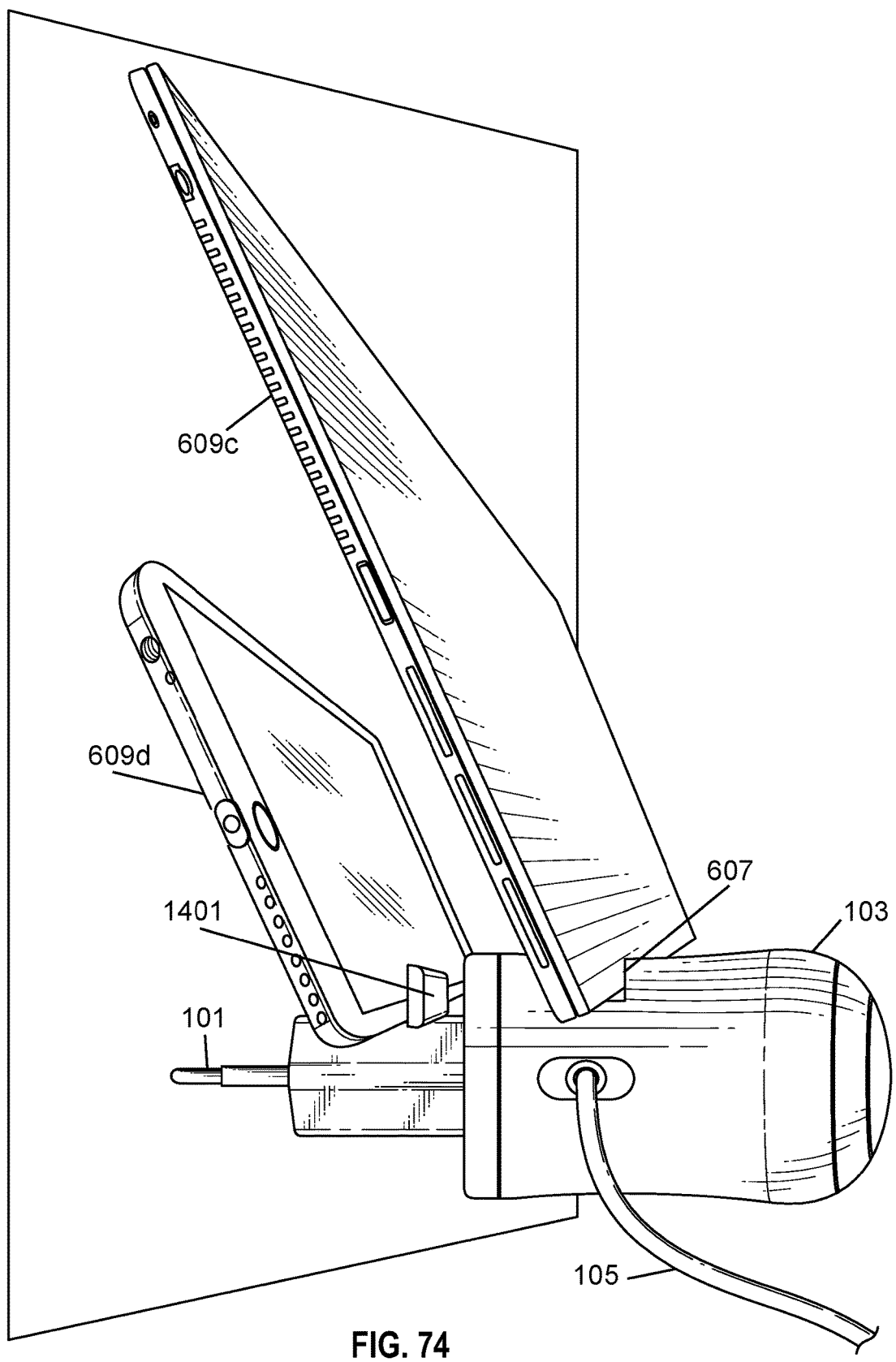
FIG. 74 depicts a side view embodiment with vertical stop and a vertical holding channel (tandem application).
Figure 75:
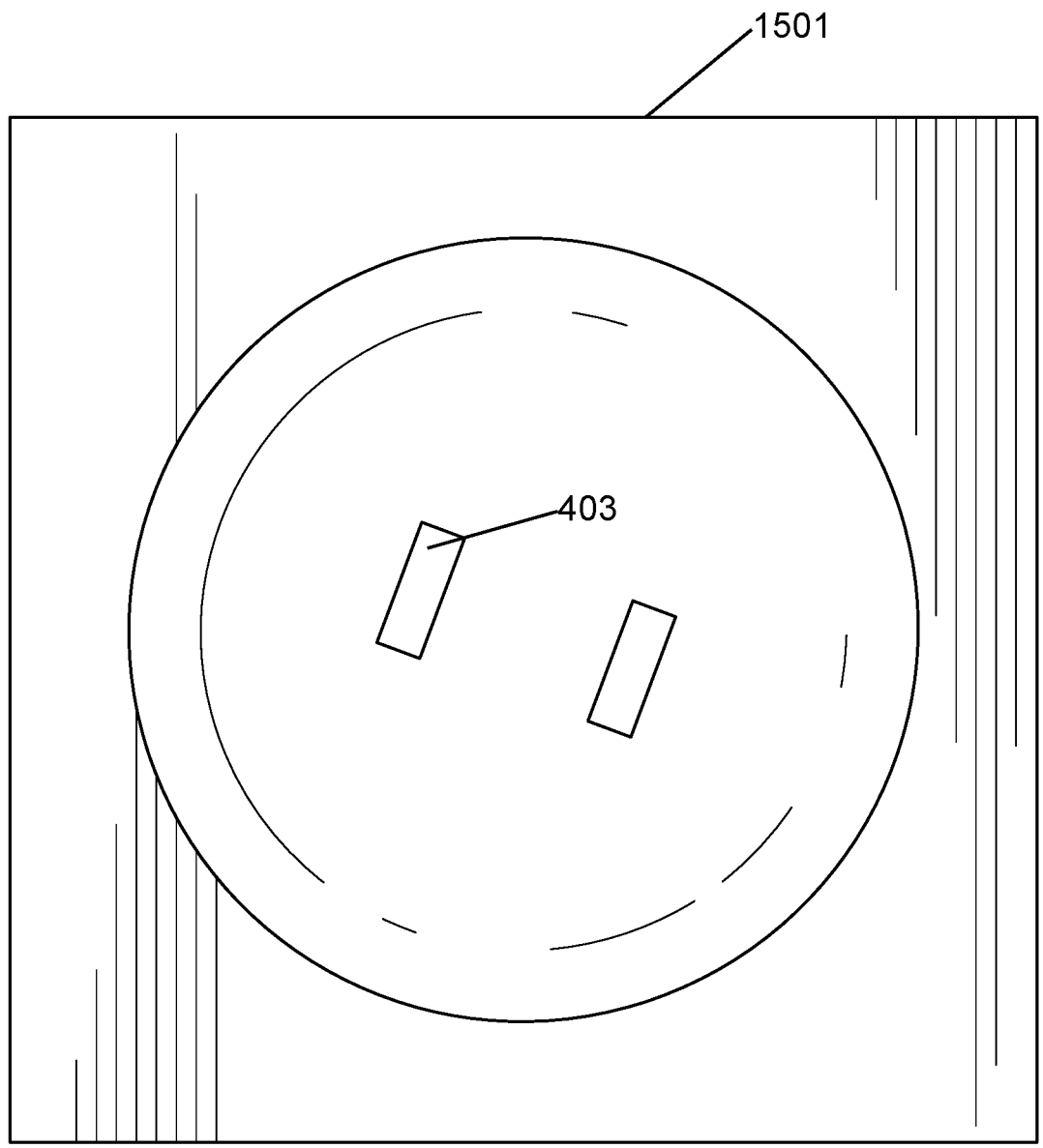
FIG. 75 depicts a non-horizontal electrical outlet.

FIG. 72 to 74 shows different examples of the present invention. FIG. 72 depicts 220 V electrical charging plug with embodiment vertical stop charging cell phone. FIG. 73 depicts side view embodiment vertical stops charging electrical devices. FIG. 74 depicts side view embodiment vertical stop and embodiment vertical device holding channel.

Figure 76:
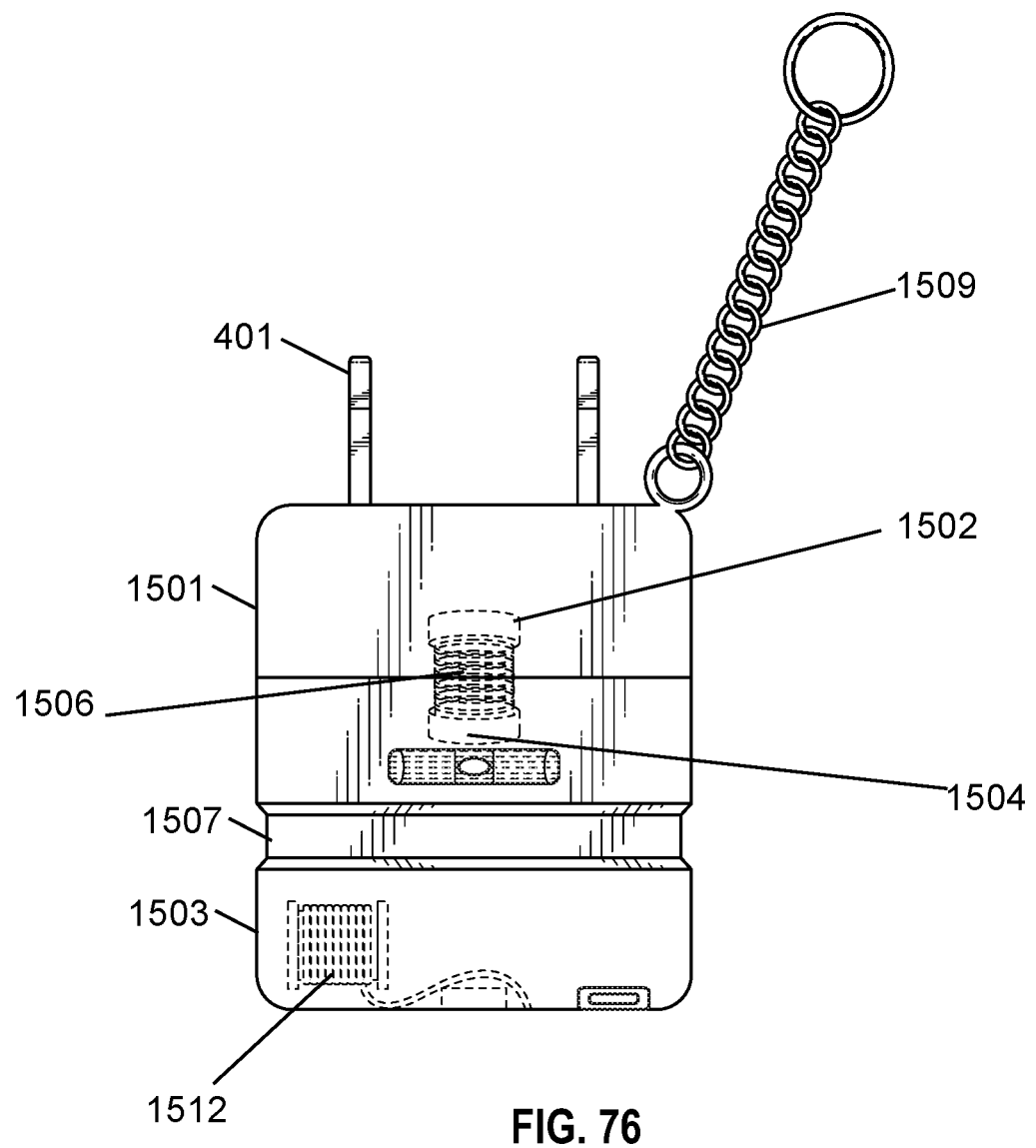
FIG. 76 depicts a top view of an adjustable device holder with horizontal level keychain charger.
Figure 76A:
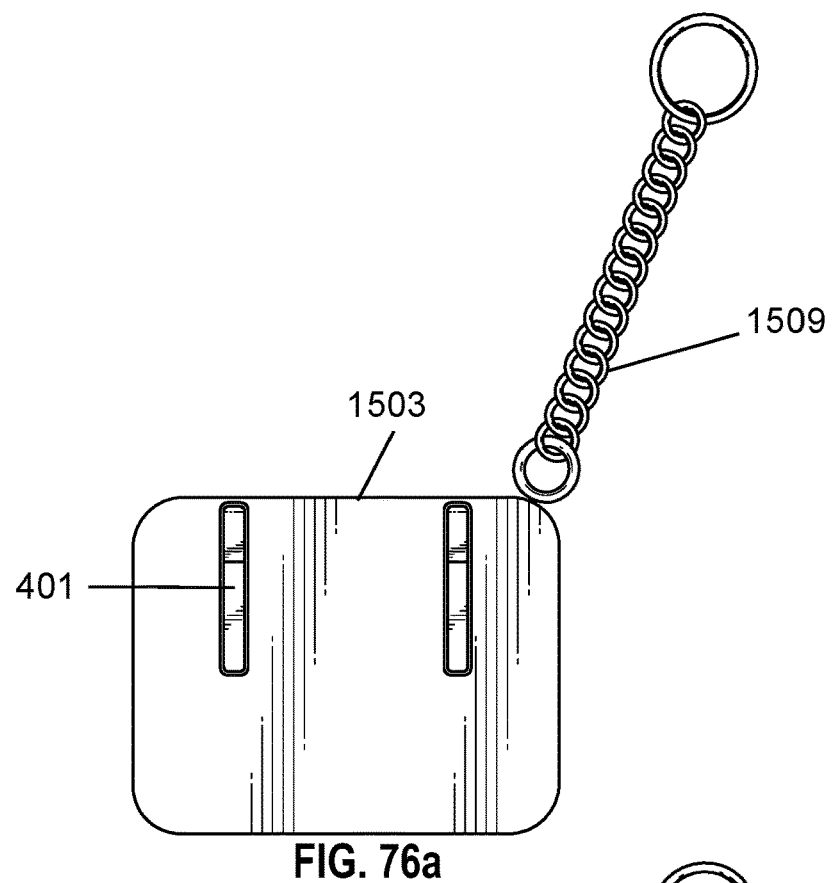
FIG. 76a shows a rear view of FIG. 76 with pins retracted (closed position).
Figure 76B:
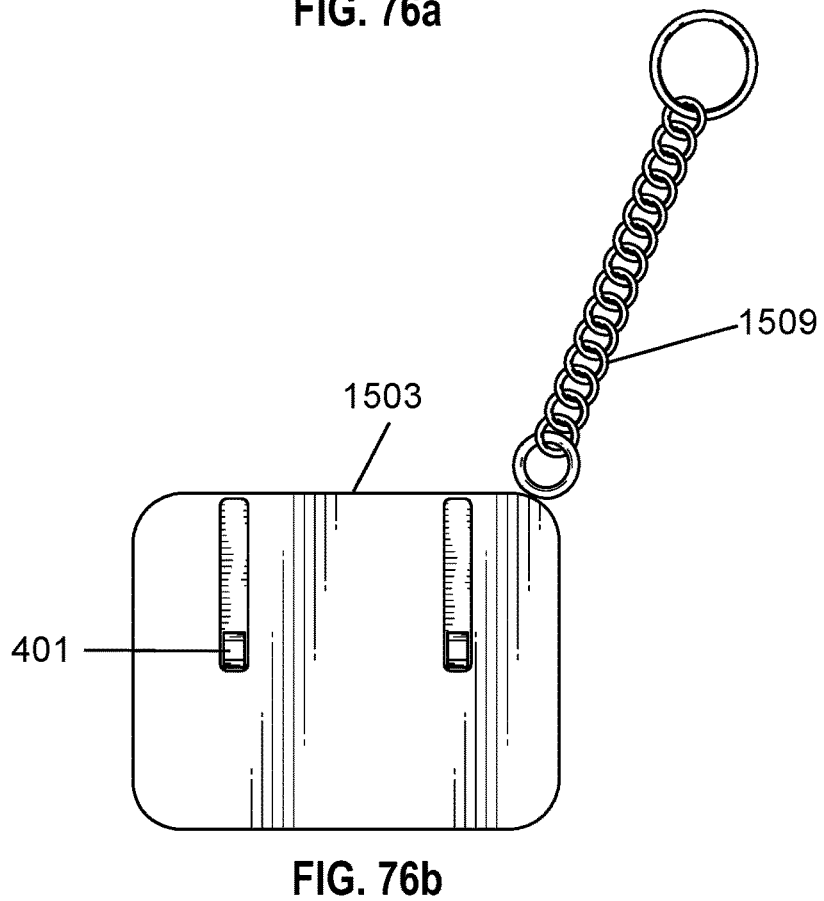
FIG. 76b shows a rear view with pins in extended position.
Figure 77:
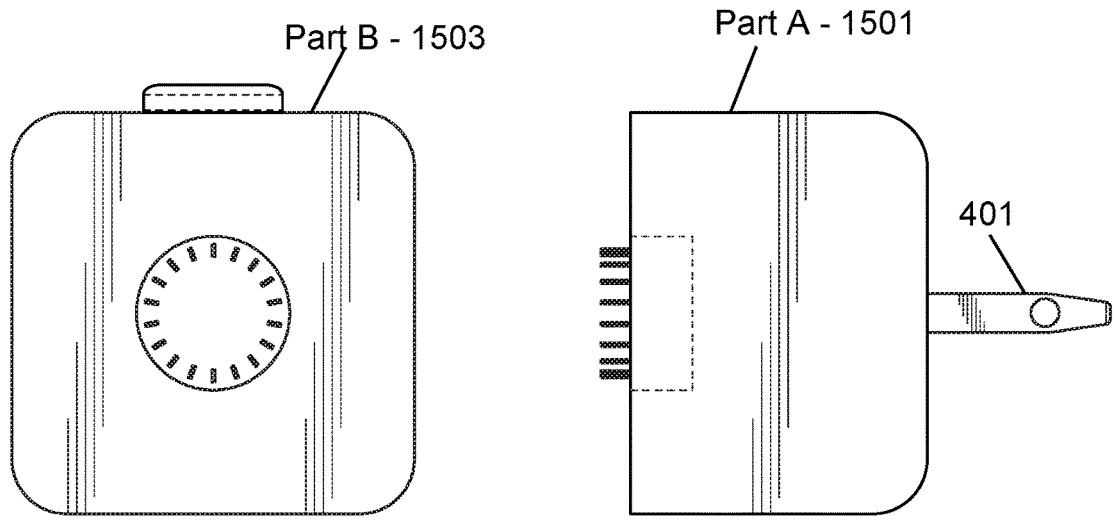
FIG. 77 depicts label parts A and B, where part A has level bubble.
Figure 78:
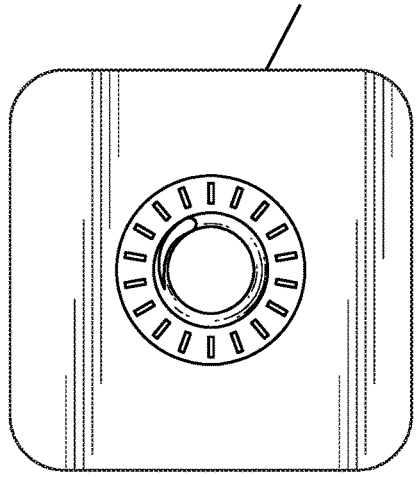
FIG. 78 depicts drawing label parts A and B, where part B has level bubble.
Figure 78:
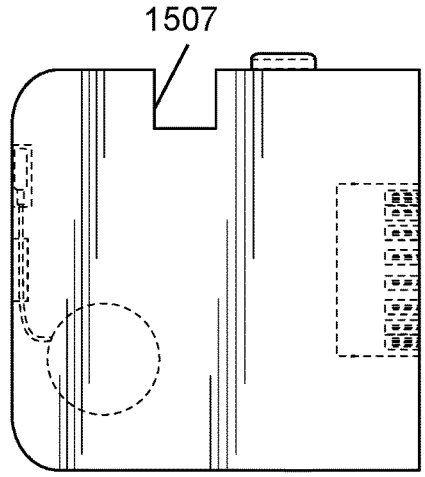
Figure 79:
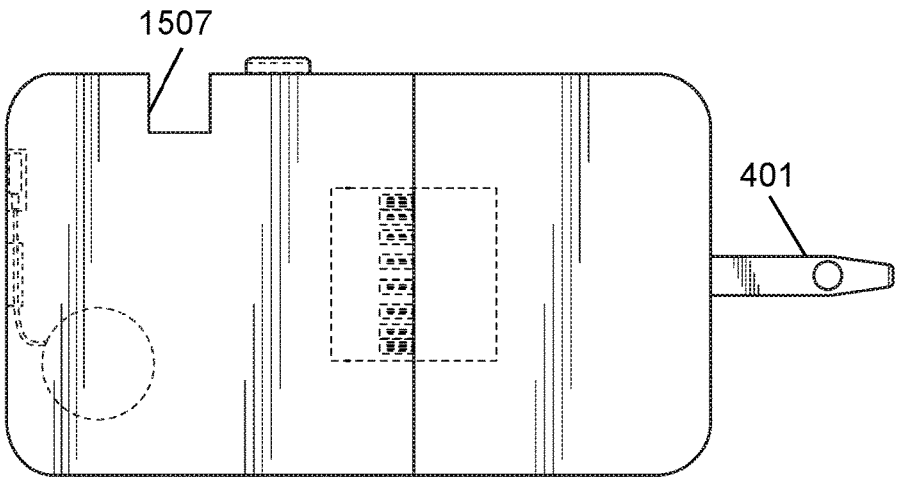
FIG. 79 depicts an elevated bubble level and also retractable pins.
Figure 80:
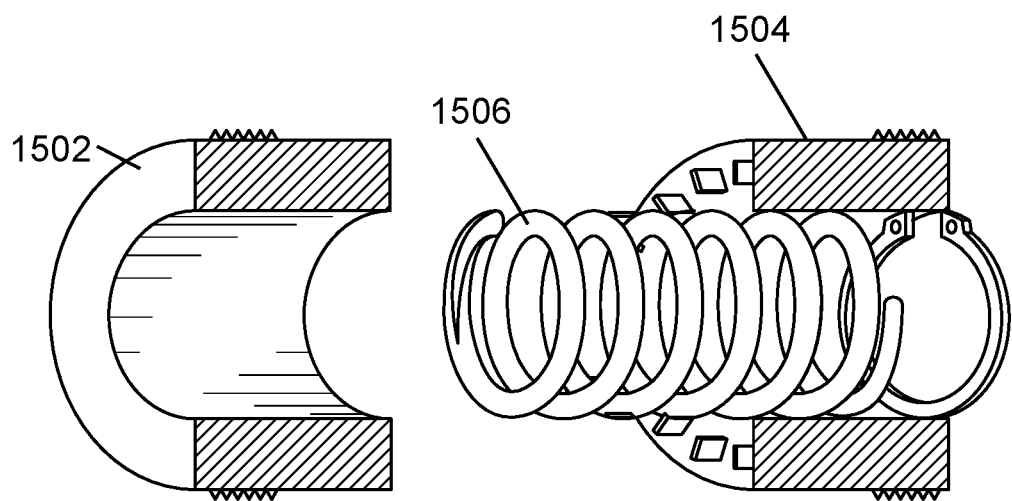
FIG. 80 depicts a spring assembly.
Figure 81:
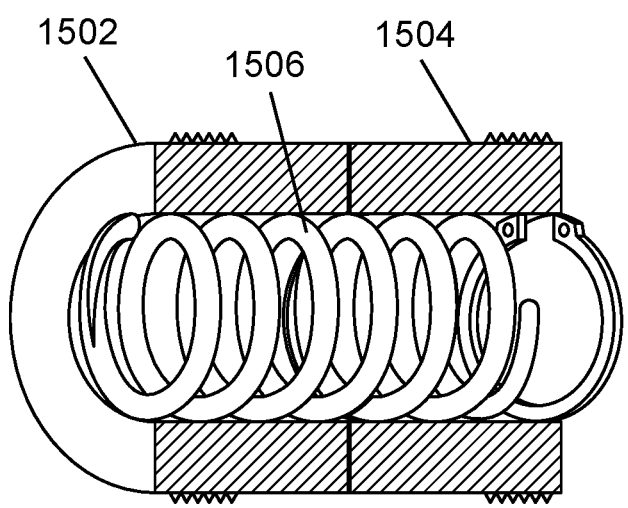
FIG. 81 depicts an assembled spring assembly for adjustable device holder.
Figure 82:
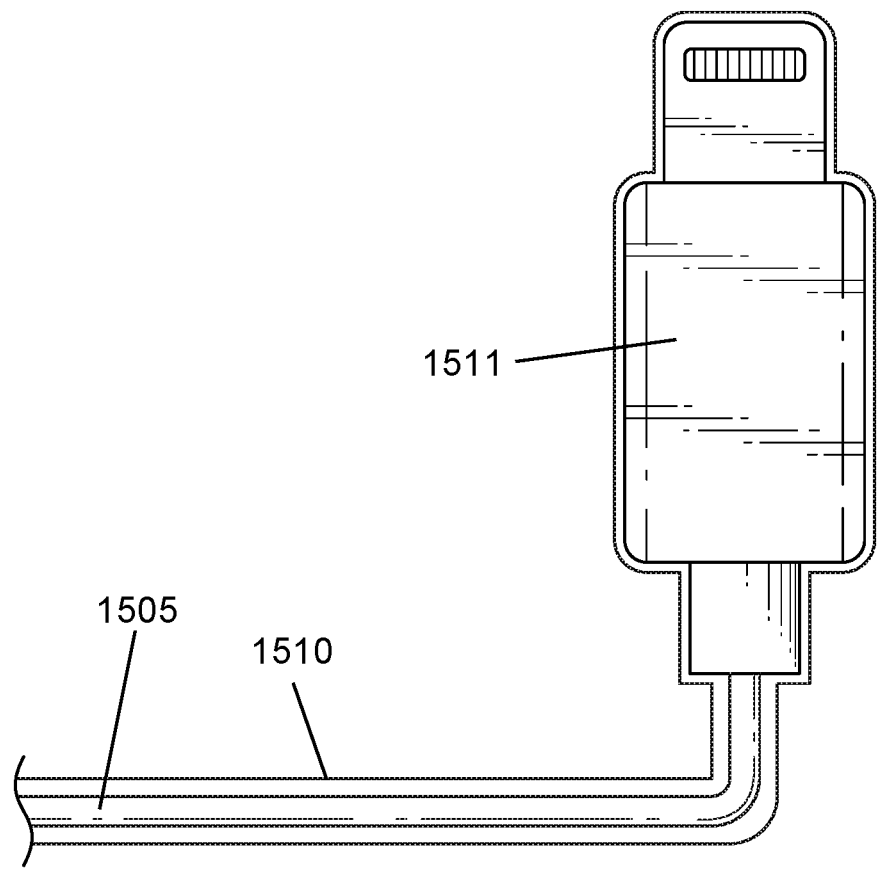
FIG. 82 depicts a cable plug for adjustable device holder.
Figure 83:
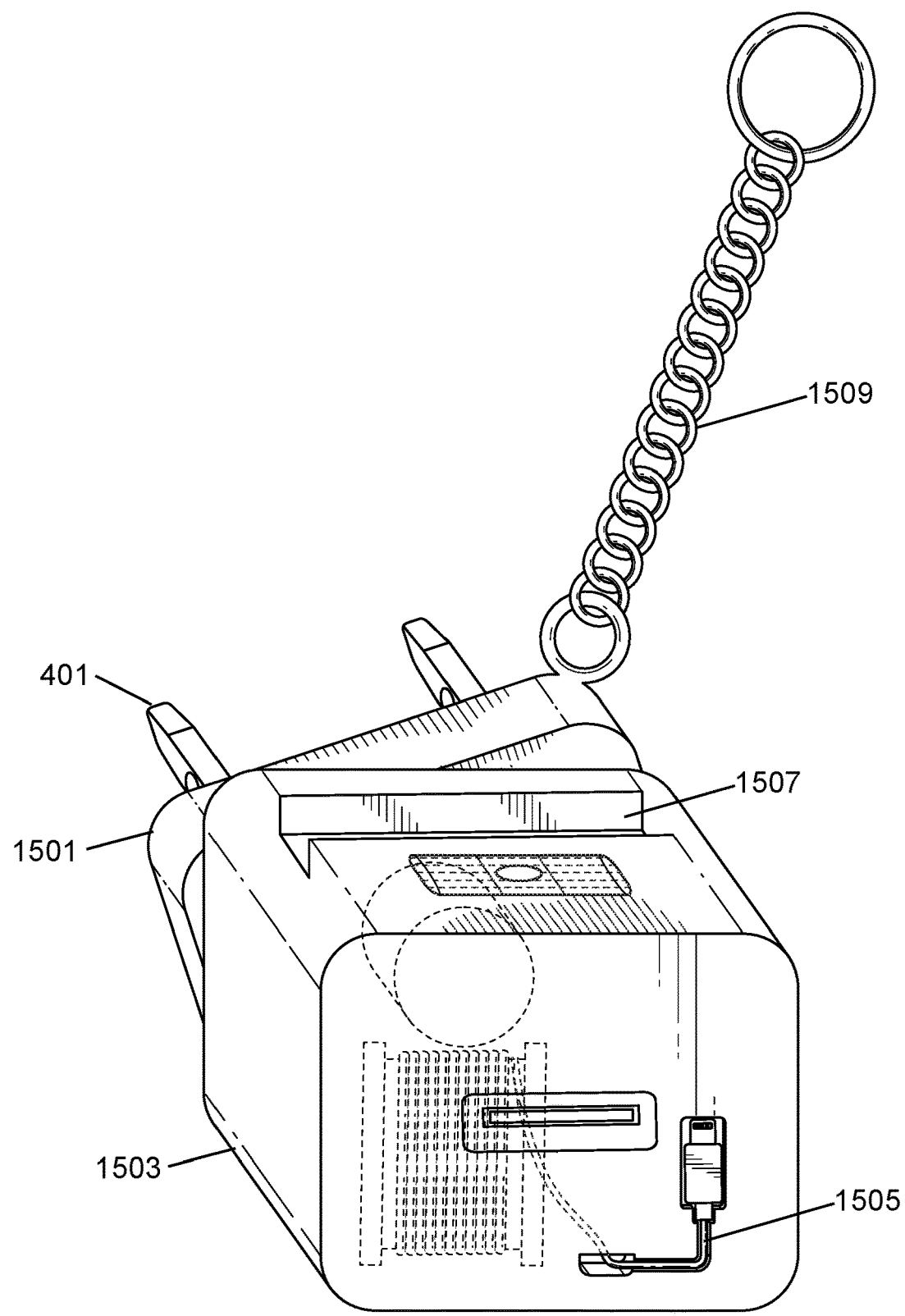
FIG. 83 depicts an adjustable device holder for non-horizontal electrical outlets.
Figure 84:
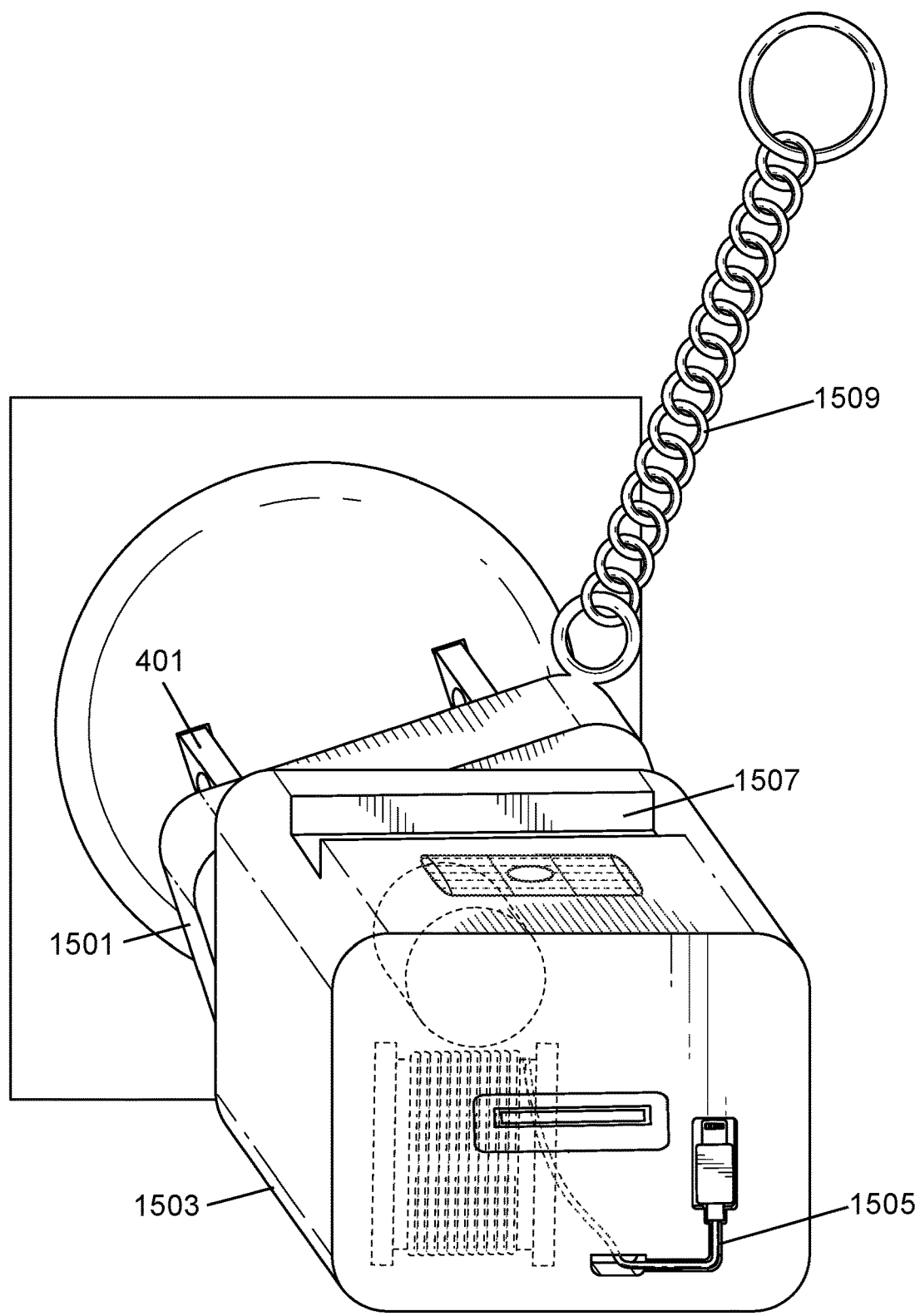
FIG. 84 depicts an embodiment adjustable keychain device holder in non-horizontal electrical outlet.

In an embodiment, FIGS. 76 to 84 depicts a portable electronic charging device keychain held electrical charger device to address non-horizontal electrical outlets. FIG. 76 depicts top view of the embodiment having adjustable keychain charger and also has retractable plug. FIG. 76a shows a flush bubble level. An electrical device charger with means of holding a plurality of electrical devices (not shown in the picture) which comprises: a main unit/housing with at least one holding slot 1507; a retractable cable cord 1512 for connecting main unit with said electrical devices; and pins 401 for fitting said main unit with an electric power source. The main unit/housing has two main parts, 1501 and 1503, these two parts can be connected/attached by threads or snap-on spring loaded mechanism. The electrical device charger (i.e. main unit) in the present embodiment is 110 V electrical plug. The holding slot 1507 in this embodiment is channel type and it is vertical. The holding slot 1507 is located at the top side of the main unit. The pins 401 in the present embodiment are of straight as used in 110 V outlets. The electrical devices can be held vertically in the holding slot 1507, in the present embodiment it is of channel type, in which an electrical device can held securely. FIG. 77 depicts label parts A (1501) and B (1503), where part A (1501) has elevated bubble level (not shown flush level bubble). FIG. 78 depicts defective drawing label parts A (1507) and B (1503), where part B (1503) has elevated level bubble. FIG. 79 depicts elevated bubble level (not shown flush level bubble) and also show retractable plug. FIG. 80 depicts a pressed fit snap ring 1506 with a concentric groove to fit into (not shown). Small magnetic parts 1502 and 1504 are located inside the parts 1501 and 1503. Further, the parts 1504 and 1502 have threads which secure these pieces into 1501 and 1503. FIG. 81 depicts snap-on arrangement (inside snap ring). FIG. 82 depicts retractable cable plug for electrical device. FIG. 83 depicts rear view embodiment adjustable keychain (for non-horizontal outlets). FIG. 84 depicts embodiment adjustable keychain in non-horizontal electrical outlet.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. An electrical device charger, comprising:
    at least one housing defined by an outer surface from which a plurality of prongs are configured to protrude perpendicularly from to couple to and receive power from an electrical power source, where the outer surface is defined by at least one stopper comprising a channel and/or a protrusion with parallel opposing side walls, no end walls, and extending across a top of the housing that is configured to securely hold at least one electrically powered device in position on the housing while the at least one housing is coupled to the power source; and
    wherein along an entire length of the protrusion and/or the channel, the protrusion or channel is defined by an open-ended rectangle with a cross-sectional shape of right angles and/or a curve.

2. The electrical device charger of claim 1, further comprising an electrical cord for connecting the housing to each electrically powered device.

3. The electrical device charger of claim 2, wherein the at least one housing comprises a connector for electrically connecting the each electrical cord to each electrical device.

4. The electrical device charger of claim 1, wherein the plurality of prongs are configured to couple to a 220 V or 110 V wall outlet.

5. The electrical device charger of claim 1, wherein the at least one housing is comprised of an electrically connected 220 V part and a 110 V part.

6. The electrical device charger of claim 1, wherein the electric power source is selected from the group consisting of: an alternating current (AC) source and a direct current (DC) source.

7. The electrical device charger of claim 1, wherein the at least one housing is comprised of a first part and a second part, wherein the second part comprises the at least one stopper, and wherein the second part is configured to rotate relative to the first part.

8. The electrical device charger of claim 7, further comprising a securing mechanism configured to maintain the rotation of the first part relative to the second part.

9. The electrical device charger of claim 8, wherein the at least one stopper comprises a channel.

10. The electrical device charger of claim 8, wherein the securing mechanism is configured to maintain the stopper in a horizontal orientation when the at least one housing is coupled to the power source.

11. The electrical device charger of claim 1, wherein the at least one housing is comprised of a first part and a second part that are connected by a press-fit mechanism.

12. The electrical device charger of claim 10, wherein the securing mechanism comprises a dial with an indicator.

13. The electrical device charger of claim 11, wherein the press-fit comprises a spring.

14. The electrical device charger of claim 1, wherein the at least one electrically powered device comprises, a mobile phone, an i-Pad computer device, a music player device, a CD player, a tablet computer, or a laptop computer.

* * * * *